(12) United States Patent
Faris et al.

(10) Patent No.: US 6,659,861 B1
(45) Date of Patent: Dec. 9, 2003

(54) INTERNET-BASED SYSTEM FOR ENABLING A TIME-CONSTRAINED COMPETITION AMONG A PLURALITY OF PARTICIPANTS OVER THE INTERNET

(75) Inventors: Sadeg M. Faris, Pleasantville, NY (US); Gregory Hamlin, Presque Island, ME (US); James P. Flannery, New City, NY (US)

(73) Assignee: Reveo, Inc., Elmsford, NY (US)

( * ) Notice: Subject to any disclaimer, the term of this patent is extended or adjusted under 35 U.S.C. 154(b) by 0 days.

(21) Appl. No.: 09/579,222

(22) Filed: May 26, 2000

Related U.S. Application Data

(63) Continuation of application No. 09/258,573, filed on Feb. 26, 1999.

(51) Int. Cl.[7] .............................................. G06F 17/00
(52) U.S. Cl. .................................. 463/1; 463/29; 705/1
(58) Field of Search .......................... 705/1, 50; 463/1, 463/29

(56) References Cited

U.S. PATENT DOCUMENTS 5,816,918 A * 10/1998 Kelly et al. ................... 463/16
5,970,143 A * 10/1999 Schneier et al. ............. 713/181
6,347,398 B1 * 2/2002 Parthasarathy et al. ....... 717/11

FOREIGN PATENT DOCUMENTS

WO  WO 98/30297  *  7/1998

OTHER PUBLICATIONS no author; Microsoft Launches the Entertainment Pocket-Pak, a New Game Add-on for the Pocket PC; PR Newswire; Dialog copy pp. 1–2.*

* cited by examiner

Primary Examiner—Thomas A. Dixon
(74) Attorney, Agent, or Firm—Thomas J. Perkowski Esq., PC; Ralph J. Crispino

(57) ABSTRACT

An Internet-based system for enabling a time-constrained competition among a plurality of participants over the Internet. The Internet-based system comprises: a primary server having an embedded global positioning system (GPS) receiver; one or more web servers for providing information about the competition on the World Wide Web (WWW); a login server for enabling participants to log-in with the system prior to the competition; a competitor/participant database for storing information about each participant registered to participate in the competition; an invitation-to-respond/response database for storing invitations-to-responds (ITRs) (e.g. queries, problems, etc.) to be simultaneously displayed to participants at the competition, as well as the responses provided by each of the participants in response to the ITRs; one or more competition-promoting servers, each having an embedded GPS receiver, and conducting the competition process; and a plurality of GSU-enabled client machines. Each GSU-enabled client machine has an embedded Global Synchronization Unit (GSU). Each GSU-enabled client machine enables a registered participant to receive and display ITRs simultaneously with each and every other participant, and provide time and space (TS) stamped responses to the competition promoting servers. The competition promoting server fairly determines a winner amoung the participants independent of network latancies. All such components are interconnected with a globally-extensive network (e.g. the Internet) to enable the competition among the participants.

46 Claims, 50 Drawing Sheets

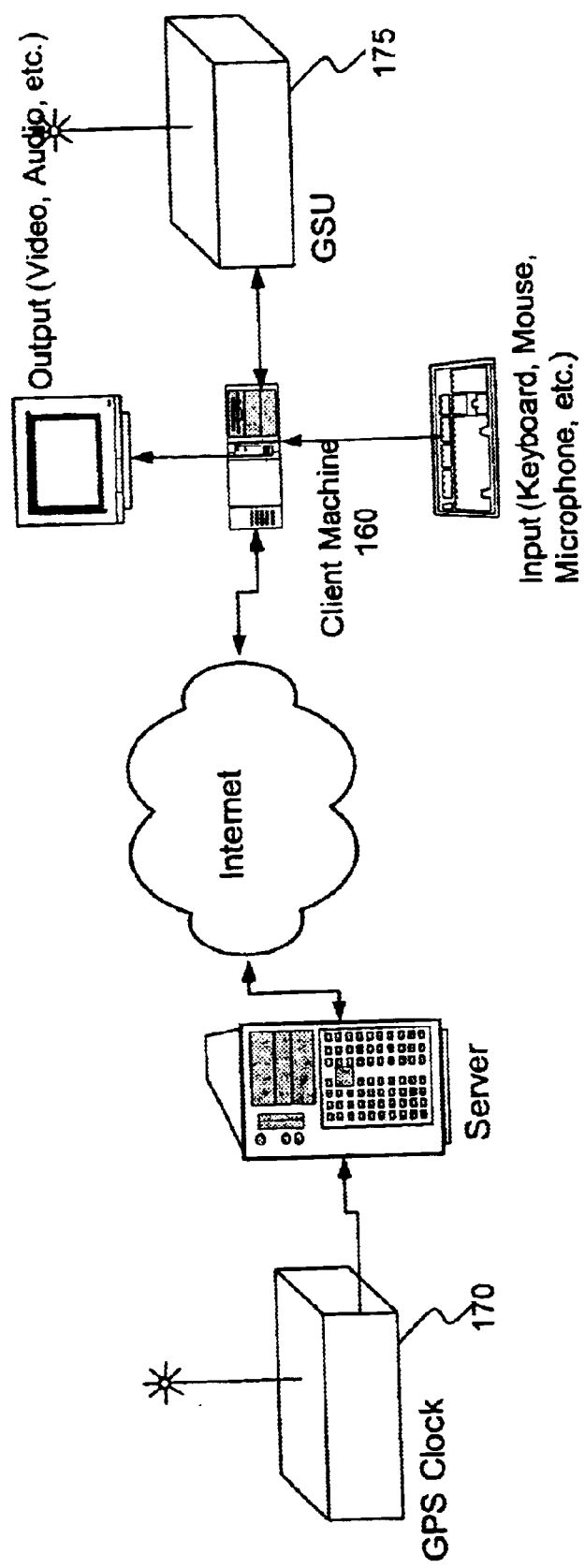
Figure 2D1

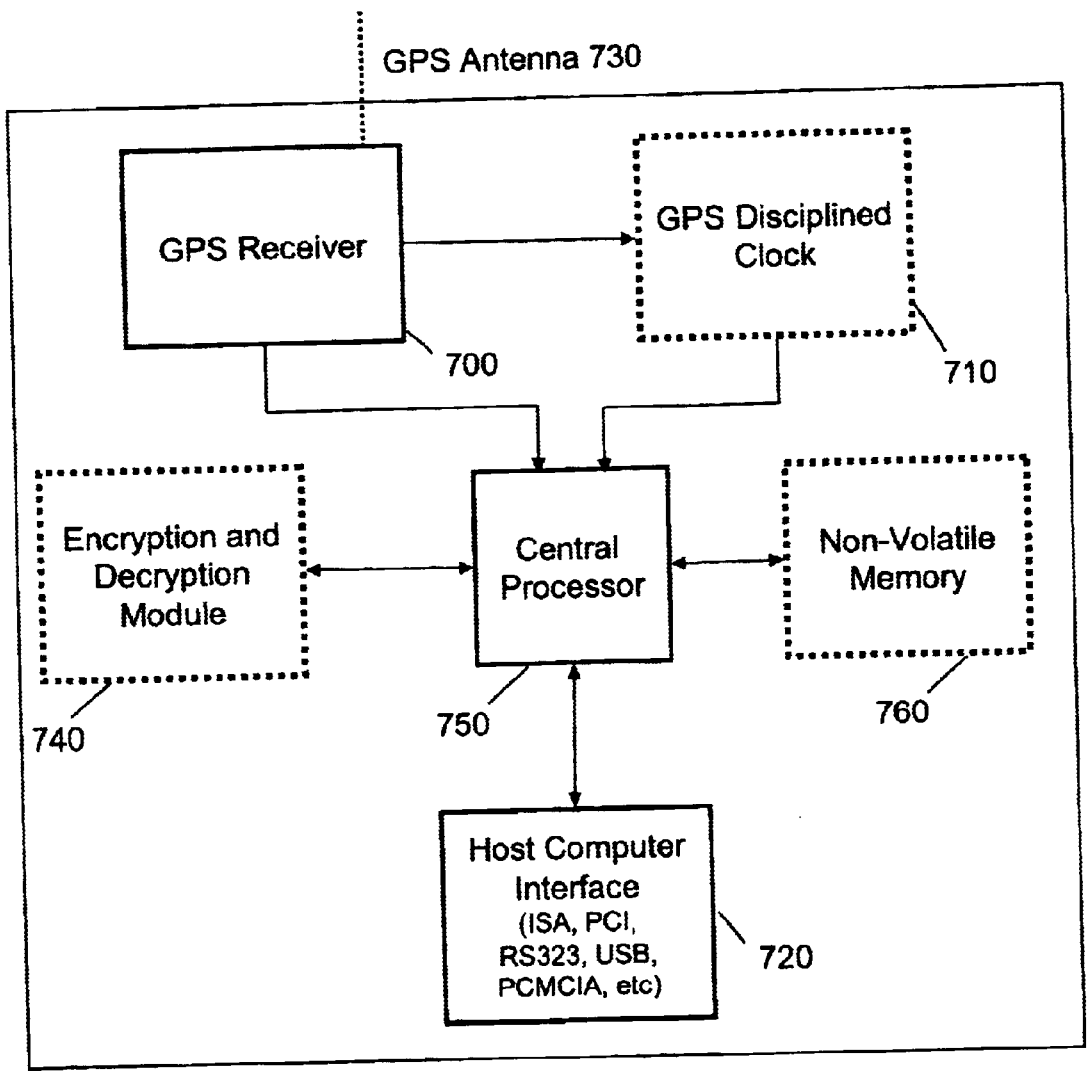
Figure 2D2

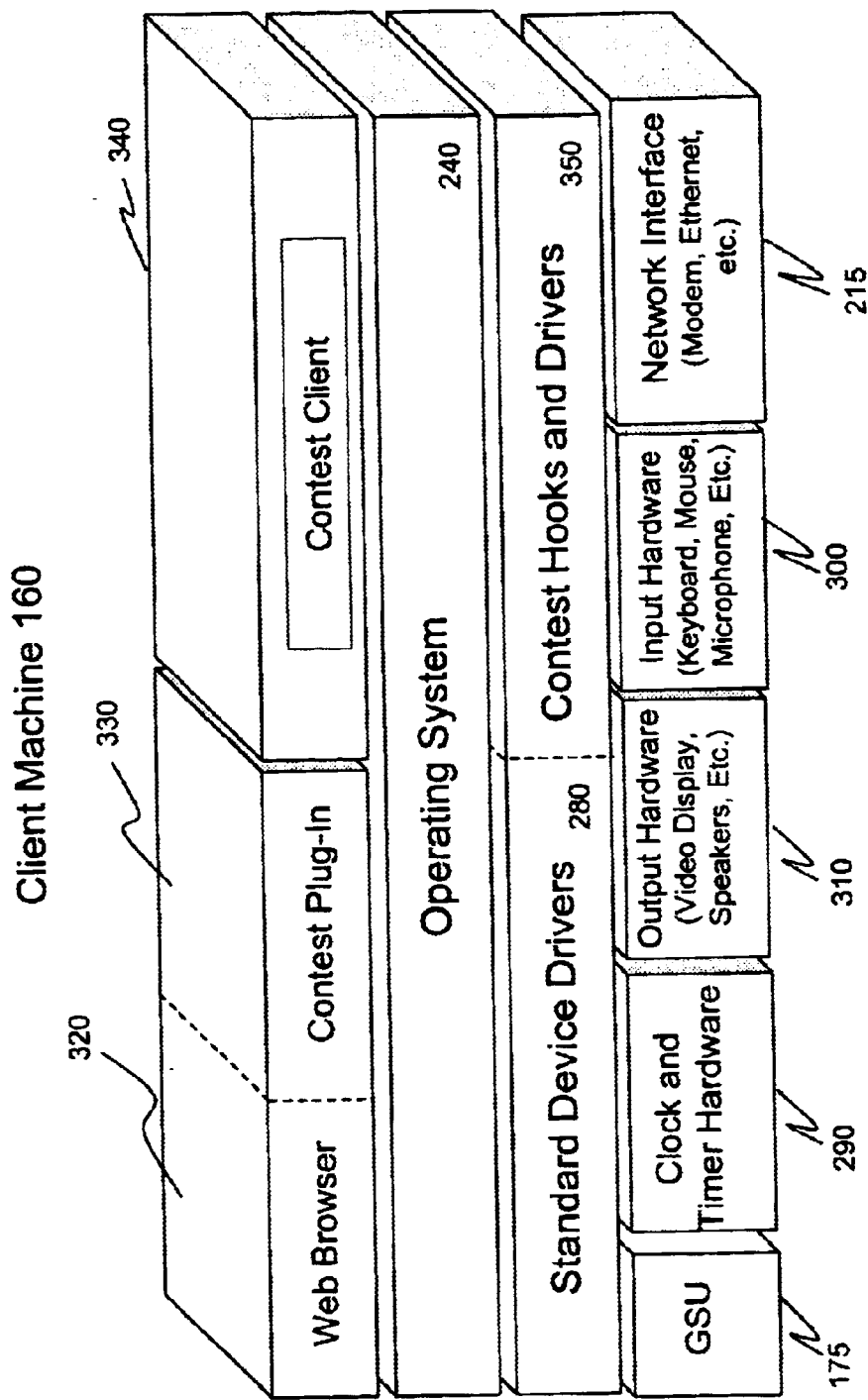
Figure 2D3

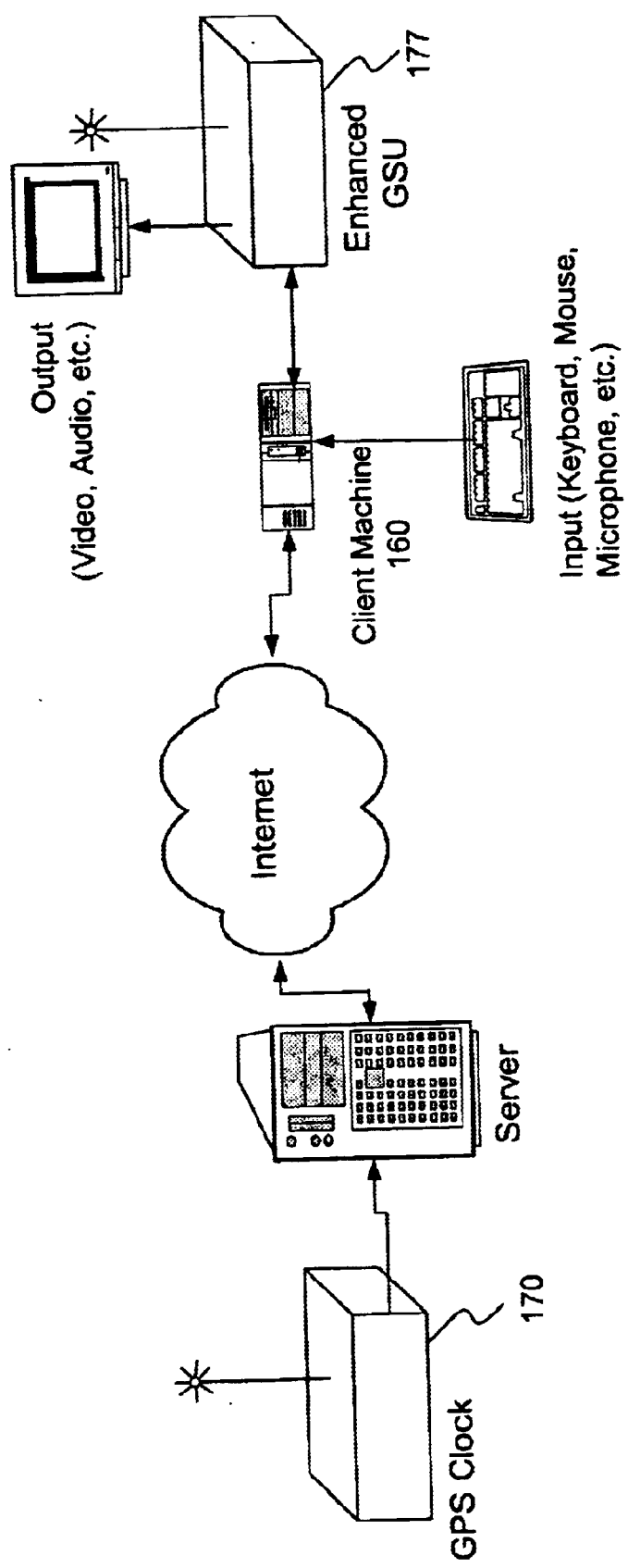
Figure 2D4

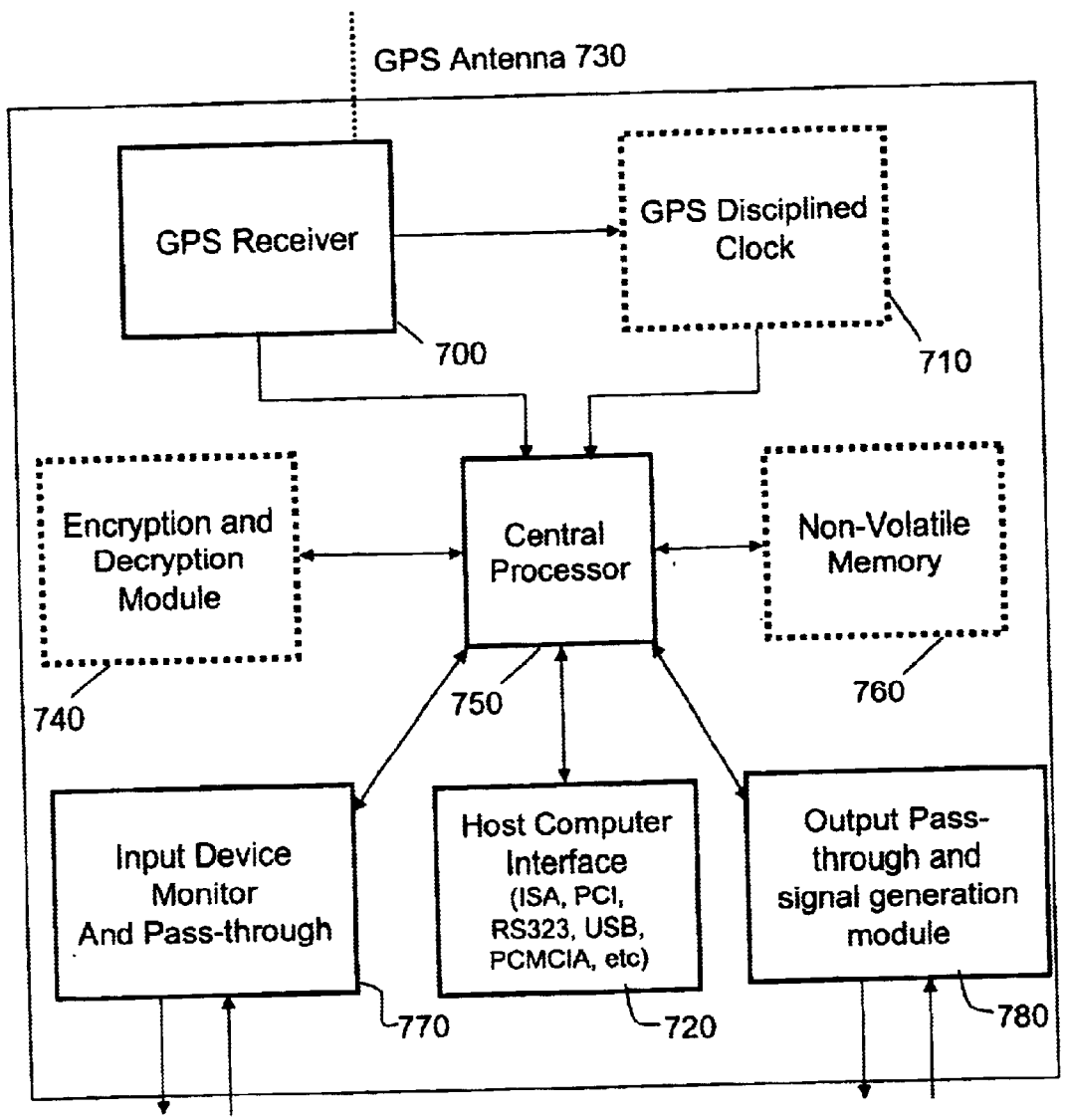
Figure 2D5

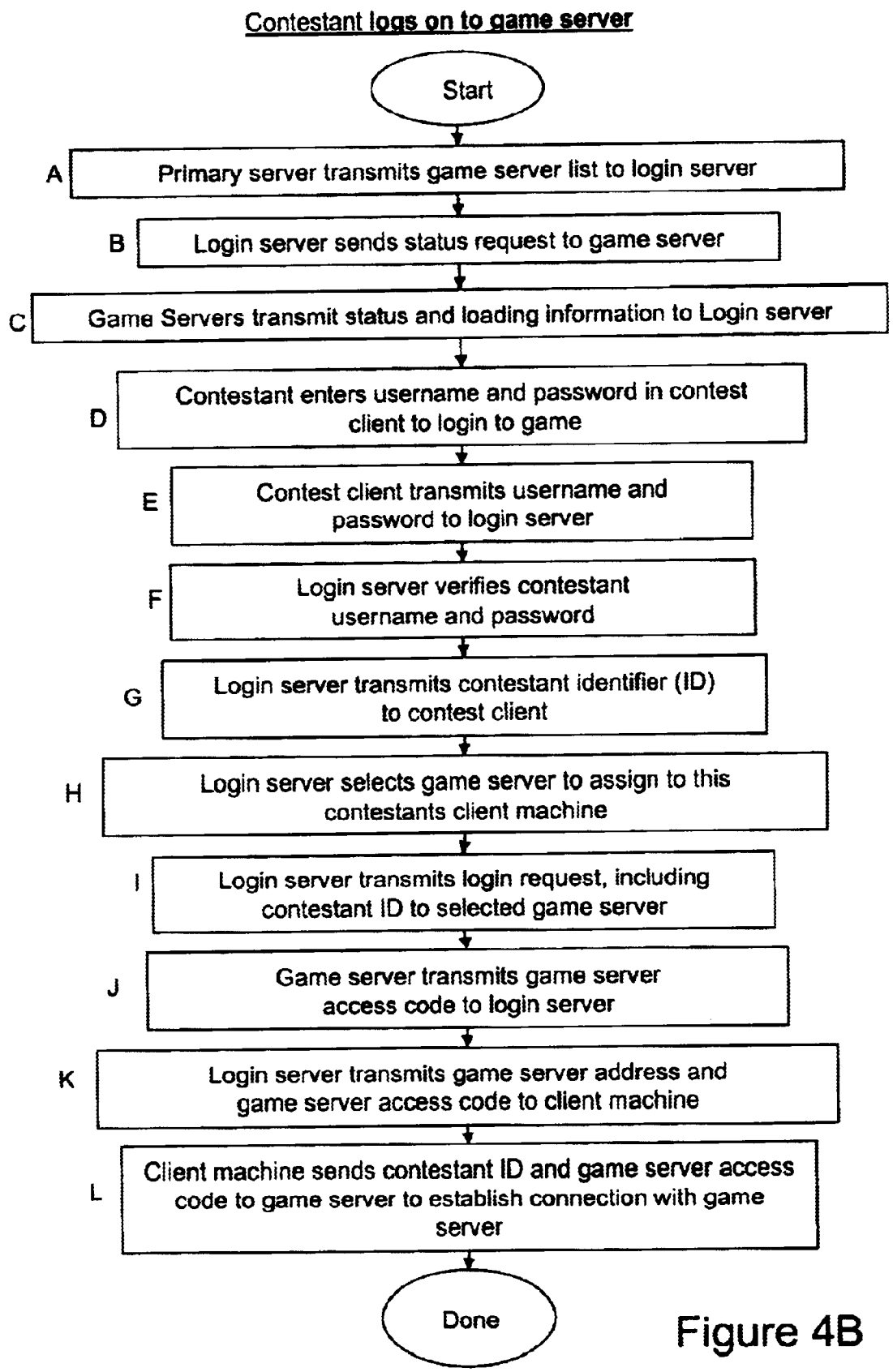

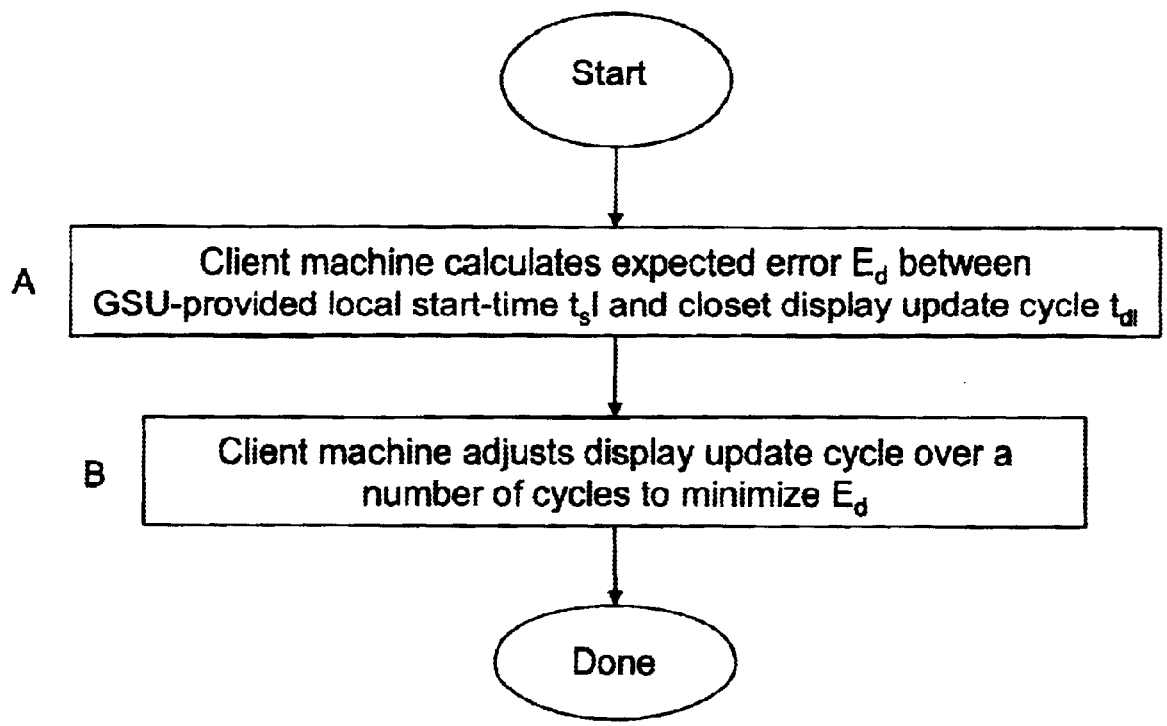
Figure 4D1

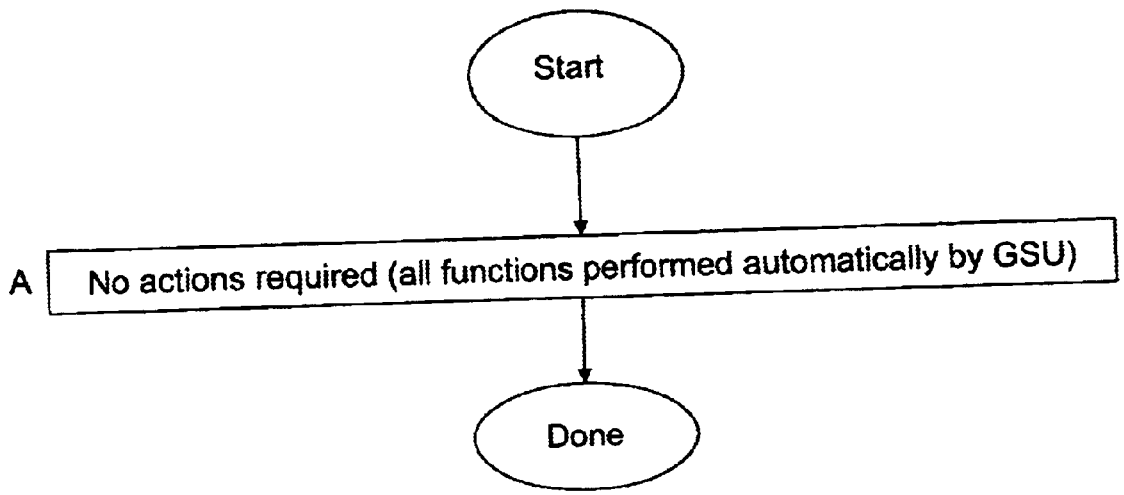
Figure 4D2

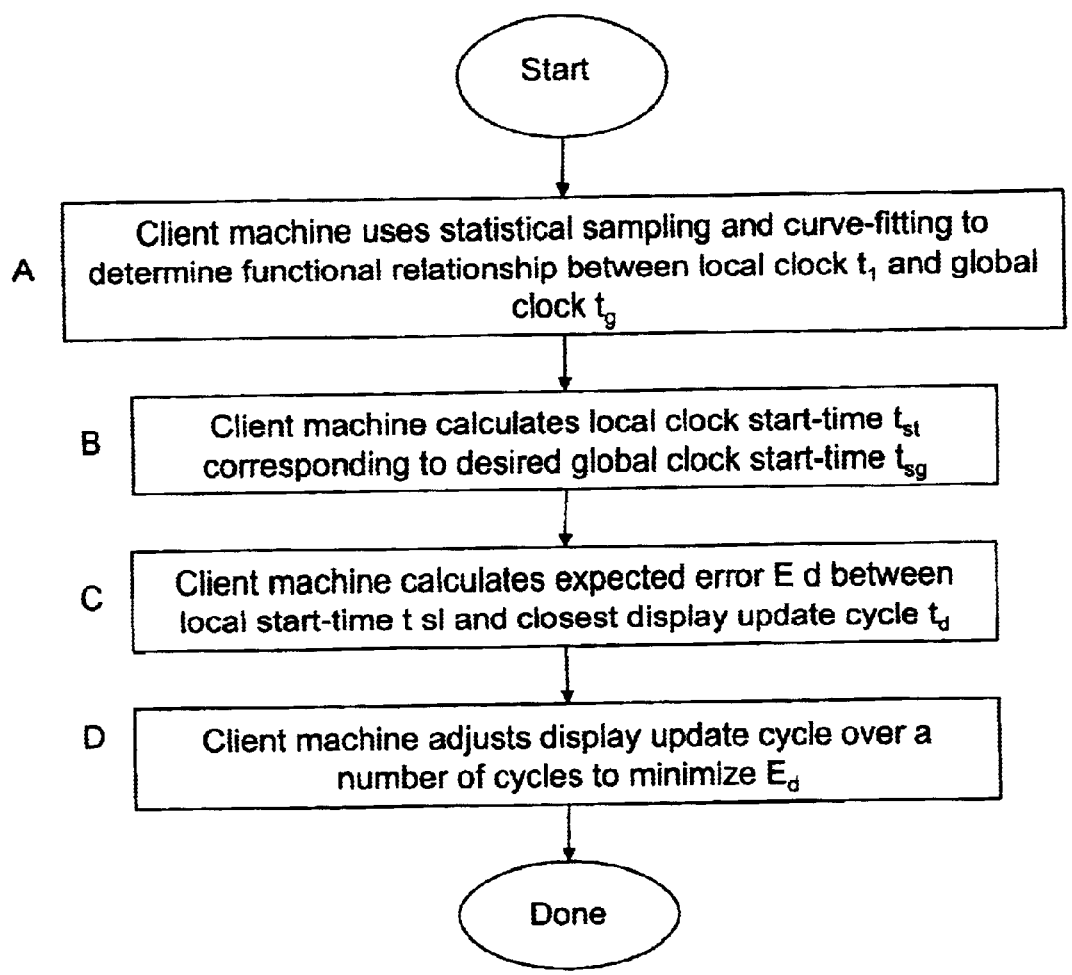
Figure 4D3

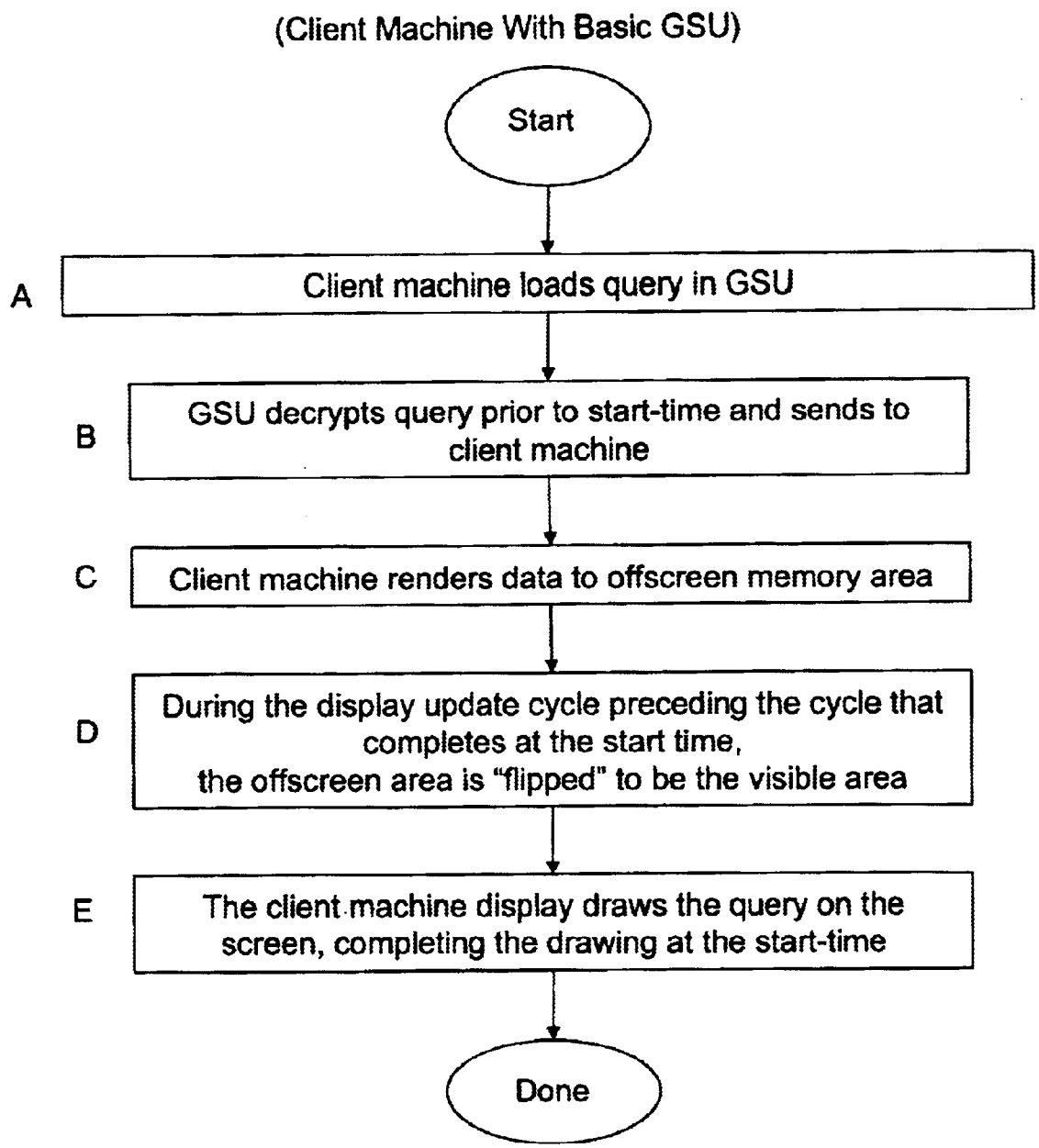
Figure 4E1

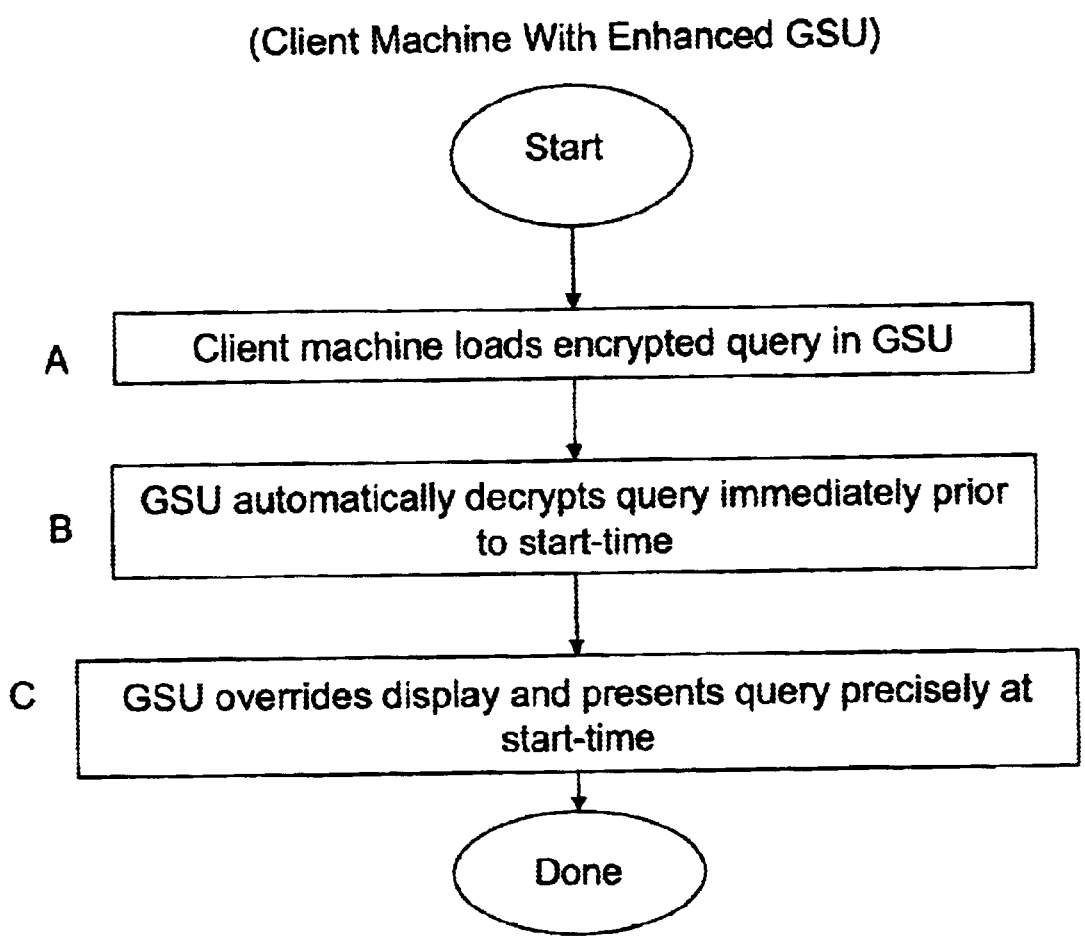
Figure 4E2

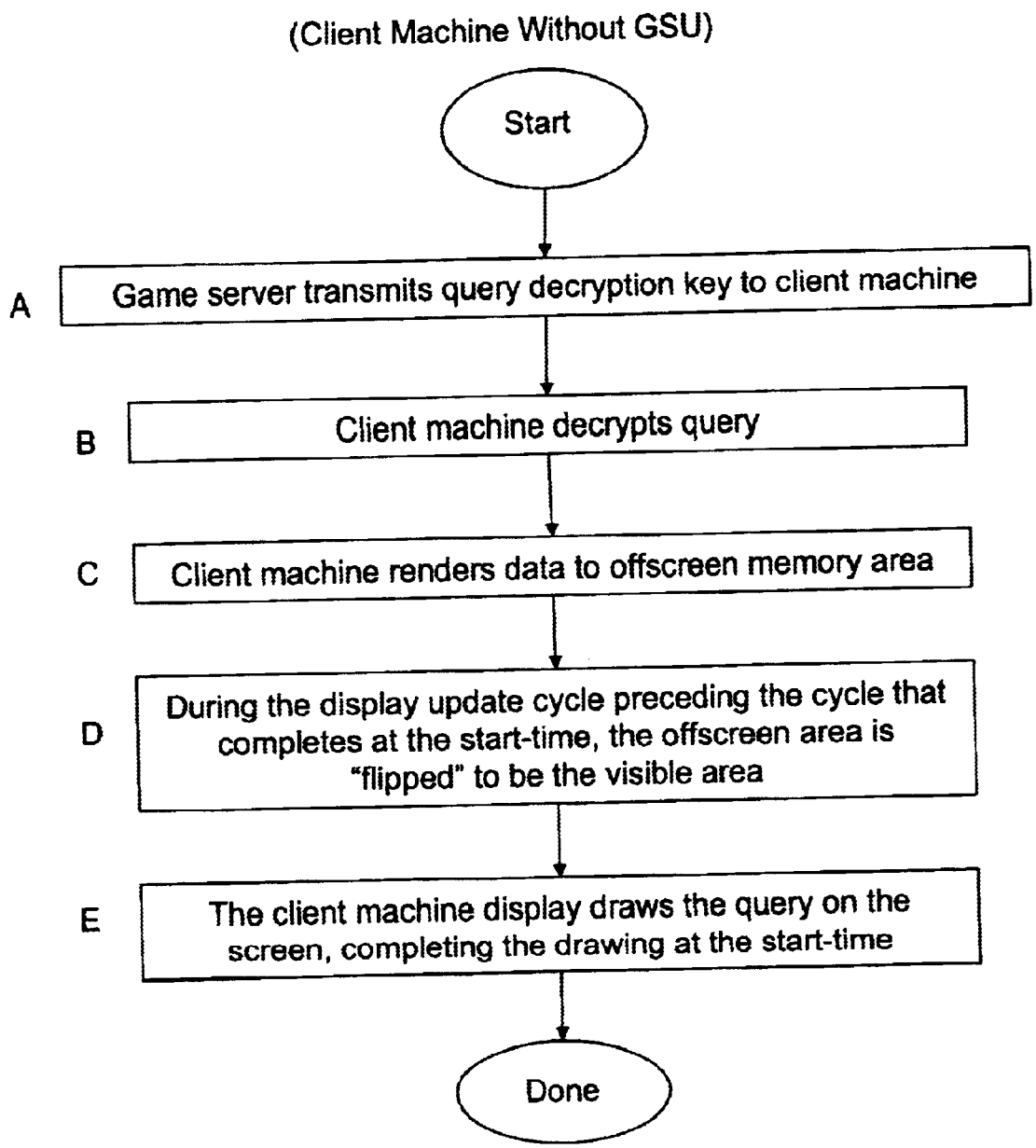
Figure 4E3

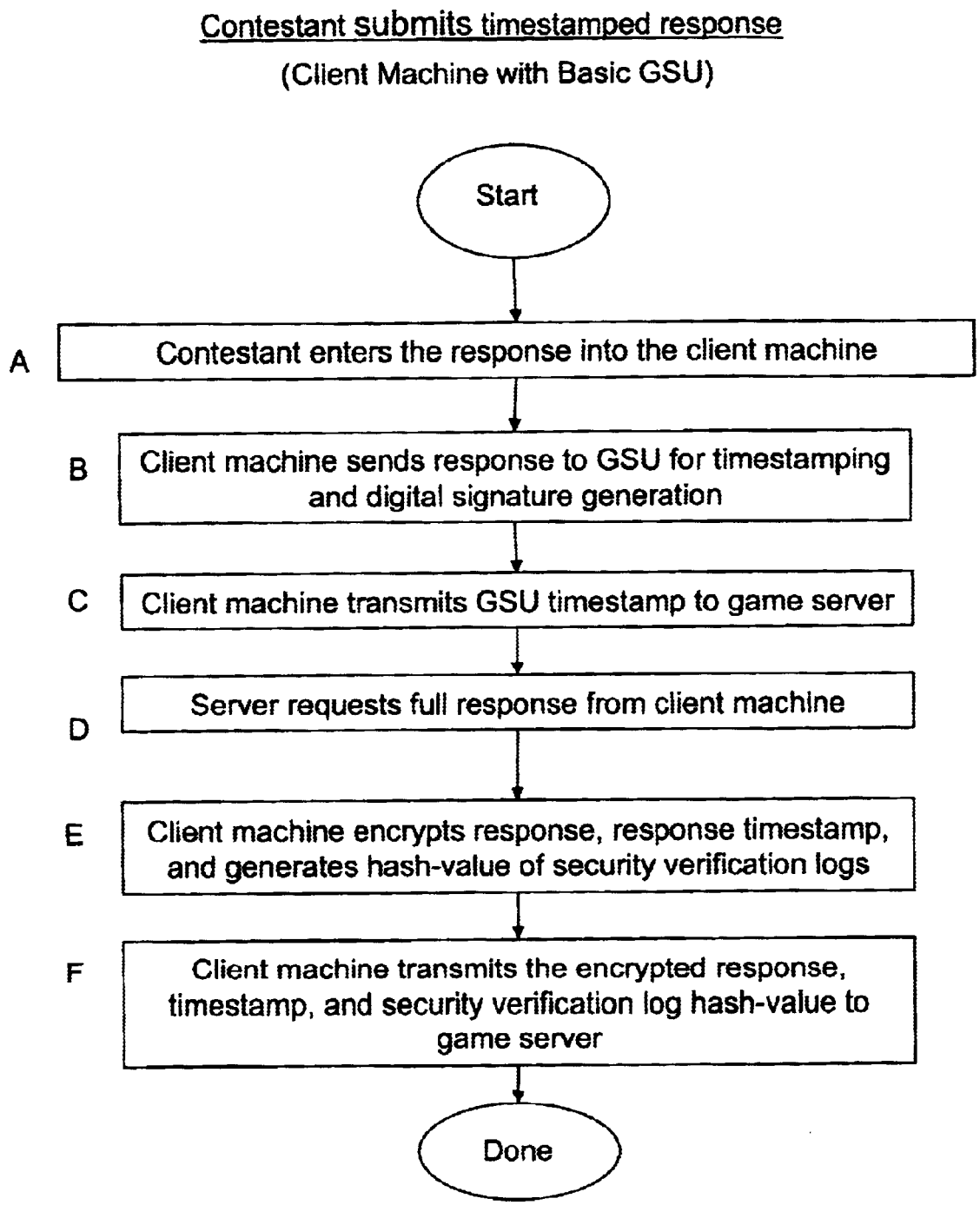
Figure 4F1

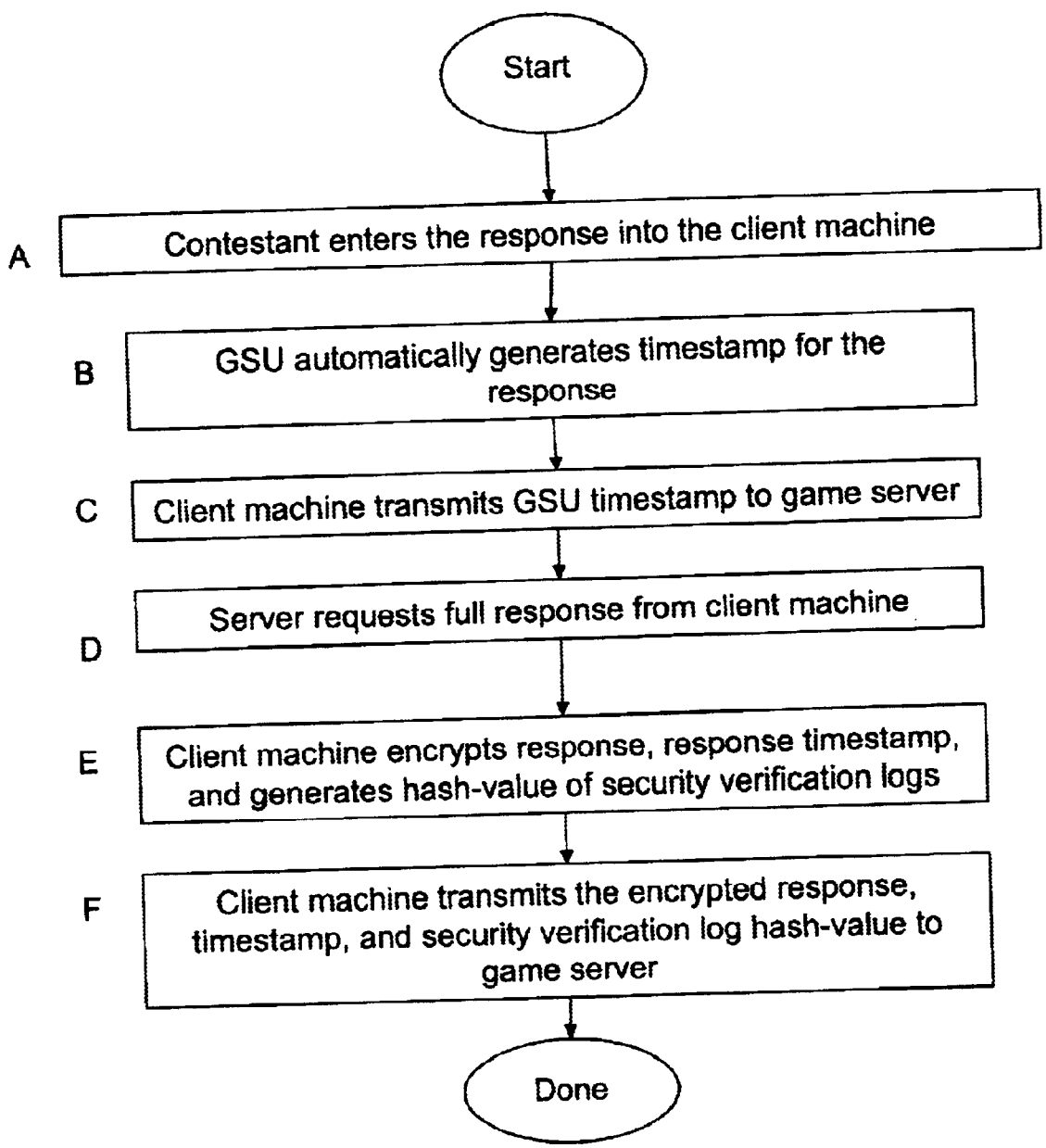
Figure 4F2

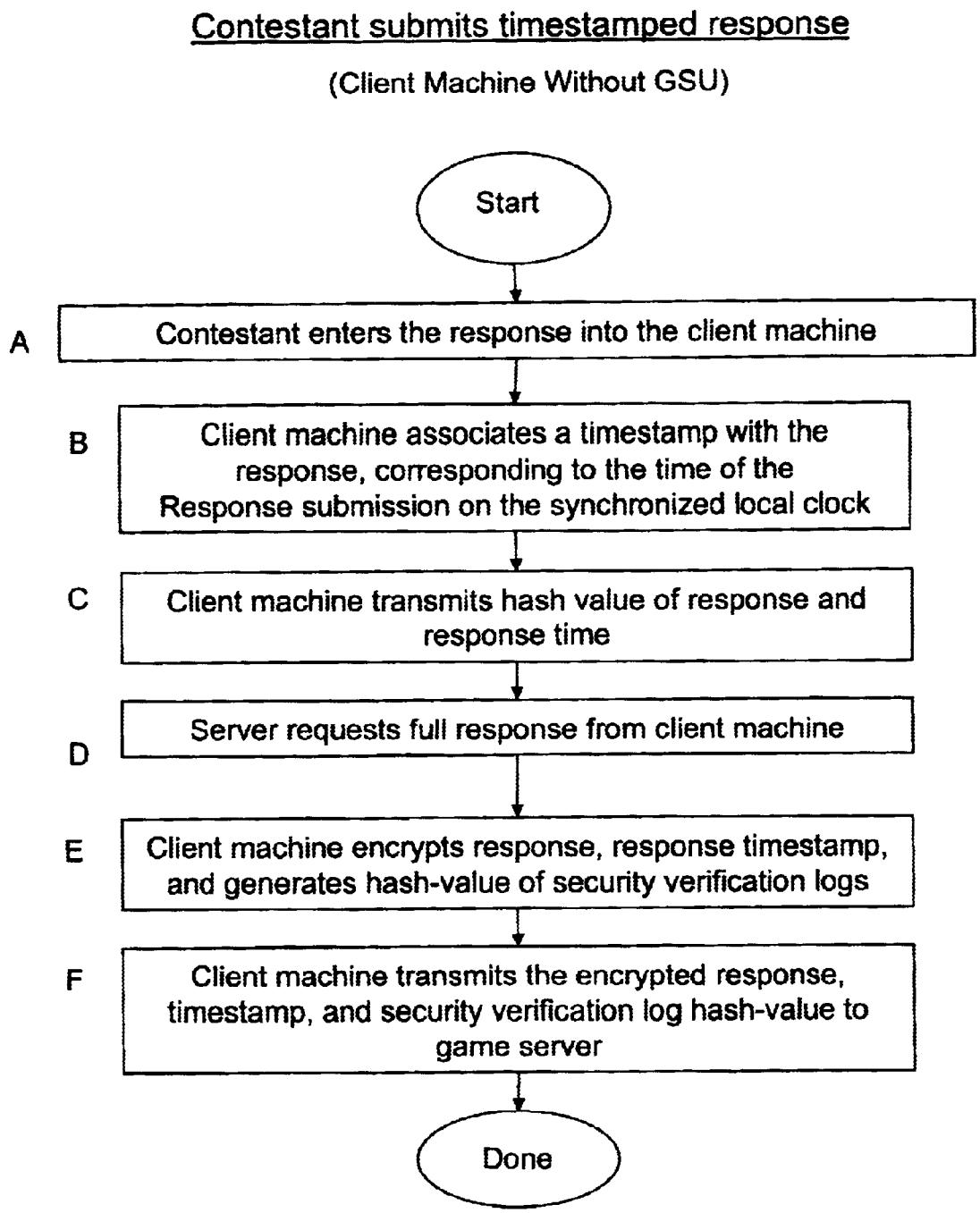
Figure 4F3

Embedded GSU Applications

Handheld
Computer

Digital
Camera

Scanner

Bar Code
Scanner

Police
Radar

Peripheral GSU Configurations

PCMCIA

RS232/USB

ISA/PCI/SCSI

INTERNET-BASED SYSTEM FOR ENABLING A TIME-CONSTRAINED COMPETITION AMONG A PLURALITY OF PARTICIPANTS OVER THE INTERNET

RELATED CASES

This Application is a Continuation of U.S. patent application Ser. No. 09/258,573 entitled "Internet-Based System And Method For Fairly And Securely Enabling Time-Constrained Competition Using Globally Time-Synchronized Client Subsystems And Information Servers Having Microsecond Client-Event Resolution" filed Feb. 26, 1999, said Application being assigned to Reveo, Inc. and incorporated herein by reference in its entirety.

BACKGROUND OF INVENTION

1. Field of Invention

The present invention relates generally to improvements in the operation and performance of client-server type internetworked computer systems of global extent, such as the Internet, and more particularly to a novel Internet-based information system and method which enables a millions of timed-constrained competitions, contests or transactions, among the mass population in a fundamentally fair and secure manner, using globally time-synchronized client subsystems and information servers having client-event resolution with extreme accuracy independent of variable network latency.

2. Brief Description of the State of the Art

While the role of cooperation has a secure place in the history of mankind, so too does the role of competition. Few will disagree that, over the course of time, human beings have competed in widely diverse ways for both tangible and intangible objects of need and desire. Such objects of need or desire have included: food; shelter; land; rewards, prizes, natural resources; sexual partners; fame; fortune; diversion or recreation such as sport; and ultimately, survival.

While the nature of man appears to not have changed fundamentally over the course of time, it is clear that his choice of tools and weapons have changed in step with his increase in technological skill and knowledge.

For example, in the late 1960's, the globally-extensive information infrastructure, now referred to as the Internet, was developed by the United States Government as a tool for national defense and survival in world of intense global competition and military struggle. Ironically, some thirty years later, with the technological development of the HyperText Transport Protocol (HTTP), the HyperText Markup Language (HTML), and the Domain Name System (DNS), a globally-extensive hyper-linked database referred to as the World Wide Web (WWW) has quickly evolved upon the infrastructure of the Internet. By virtue of the WWW, billions and even trillions of information resources, located on millions of computing systems at different locations on Earth, have been linked in unspeakably complex ways serving the needs and desires of millions of information resource users under the domains .net, .edu, .gov, .org, .com, .mil, etc. of the DNS.

The overnight popularity and success of the WWW can be attributed to the development of GUI-based WWW browser programs which enable virtually any human being to access a particular information resource (e.g. HTML-encoded document) on the WWW by simply entering its Uniform Resource Locator (URL) into the WWW browser and allowing the HTTP to access the document from its hosting WWW information server and transport the document to the WWW browser for display and interaction. The development of massive WWW search engines and directory services has simplified finding needed or desired information resources using GUI-enabled WWW browsers.

Without question, a direct consequence of the WWW, the GUI-based WWW browser and underlying infrastructure of the Internet (e.g. high-speed IP hubs, routers, and switches) has been to provide human beings world over with a new set of information-related tools that can be used in ever expanding forms of human collaboration, cooperation, and competition alike.

Over the past several years, a number of WWW-enabled applications have been developed, wherein human beings engage in either a cooperative or competitive activity that is constrained or otherwise conditioned on the variable time. Recent examples of on-line or Web-enabled forms of time-constrained competition include: on-line or Internet-enabled purchase or sale of stock, commodities or currency by customers located at geographically different locations, under time-varying market conditions; on-line or Internet-enabled auctioning of property involving competitive price bidding among numerous bidders located at geographically different locations; and on-line or Internet-enabled competitions among multiple competitors who are required to answer a question or solve a puzzle or problem under the time constraints of a clock, for a prize and/or an award.

In each of the above Internet-supported applications or processes, there currently exists an inherent unfairness among the competitors due to at least six important factors, namely: (1) the variable latency of (or delay in) data packet transmission over the Internet, dependent on the type of connection each client subsystem has to the Internet infrastructure; (2) the variable latency of data packet transmission over the Internet, dependent on the volume of congestion encountered by the data packets transmitted from a particular client machine; (3) the vulnerability of these applications to security breaches, tampering, and other forms of manipulation by computer and network hackers; (4) the latency of information display device used in client subsystems connected to the Internet; (5) the latency of information input device used in client subsystems connected to the Internet; and (6) the latency of the central processing unit (CPU) used in the client machine.

Regarding the first unfairness factor, it is important to point out that the network latency over the Internet varies over the course of the day and in response to network usage. Expressed differently, the time for a transmitted data packet to travel between a first client computer to a particular information server on the Internet will be different from the time for a transmitted data packet to travel between a second client computer to the same information server on the Internet. This time variance in the network latency on the Internet, referred to as the "variable network latency", must necessarily be modeled a non-deterministic process subject to the laws and principles of random (e.g. stochastic) processes. This has a number of important consequences for Internet-supported forms of time-constrained competition.

For example, in connection with Internet-supported competitions (e.g. games) involving a plurality of competitors or competitors, U.S. Pat. No. 5,820,463 attempts to compensate for network latency by measuring the average latency between all the client machines and then inserting intentional communication delays to make the average overall latency the same for all communications links. However, while this system equalizes the communication latency on average, it is wholly incapable of compensating for the random components of network latency (i.e. variable network latency) of the Internet. Consequently, even when practicing the methods disclosed in U.S. Pat. No. 5,820,463, the variable network latency of the Internet nevertheless. introduces inherent sources of error into time-constrained competitions, thereby putting certain competitors at an unfair disadvantage, i.e. by virtue of their client computer connection to the Internet in relation to the information server supporting the time-constrained competition.

Regarding the second unfairness factor, it is important to point out that when Internet-supported competition among a small number of competitor (e.g. 100 or less), the network latency should not be greatly affected by the competitors themselves, but rather will be more dependent on the types of connections the competitor's client machines have with the Internet and on network traffic and congestion as a whole. However, during Internet-supported competition involving massive numbers of competitors, as would exist during Web-based securities and commodities trading, and Web-based auctions, involving thousands or even millions of human beings all competing simultaneously. Because of the simultaneous start time and the expected distribution of responses, the system will be subject to two intense impulses of traffic, one slightly before the competition start, and another at the mean response time. It is necessary for the time-constrained competition system to be able to adequately handle this intense bandwidth.

As larger and larger numbers of competitors are involved in a time-constrained competition, it becomes more and more likely that there will be a tie between two or more competitors. Typically, it is preferable to avoid ties and be able to identify a single competitor as the winner. A time-constrained competition system intended to manage extremely large numbers of competitor must be able to resolve the time of the responses produced by such competitors in order to avoid or reduce the occurrence of ties.

Regarding the third unfairness factor, it is important to point out that each of the above-described time-constrained forms of Internet-supported competition are highly vulnerable to security breaches, tampering, and other forms of intentional network disruption by computer and network hackers. Although the use of a local clock insures fairness, it also raises a potential security problem with the system. Theoretically, an unscrupulous competitor could intercept and modify communications between the client and server, thereby falsifying the timestamps and gaining an unfair advantage over other competitors. Alternatively, an unscrupulous competitor could modify the local clock, either through software or hardware means, or interfere with the clock synchronization procedure, again gaining an unfair advantage over other competitors. The ordinary encryption/decryption techniques suggested in U.S. Pat. No. 5,820,463 are simply inadequate to prevent cheating or violation of underlying rules of fairness associated with such time-constrained forms of Internet-supported or Internet-enabled competition.

Regarding the fourth unfairness factor, it is important to point out that different types of information display devices have faster refresh rates. In the time-constrained competitions described above, the most common information display device used on client subsystems is the cathode ray tube (CRT) display monitor. In a CRT display monitor, the images presented to the user are drawn by an electron beam onto the screen from top to bottom, one scanline at a time. When the electron beam reaches the bottom, it must then travel back to the top of the monitor in order to prepare to output the first scanline again. The period in which the beam returns to the top of the screen is known as the retrace period. The overall frequency of the screen refreshing and retrace cycle is determined by the frequency of the vertical synchronization pulses in the video signal output by the computer. This frequency is often referred to as the vertical sync rate. In most monitors this rate ranges from 60 to 150 Hz. Unless the vertical redraw time is synchronized with the desired competition "start-time" in time-constrained competition at hand, a random error in the start time is created due to the uncertainty of the actual time the query, bid, price or other information element will be displayed on the display screen of a particular client system used to participate in the time-constrained competition at hand. This "information display latency" error can be as much as ten milliseconds or more depending on the vertical sync rate, and is in addition to any other errors in the start-time caused by network latency, computer processing time, and other factors.

U.S. Pat. 5,775,996 addresses the problem of information display latency by providing a method and apparatus for synchronizing the video display refresh cycles on multiple machines connected to an information network. This method involves using methods similar to NTP (network timekeeping protocol) or other clock synchronization algorithms in order to synchronize both the phase and frequency of the vertical-refresh cycle on each display. First, the monitors are set to the same frequency using standard video mode setting functions available in the operating system. Next, the phase of the cycle is adjusted by repeatedly switching in and out of "interlaced" mode. Since the interlaced modes have different timings than the standard modes, switching briefly into an interlaced mode will affect the phase of the refresh cycle.

This prior art method has a drawback in that it may be undesirable to modify the refresh rate on a competitor's client machine, since that is in part a personal preference, and typically under the control of the user. All the client machine video-driver cards may not be physically capable of operating at the same refresh rates, particularly if they are not operating at the same resolution. Also, the monitors themselves may not be capable of operating at a particular refresh rate, and it may be necessary to operate at an undesirable "lowest common denominator" frequency, or not at all. This problem is compounded as more users and client machines are involved. Another problem with this prior art display synchronization method is that interlaced video modes are not possible on all video driver cards. In addition, switching into interlaced modes may temporarily disrupt the display as the monitor adjusts to handle the new input. Many display monitors will produce an annoying clicking noise as the video mode is changed.

Regarding the fifth "unfairness factor", it must be pointed out that different types of information input devices have faster information input rates. In the time-constrained competitions described above, the most common information input device used on today's client subsystems is the manually-actuated keyboard. In response to manual keystrokes by the competitor at his or her client machine, and electronic scanning operations, the keyboard generates a string of ASCII characters that are provided as input to the client system bus and eventually read by the CPU in the client machine. Only when the desired information string is typed into the client machine, and the keyboard return key depressed, will the keyed-in information string be transmitted to the information server associated with the time-constrained competition. Those with physical handicaps, and those using low-speed information input devices, will have their responses, commands and/or instructions transmitted with greater latency, and therefore arriving at the information server at a later time, assuming all other factors maintained constant for all competitors. In short, depending on the type of input device used, a competitor participating in an Internet-supported time-constrained competition can be put at a serious disadvantage in comparison with those using high-speed information input devices and high-speed processors. When competing against androidal competition (e.g. thinking machines), as currently used in electronic-based securities and commodity trading, and electronic-based auctions, human competitors are placed at a great disadvantage in rapidly changing markets and fast-paced auctions.

Regarding the sixth unfairness factor, it must be pointed out that a further source of latency exists within each client machine due to the fact that the central processor unit (CPU) employed therein: services interrupts posted by competing peripheral devices connected to the client system bus; executes program instructions at a rate set by its clock speed; and has limited memory resources available at any instant in time. These factors operate to further add a degree of delay in when the data packets associated with the competitor's response is transmitted to the information server supporting the time-constrained competition. Notably, the longer this "processor latency" is, the latter the competitor's response will arrive at the information server supporting the time-constrained competition.

Consequently, the six "unfairness" factors discussed above compromises the integrity any form of time-constrained competition supported on or otherwise enabled over the Internet. Thus must be satisfactorily resolved in order ensure fundamental principles of fairness and fair play that have come to characterize the systems of government, justice, securities, commodities and currency market trading, sportsmanship, and educational testing, in the United States of America and abroad.

Thus there is a great need in the art for an improved way and means of fairly and securely enabling timed-constrained competitions for high stakes among millions of competitors scattered around the globe, while avoiding the shortcomings and drawbacks of prior art methodologies including.

OBJECTS AND SUMMARY OF THE INVENTION

Accordingly, a primary object of the present invention is to provide an improved system and method of fairly and securely enabling timed-constrained competitions over the Internet while avoiding the shortcomings and drawbacks of prior art methodologies.

A further object of the present invention is to provide a novel system and method of serving and receiving information over the Internet in connection with time-constrained competitive processes so that principles of fairness and fair play which have come to characterize the systems of government, justice, securities, commodities and currency market trading, sportsmanship, and educational testing, in the United States of America and countries abroad, are secured in an economically feasible manner for the betterment of human society.

A further object of the present invention is to provide a novel system and method of serving and receiving information over the Internet in connection with time-constrained competitive processes, which avoids the problems of network latency, ensures microsecond "start-time" accuracy, and can determine winners in the competition within microsecond "finish-time" accuracy.

Another object of the present invention is to provide an Internet-based system for enabling time-constrained competition among a massive number of competitors while compensating for the variable network communication latencies experienced by client machines used by the competitors.

Another object of the present invention is to provide an Internet-based system for fairly and securely enabling timed-constrained competitions over the Internet, wherein a simultaneous start-time is produced for each and every competitor involved in a particular competition regulated by the system.

Another object of the present invention is to provide an Internet-based system for fairly and securely enabling timed-constrained competitions using Internet information servers to synchronize the initial display of an invitation to respond (e.g. stock offer, query or problem) on a client machine by shifting the phase of the display refresh cycle.

Another object of the present invention is to provide an Internet-based system for fairly and securely enabling timed-constrained competitions over the Internet, wherein the time delay between a displayed invitation to respond (e.g. stock price, bid offer, or query) and the transmitted response is precisely measured using the Pentium™ instruction counter in the client machine.

Another object of the present invention is to provide an Internet-based system for fairly and securely enabling timed-constrained competitions over the Internet, wherein client-event timing accuracy is markedly improved by using a globally-synchronized hardware timing device at each client machine to time-stamp each competitor's response to an invitation to respond (ITR) displayed on the display screen of the client machine.

Another object of the present invention is to provide an Internet-based system for fairly and securely enabling timed-constrained competitions over the Internet, wherein each client machine deployed therein is protected against intentional tampering through any means by the competitor using the client machine, or by any third party desiring to gain an unfair advantage over other competitors.

Another object of the present invention is to provide an Internet-based system for fairly and securely enabling timed-constrained competitions over the Internet, which employs a digital signature method to protect against intentional tampering through any means by a competitor or third party, either intended to disrupt the operation of the competition and otherwise interfere with the enjoyment of other competitors or spectators.

Another object of the present invention is to provide an Internet-based system for fairly and securely enabling timed-constrained competitions over the Internet, wherein the digital signature method employs a secret key, stored within a global synchronization unit (GSU) in each client machine, in order to create the signature for both time-space stamping and to a hash value generated from the data.

Another object of the present invention is to provide an Internet-based system for fairly and securely enabling timed-constrained competitions over the Internet, wherein the digital signature can be used to prove that the data (i.e. time-space stamp plus a hash of input data) has not been altered, and to prove that it originated from the holder of the secret key (located within the GSU).

Another object of the present invention is to provide an Internet-based system for fairly and securely enabling timed-constrained competitions over the Internet, wherein each client machine employs a GSU, which combines GPS and digital data signature technology to provide a secure and verifiable time-space stamp on each client machine response.

Another object of the present invention is to provide an Internet-based system for fairly and securely enabling timed-constrained competitions over the Internet, which is scalable or extensible and capable of simultaneously supporting a multiplicity of competitions, each involving a virtually unlimited number (e.g. millions) of competitors.

Another object of the present invention is to provide an Internet-based system for fairly and securely enabling timed-constrained competitions over the Internet, which protects against clock device tampering at each client machine by utilizing and comparing multiple clock systems employed in each client machine.

Another object of the present invention is to provide an Internet-based system for fairly and securely enabling timed-constrained competitions over the Internet, wherein each client machine in the system is provided with a client-based hardware extension to improve clock accuracy and precision and therefore improve client-event response characteristics at each such client machine.

Another object of the present invention is to provide an Internet-based system for fairly and securely enabling timed-constrained competitions over the Internet, wherein each client machine in the system is provided with a client-based hardware extension to improve security by means of hardware encryption and decryption.

Another object of the present invention is to provide an Internet-based system for fairly and securely enabling timed-constrained competitions over the Internet, wherein varying degrees of simultaneity can be offered, insuring that the start time on all client machines is simultaneous within tens of milliseconds at the least precise level, to on the order of within a few microseconds when all of the measures provided for are used.

Another object of the present invention is to provide an Internet-based system for fairly and securely enabling timed-constrained competitions over the Internet, wherein one or more a globally-time synchronized Internet-based information servers simultaneously and securely communicate with millions of globally-time synchronized client machines engaged in a predetermined competition supported over the Internet.

Another object of the present invention is to provide an Internet-based method for fairly and securely enabling timed-constrained competitions over the Internet, wherein one or more a globally-time synchronized Internet-based information servers simultaneously and securely communicate with millions of globally-time synchronized client machines engaged in a predetermined competition supported over the Internet.

Another object of the present invention to provide an Internet-based system, wherein each client machine is provided with a hardware device which can precisely time and space stamp an event, and thus securely generate an event only when specific time and space criteria are satisfied, and also verify the authenticity of previously generated time and space stamps produced by the hardware device.

Another object of the present invention is to provide a novel method of time-space stamping which can be used to authenticate electronic-commerce transactions between a vendor, bank and customer with microsecond time accuracy.

Another object of the present invention is to provide a novel system and method for electronically filing legal documents, such as patent applications, property transfer documents and court/litigation documents, with governmental or judicial institutions using the http, file transfer protocols (ftp), electronic data interchange (EDI) techniques, and/or any other file transmission protocols supported over the Internet.

Another object of the present invention is to provide a novel global time-synchronization unit for connection to or embedding within any client machine that is to be used in connection with the Internet-supported system and method of the present invention.

Another object of the present invention is to provide a novel global time-synchronization unit for connection to or embedding within any Internet information server that is to be used in connection with the Internet-supported system and method of the present invention.

Another object of the present invention is to provide an improved system and method of receiving information from securities (e.g. stocks and bonds), commodities and/or foreign currency information servers, representing real-time or "live" market conditions, and simultaneously disseminating such information to globally-synchronized client machines located world-wide to enable secure "on-line" electronic-based securities trading operations, commodities trading operations, and foreign currency trading operations in a fundamentally fair manner.

Another object of the present invention is to provide an improved system and method for electronic-based on-line securities trading, commodities trading, and foreign currency trading in a secure and fundamentally fair manner using client machines globally-synchronized with corresponding Internet-based securities trading servers, commodities trading servers, and foreign currency trading servers, respectively, so that each market competitor is informed about incremental changes in market conditions at substantially the same time and therefore is permitted to respond to such market condition changes (e.g. changes in stock, commodity or currency prices) at substantially the same time in accordance with principles of fundamental fairness and fair play.

Another object of the present invention is to provide an improved system and method of simultaneously disseminating securities, commodities, and/or foreign currency information (e.g. real-time price quotes) using globally time-synchronized information servers and client machines.

Another object of the present invention is to provide an Internet-based system and method which enables competitors to trade securities, commodities and/or foreign currencies using real-time pricing information that is disseminated to all competitors of a given level of service at substantially the same instant in time using a network of globally time-synchronized information servers and client machines.

Another object of the present invention is to provide an Internet-based information network, wherein competition supporting information servers (e.g. market price advertising servers and order execution servers) are time-synchronized with a plurality of globally-distributed time-synchronized client machines that can be preprogrammed so respond to real-time securities prices within micro-second client event accuracy by transmitting time and space stamped orders to purchase and/or sell securities, commodities and/or foreign currencies.

These and other objects of the present invention will become apparent hereinafter and in the Claims to Invention.

BRIEF DESCRIPTION OF THE DRAWINGS

In order to more fully appreciate the objects of the present invention, the detailed description of the illustrated embodiments should be read in conjunction with the accompanied figures and drawings:

FIG. 2D1 is a schematic representation of a client machine 160 equipped with a GSU 175 and connected through the Internet to a server equipped with a GPS clock unit 170;

FIG. 2D2 is a schematic representation of a basic global synchronization unit (GSU) 175 employed in the system of the present invention, shown comprising a GPS antenna 730, GPS receiver 700, central processor 750, host computer interface 720, GPS disciplined high-frequency clock 710, encryption and decryption module 740, and non-volatile memory 760;

FIG. 2D3 is a schematic representation of some of the major components of a client machine 160 employed in the system of the present invention, shown comprising a global synchronization unit 175 and various hardware and software layers, including client software such as a contest client application 340, contest plug-in 330, and contest hooks and drivers 350;

FIG. 2D4 is a schematic representation of a client machine 160 equipped with an enhanced GSU 177 and connected through the Internet to a server equipped with a GPS clock unit 170, where input and output devices are connected to the client machine 160 through the enhanced GSU 177;

FIG. 2D5 is a schematic representation of an enhanced global synchronization unit (GSU) 177 employed in the system of the present invention, shown comprising a GPS antenna 730, GPS receiver 700, central processor 750, host computer interface 720, GPS disciplined high-frequency clock 710, encryption and decryption module 740, non-volatile memory 760, input device monitor and passthrough module 770, and an output passthrough and signal generation module 780;

FIG. 4 is a flowchart of the high level operations performed by the contest-based system of FIG. 2 so as to enable a contestant to participate in a simultaneous, secure, multi-player timed-constrained contest;

FIG. 4B is a flowchart describing in greater detail a method for the contestant to log on to the game server of FIG. 2;

FIG. 4D1 is a flowchart describing in greater detail a method for characterizing the client machine local clock 290 and synchronizing the client machine display update cycle in connection with a system of the present invention incorporating a basic GSU 175 in the client machine 160;

FIG. 4D2 is, a flowchart describing in greater detail a method for characterizing the client machine local clock 290 and synchronizing the client machine display update cycle in connection with a system incorporating an enhanced GSU 175 in the client machine 160;

FIG. 4D3 is a flowchart describing in greater detail in which a method for characterizing the client machine local clock 290 and synchronizing the client machine display update cycle in connection with a system that does not include a global synchronization unit;

FIG. 4E1 is a flowchart describing in greater detail a method for presenting the query to the contestant at the contest start-time in connection with a system incorporating a basic GSU 175 in the client machine 160;

FIG. 4E2 is a flowchart describing in greater detail a method for presenting the query to the contestant at the contest start-time in connection with a system incorporating an enhanced GSU 175 in the client machine 160;

FIG. 4E3 is a flowchart describing in greater detail a method for presenting the query to the contestant at the contest start-time in connection with a system that does not include a global synchronization unit;

FIG. 4F1 is a flowchart describing in greater detail a method for the contestant to submit a timestamped response to the previously presented query in connection with a system incorporating a basic GSU 175 in the client machine 160;

FIG. 4F2 is a flowchart describing in greater detail a method for the contestant to submit a timestamped response to the previously presented query in connection with a system incorporating an enhanced GSU 175 in the client machine 160;

FIG. 4F3 is a flowchart describing in greater detail a method for the contestant to submit a timestamped response to the previously presented query is outlined for a system that does not include a global synchronization unit;

FIG. 5 is a schematic representation of a financial trading-based embodiment of the system of the present invention, showing the major physical components thereof comprising a primary server 100 equipped with GPS (global positioning system) receiver 170, one or more web servers 110, a login server 120, a trader database 35, a real-time market state server 45, one or more real-time price-quotation and trading (Q & T) servers 55, as well as between each RTPQ&T server and an associated set of client machines 160;

DETAILED DESCRIPTION OF THE ILLUSTRATIVE EMBODIMENTS OF THE PRESENT INVENTION

Figure 1:
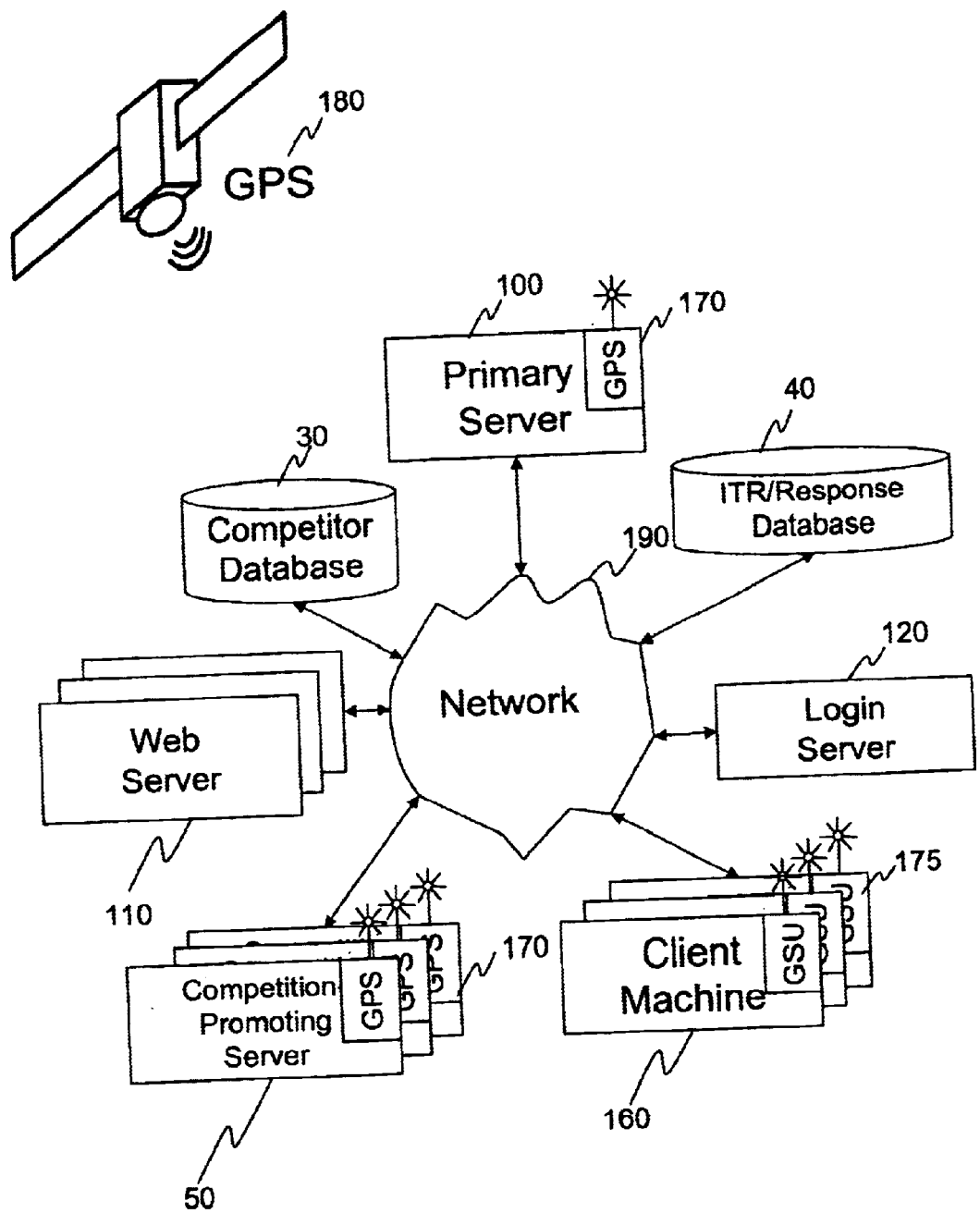
FIG. 1 is a schematic representation of a generalized embodiment of the Internet-based system of the present invention, showing the major physical components thereof comprising a primary server 100 with an embedded GPS (global positioning system) receiver 170, one or more web servers 110, a login server 120, a competitor database 30, an invitation to respond/response database 40, one or more competition-promoting servers 50 with embedded GPS receivers 170, and one or more client machines 160 with embedded Global Synchronization Units (GSU) 175, all components being interconnected with a globally-extensive network (e.g. the Internet) 190.

Referring to the figures in the accompanying Drawings, the preferred embodiments of competition-enabling (i.e. competition-promoting) system and method of the present invention will now be described in great detail, wherein like elements will be indicated using like reference numerals.

In FIG. 1, a generalized internetworked-based competition-promoting system is shown for fairly and securely enabling one or more time-constrained competitions among a plurality of competitors simultaneously presented with the same set of data (i.e. in a globally time-synchronized manner) which, in general, may be informative or may take the form of a question to be answered, or a problem, puzzle or riddle to be solved. Hereinafter, this data shall be referred to as an Invitation-to-Respond, or ITR, which is transmitted to each of the competitors participating in the competition promoted by the system hereof in a regulated manner. In general, the competitors can be human beings, programmed computers, or sophisticated androidal machines as taught, for example, in WIPO International Publication No. WO 98/49629 published on Nov. 5, 1998 incorporated herein by reference. In response to each ITR presented to the competitors, each competitor is allowed to respond to the ITR by submitting an appropriate response or undertaking a particular action. In accordance with the principles of the present invention, the timing of each competitor's response is critical to ensuring fairness in the competitive activity in question, and thus precisely measured, securely recorded and analyzed in a manner which will be described in greater detail hereinafter.

In general, the competition-promoting system and method of the present invention can be applied to a variety of different competitive activities with only slight modifications required from embodiment to embodiment of the present invention. Typical applications of the present invention include multi-player timed problem-solving games, puzzles, or contests; on-line real-time auctions, on-line real-time trading of securities (e.g. stocks and bonds), commodities, and foreign currencies; on-line real-time auctions; on-line educational testing; on-line career testing; on-line aptitude testing; on-line intelligence quotient (IQ) testing; and other real-time activities wherein simultaneous presentation of information to a plurality of competitive entities or accurate presentation of IRQs to and collection of responses thereto from one or more human subjects, is critical to the competitive or otherwise time-constrained activity at hand, in order to ensure fundamental principles of fairness and fair play expected by participants, spectators, and sponsors alike. As used hereinafter and in the Claims to Invention, the term "competition" shall be understood to embrace all such network-enabled activities.

Overview of the Generalized Embodiment of the System of the Present Invention As shown in FIG. 1, the competition-promoting system of the present invention comprises an integration of subcomnponents, such as for example: a primary server 100; one or more web servers 110; a login server 120; a competitor database 30; an Invitation-To-Respond/Response (ITR/Response) database 40; one or more competition-promoting servers 50; and a plurality of client machines 160. As shown in FIG. 1, each client machine 160 includes a global synchronization unit 175 (GSU), whereas each competition-promoting server 50 includes a standard GPS receiver 170. As shown in FIG. 1, the global positioning system employed by the competition-enabling system comprises a plurality of GPS receivers 170 operating in conjunction with an array of GPS satellites 180 occupying a geodesic orbit in a manner well known in the satellite art. All of the computer and database components of the competition-enabling system are interconnected through some sort of internetworked computer communications network 190 such as the Internet.

Overall regulation of the competitive activity enabled by the system and method of the present invention is carried out by a computer or set of computers which hereinafter shall be referred to collectively as the "primary server". The primary server provides certain functionality to the system including, for example: acting as a source of Invitations-to-Respond and other competition related data; providing a master clock for the system; and performing functions or operations involving data received from multiple client machines connected to the system.

In the illustrative embodiments, the single primary server 100 communicates indirectly with the client machines 160 through a number of competition-promoting servers 50. These servers relay Invitations-To-Respond and other data to the client machines 160, and receive responses thereto from those client machines. Preliminary processing and sorting of the client machine responses is performed by the competition-promoting servers 50, and these preprocessed results are then passed back to the primary server 100.

Each competitor interacts with the competition-promoting system through a client machine 160. Each competitor uses a single client machine to receive and view the Invitations-To-Respond (ITR), as well as to enter and transmit the responses thereto. The client machine typically consists of a standard personal computer, augmented by the addition of several software and hardware components, including a global synchronization unit (GSU) 175 constructed in accordance with the principles of the present invention. The global synchronization unit 175 is installed in the client machine to provide precisely time-stamp client-responses, referred to as client-events, traceable to internationally standardized reference clocks. The GSU within each client machine performs decryption operations, generates digitally-signed time and space stamps of various internal and external events at the client machine, and supports timed decryption and presentation of data to the competitor.

As shown in FIG. 1, the last primary computer-based component of the competition promoting system hereof is the login server 120. The primary function of the login server 120 is to accept login requests from each competitor's client machine and assign an appropriate competition-promoting server to that client machine. The login server 120 also provides a single, well-known address for each client machine to use to contact the assigned competition-promoting server when initializing a session in the competitive activity. The login server also serves to intelligently distribute the processing and communications load among the competition-promoting servers.

As shown in FIG. 1, two database systems are used by the competition-promoting system of the present invention. The first database is the competitor database 30 which records information about each competitor, such as his or her identity, preferences, contact information, and any other data deemed necessary for the proper operation of the competition. The second database is the Invitation-to-Respond/Response database 40 which stores or generates Invitations-To-Respond (ITRs) appropriate to the particular competition being promoted, and transmits those ITR's to the client machine, through the other servers in the system. The ITR/Response database 40 may also contain canonical responses for comparison with the actual responses generated by the competitors, as well as other information necessary for the conducting of the competition.

The final component of system shown in FIG. 1 which deserves mention is the communications network 190. In general, the communications supported by the communications network 190 could be carried out using a variety of different communications methods. In general, each computer or device in the system will establish a connection or connections to one or more of the other computers through the network 190. In practice, these connections will be "virtual" connections through a general network such as the Internet, rather than as a direct point-to-point physical connection. In the illustrative embodiments disclosed herein, the communications network 190 is a packet-switched data communications network running the popular Transmission Control Protocol/Internet Protocol (TCP/IP). Thus each server computer connected to the communications network 190 will have a statically assigned IP address, while each client machine connected thereto will have either a statically or dynamically assigned IP address in a manner well known in the art.

Contest-Enabling System and Method of the Present Invention

Referring to FIGS. 2 through 4G, a contest-supporting (i.e. contest-enabling) system and method will now be described in accordance with the principles of the present invention.

In this particular embodiment of the present invention, the primary goal of the Internet-based system and method is to enable thousands and even millions of contestants to participate in a multi-player internetworked problem-solving contest that is regulated in a secure and fundamentally fair manner. In general, the contest will involve a mass population of players, or contestants who simultaneously attempt to solve some problem or set of problems in a time-constrained manner. The contestants are evaluated and ranked according to the solution provided as well as the time taken to submit the solution. Each contestant in the contest will interface to the contest process through a client machine capable of displaying images, text, video, play audio streams in a globally time-synchronized manner, or is otherwise provided with some other means for presenting a question or problem to the contestant in a like manner in accordance with the principles of the present invention. The question or problems thus presented to each competitor will be referred to as a query, although, in a more general sense of the present invention, can be understood as an Invitation-To-Respond (ITR), as discussed hereinabove. Each client machine also accepts an answer or solution from the contestant as response to the query previously presented. The contestant's answer or solution will be referred to as the response, as in the general sense of the present invention. Therefore, each client machine in the contest-supporting system hereof is a device that presents (e.g. visually and/or audibly displays) queries and accepts responses from one registered contestant who is participating in the contest.

The contest-promoting system of the present invention also includes a means for controlling and measuring certain time-based elements of the contest (i.e. competition). For example, such elements include the ability to specify the precise instant at which a query is presented to the contestants on all or some subset of the client machines. Hereinafter, this instant of time shall be referred to as the "start-time", analogous to the "start-line" in a race, which is the same for each contestant in accordance with the principles of the present invention. In addition, the contest-promoting system of the present invention also includes means for precisely determining the length of time between the start-time and the instant each contestant submits its response which, hereinafter, shall be referred to as the "finish-time" analogous to the "finish-line" in the race. Hereinafter, this length of time, measured between the start-time and the finish-time, shall be referred to as the "response-time" of the particular contestant or competitor.

The contest-promoting system and method of the present invention enables the simultaneous presentation of queries (i.e. ITRs) to each and every client machine registered to compete in the contest at hand. Unlike the prior art method of using the receipt of a query decryption key to trigger the display process at each client machine, as disclosed in U.S. Pat. No. 5,695,400, the present invention teaches the use of a local clock to determine the exact instant to display the query (i.e. ITR) to the contestant. In the illustrative embodiment of the present invention, the local clock is contained in an embedded or peripheral device known as the global synchronization unit (GSU) 175. The GSU at each client machine incorporates a global positioning system (GPS) receiver to provide a precise timing reference that is accurate to within 1 microsecond of international atomic clock standard time. The GSU can be programmed to decode and present the query (i.e. ITR) in a secure manner at the precise moment desired. In an alternative embodiment of the present invention, a similar functionality can be provided at each client machine, but at lower precision and security levels by using a standard timer, counter, or clock on the client machine. In this alternative, less accurate timing method, the local clock is characterized, or analyzed to determine the functional relationship between the local clock time and the global time as determined by a single master clock for the entire contest system. Using this function, the global time may be determined from the local clock reading. In addition, the display update cycle on each client machine is skewed so that a display update completes exactly at the desired "start time" which is determined to be the same for each every contestant, regardless of their location on the planet. Characterization of the local clock may be performed using an accurate clock (perhaps GPS-based) connected to the client machine, or it may be done using security enhanced versions of the methods and algorithms used in NTP, the network time protocol.

The contest-promoting system and method of the present invention also provides extensive security measures to detect and discourage cheating by dishonest players. Security is crucial in large contests involving significant rewards for winners. Security for the system is provided through the use of encryption of the majority of messages between the various computers in the system, as well as by monitoring and logging the contest-related activities of participating client machines. Additional details regarding this aspect of the system will be described hereinafter.

Having provided an overview on the contest-promoting system of the present invention, it is appropriate to now describe in greater detail the structure and function of the components of this system.

Figure 2:
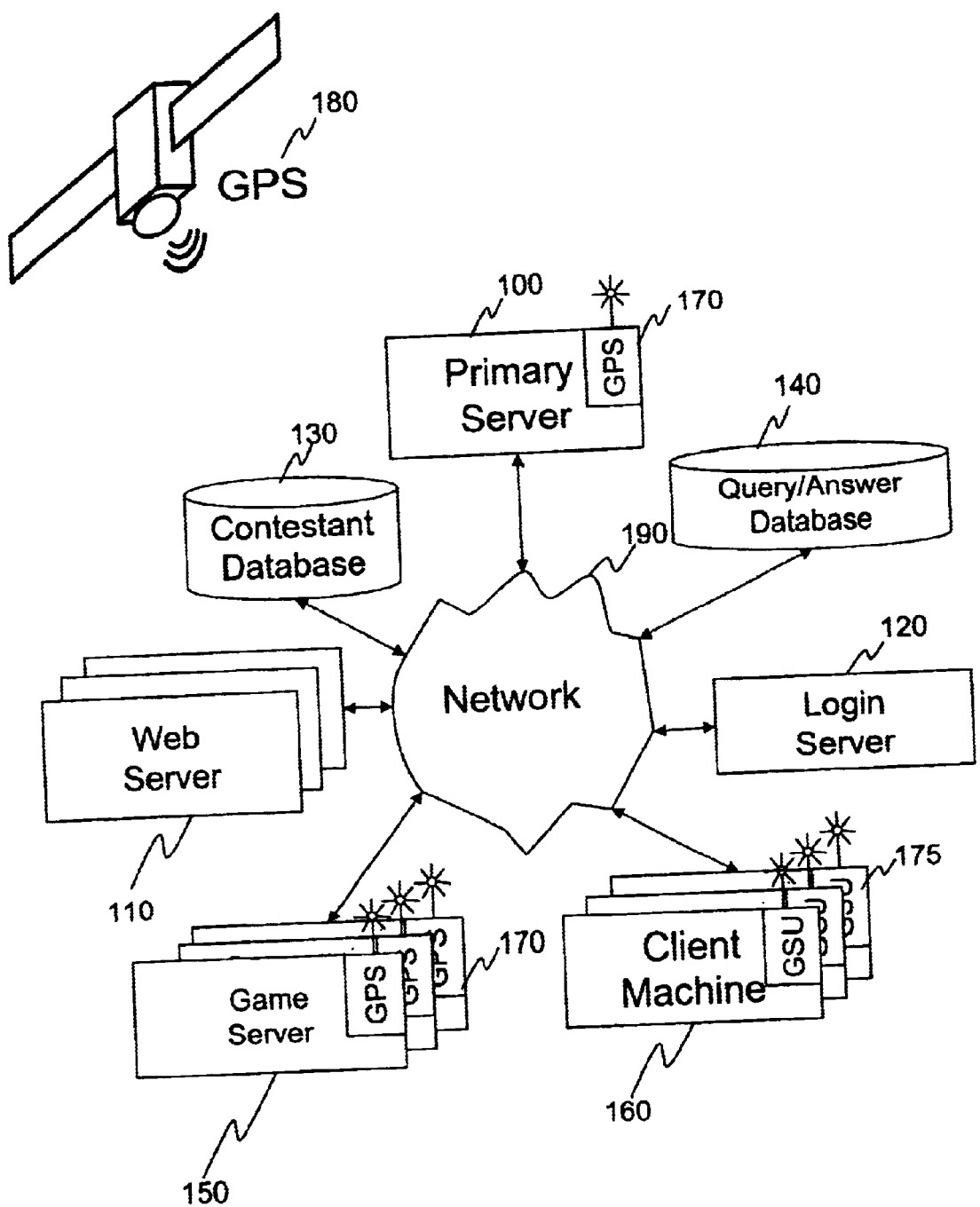
FIG. 2 is a schematic representation of a contest-based embodiment of the system of the present invention, showing the major physical components thereof comprising a primary server 100 with embedded GPS (global positioning system) receiver 170, one or more web servers 110, a login server 120, a contestant database 130, an query/answer database 140, one or more game servers 150 with embedded GPS receivers 170, and one or more client machines 160 with embedded Global Synchronization Units (GSU) 175, all components being interconnected with a network 190.

As shown in FIG. 2, the contest-promoting system of the illustrative embodiment comprises an integration of components, namely: a primary server 100; one or more web servers 110; a login server 120; a contestant database 130; a query/answer database 140; one or more game servers 150; and a plurality of client machines 160. As shown in FIG. 2, each client machine is equipped with a global synchronization unit 175 (GSU), whereas the primary server 100 and each game server 150 is equipped with a standard GPS receiver 170. As shown, the contest-promoting system of the illustrative embodiment employs a global positioning system comprising GPS receivers 170 operating in conjunction with an array of GPS satellites 180 occupying a geodesic orbit in a manner well known in the satellite art. All of the computer and database components of the system are interconnected through some sort of communications network 190 such as the Internet, supporting a networking protocol such as TCP/IP.

Overall regulation of the contest activity enabled by the system and method of the present invention is carried out by a computer or set of computers which hereinafter shall be referred to collectively as the "primary server". The primary server provides certain functionalities to the system including, for example: acting as a source of queries and their correct answers; providing a master clock for the system; determining the overall ranking of contestants; selecting the winner of the contest.; and informing the contestants and possibly the general public of the identity of the wining contestant.

Figure 2A:
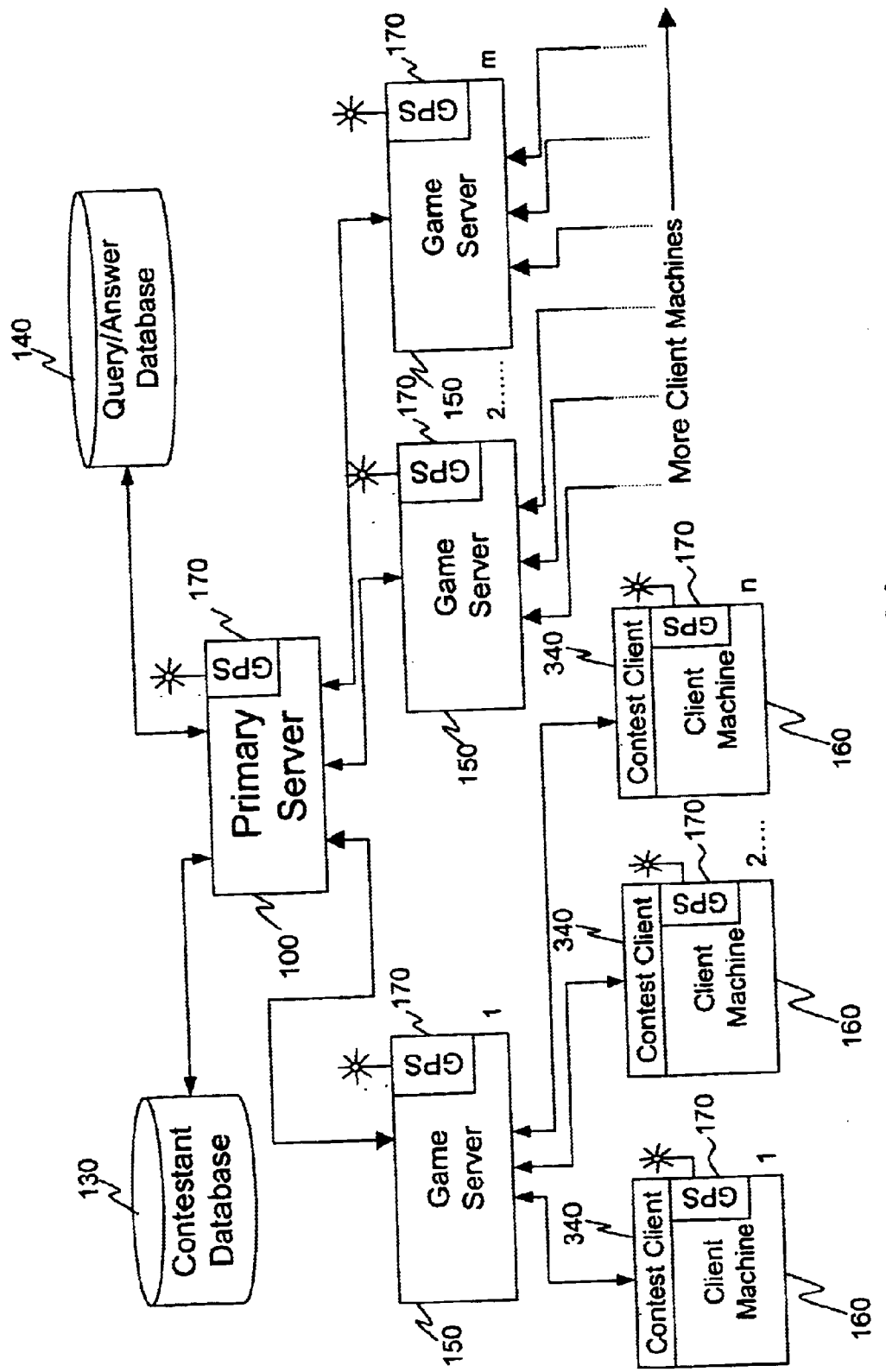
FIG. 2A is a schematic representation of the components directly involved in the query/response portion of the contest supported by the system of FIG. 2, showing the virtual network connections between the primary server 100 and a set of game servers 150, as well as between each game server and an associated set of client machines 160.
Figure 2B:
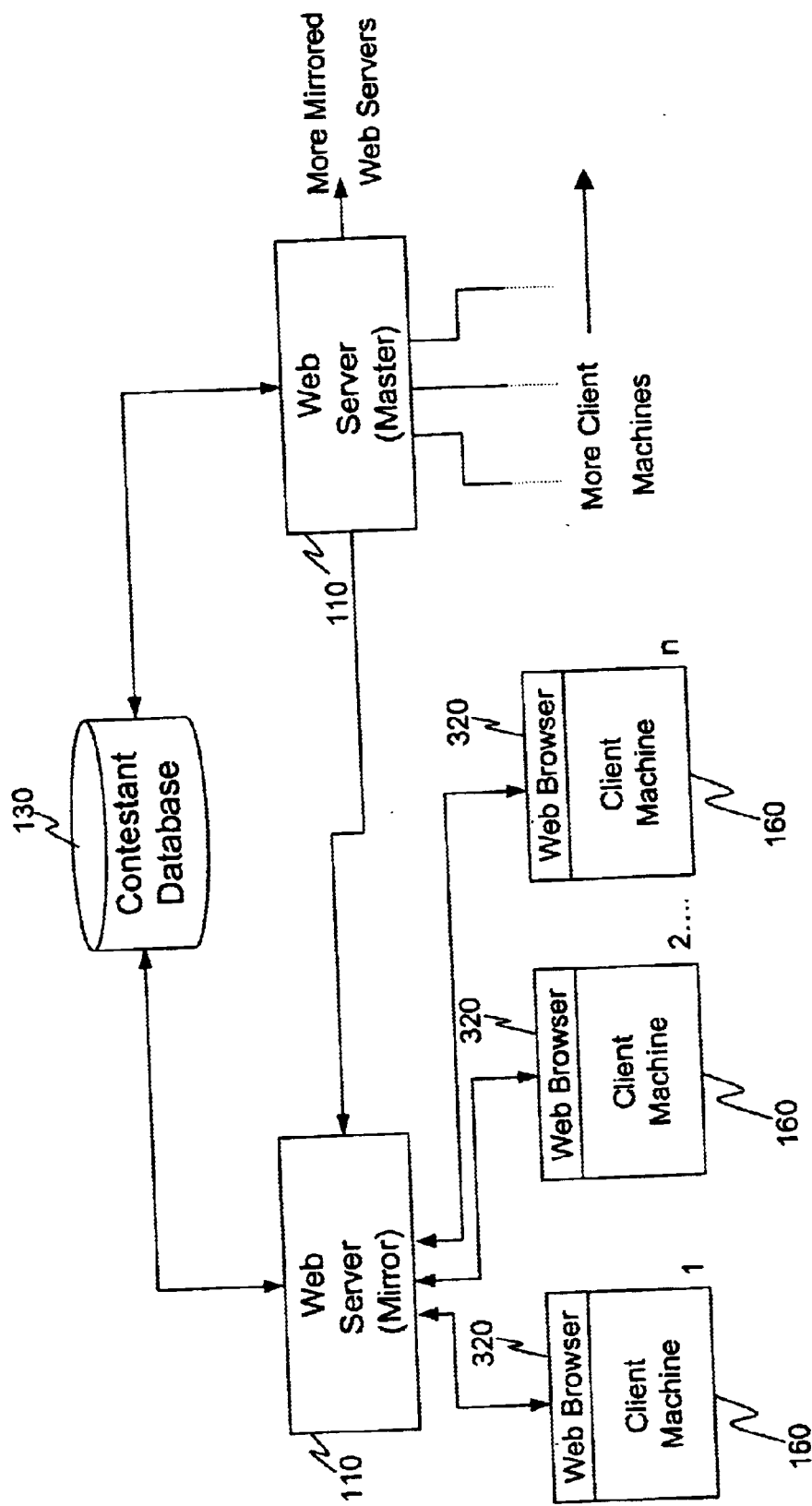
FIG. 2B is a schematic representation of the components used to distribute and present the HTML and associated web content to contestants using the system of FIG. 2, showing a plurality of mirrored web servers 110 each connected to a contestant database 130 and each serving a set of client machines 160, and each client machine being equipped with a web browser 320.
Figure 2C:
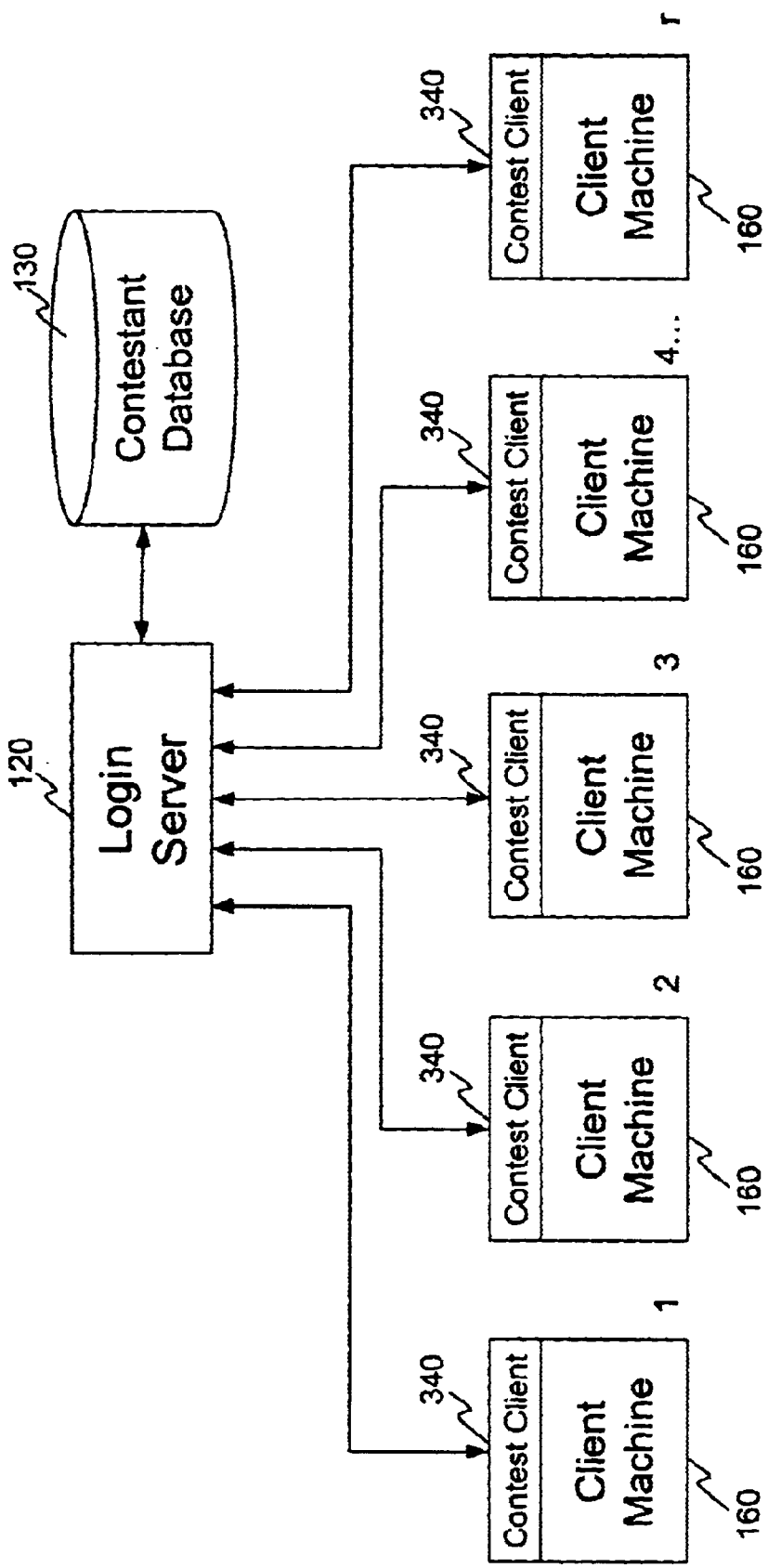
FIG. 2C is a schematic representation of the connectivity between the login server 120 and the client machines 160, wherein each client machine is provided with a contest client 340, and the login server is connected to the contestant database 130.
Figure 2D:
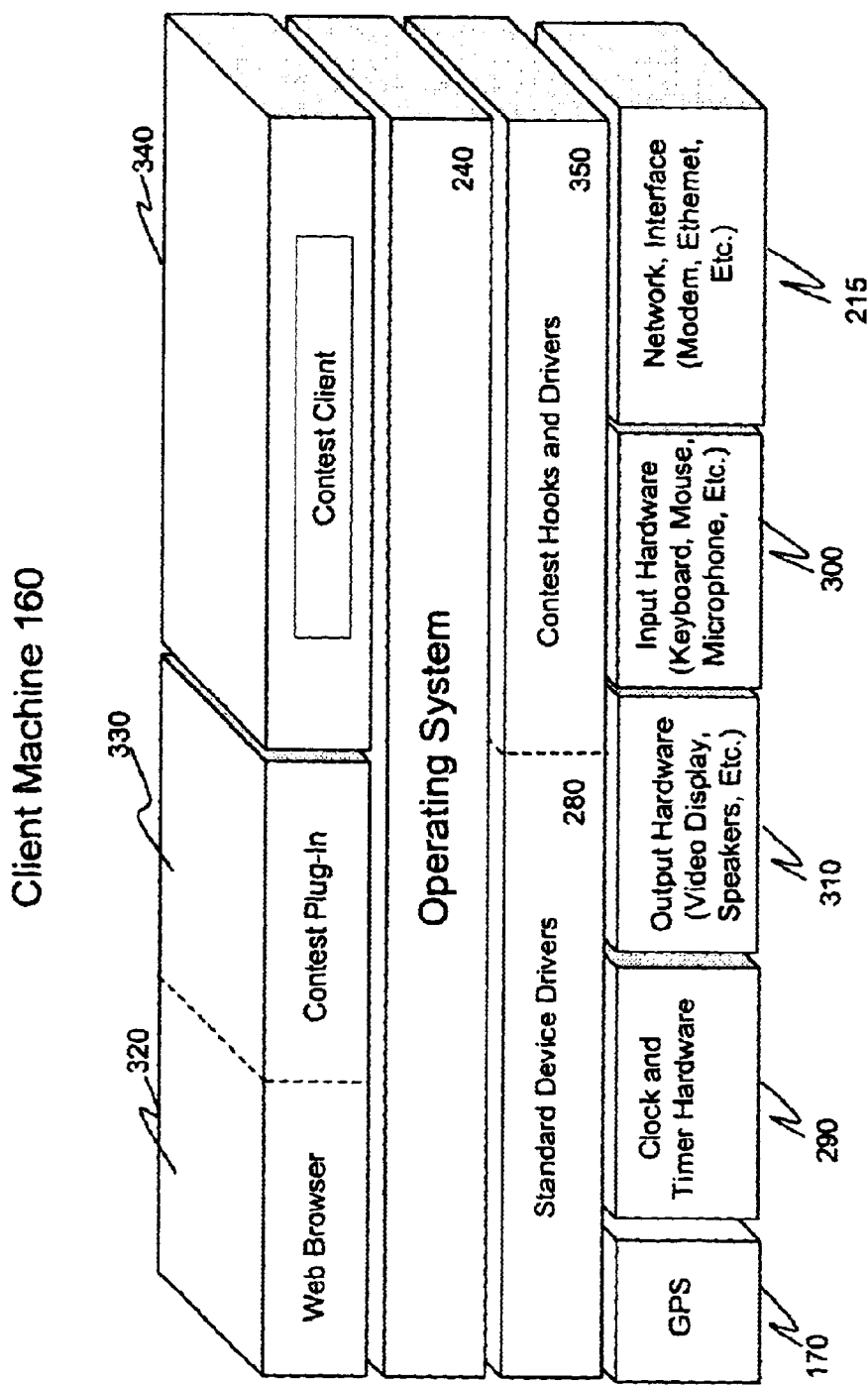
FIG. 2D is a schmematic representation of some of the major components of a client machine 160 employed in the system of the present invention. The figure comprises a global synchronization unit 170 and various hardware and software layers, inlcuding client software such as a contest client application 340, contest plug-in 330, and contest hooks and drivers 350.
Figure 2E:
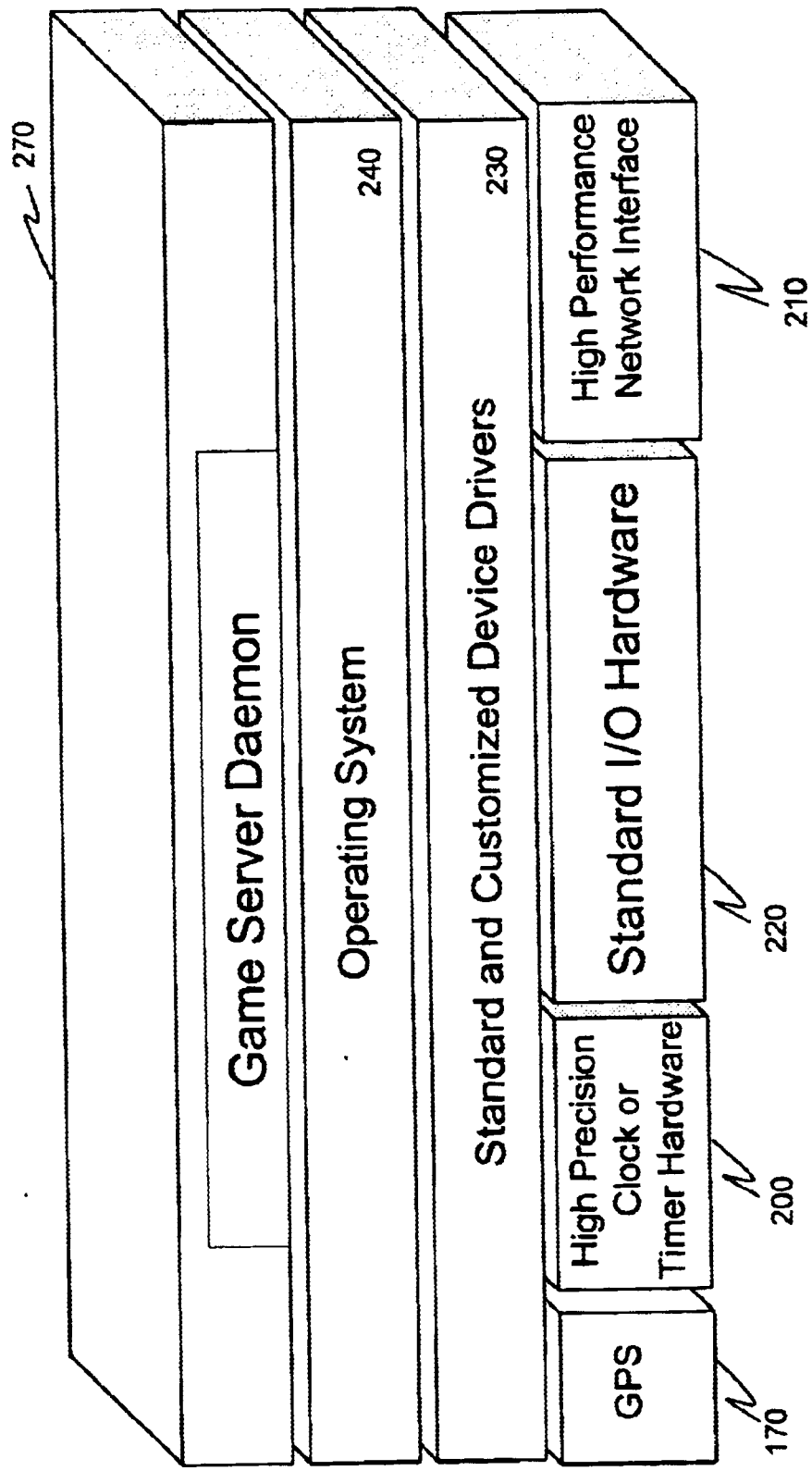
FIG. 2E is a schematic representation of some of the major components of a game server employed in the system of the present invention, shown comprising various hardware and software layers including a game server daemon 270 and GPS receiver 170.
Figure 2F:
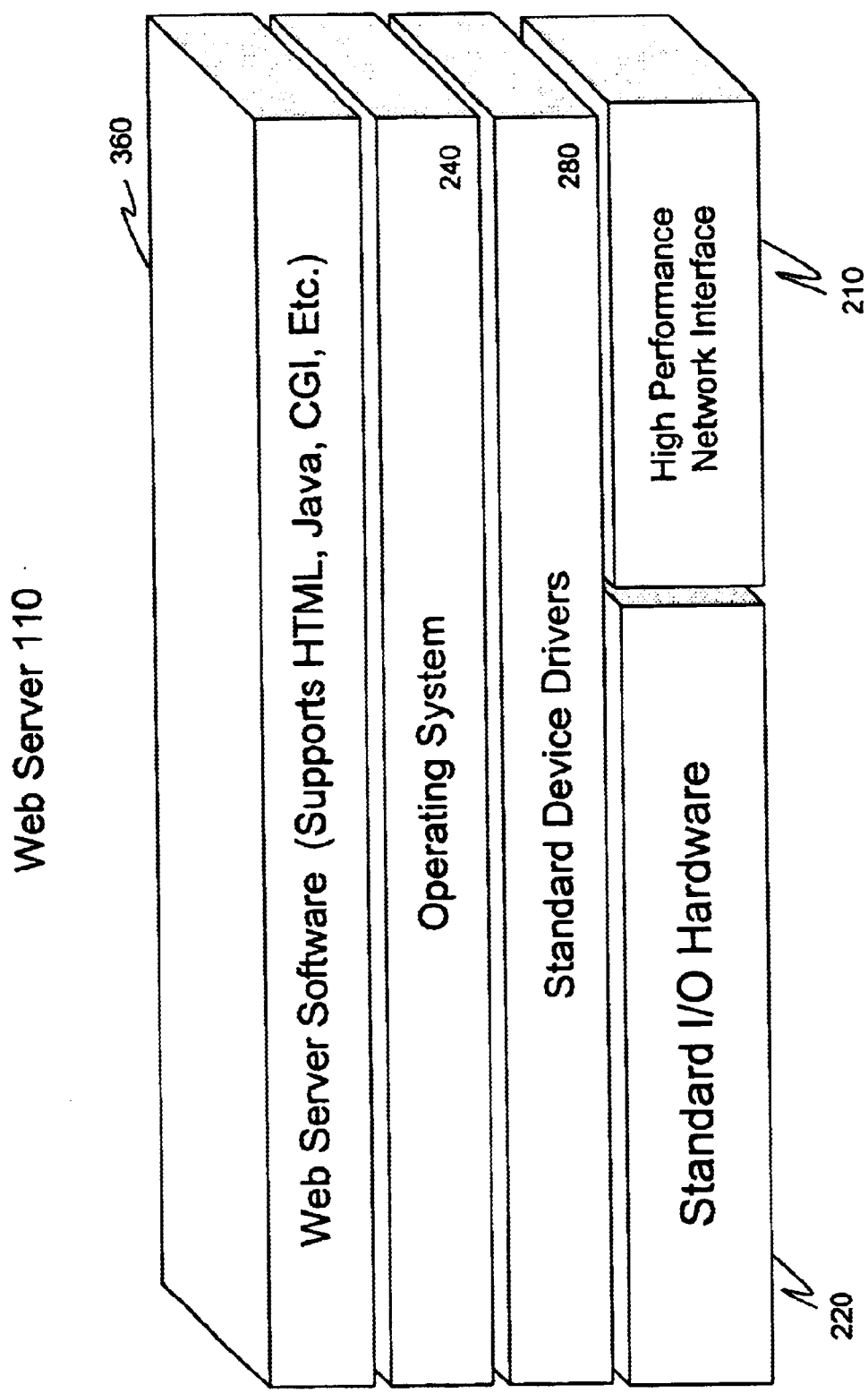
FIG. 2F is a schematic representation of some of the major components of a web server 110 employed in the system of the present invention, including web server software 360 providing support for HTML, Java, and other standard protocols and web technologies.
Figure 2G:
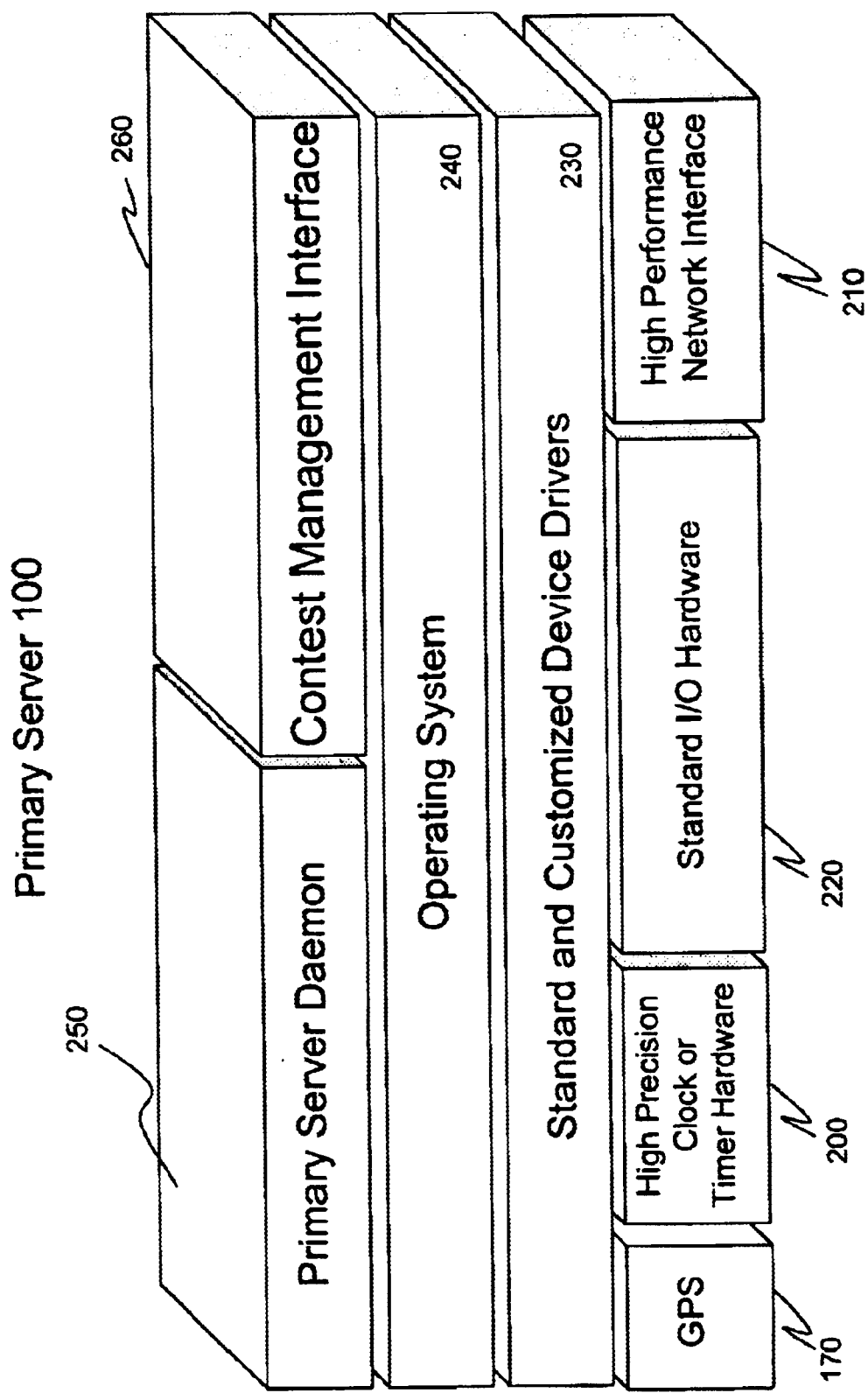
FIG. 2G is a schematic representation of some of the major components of the primary server 100 employed in the system of the present invention, including the primary server daemon 250, a contest management interface 260, a high precision clock or timer 200, high performance network interface 210, and a GPS receiver 170.

As shown in FIG. 2G, the primary server 100 in the contest-promoting system comprises a number of software and hardware components. As shown in FIG. 2G, the structure of the primary server 100 is described using the layered structure of a standard general purpose computer, wherein the hardware components are shown at the lowest level, with successive layers of software functionality disposed above them. Each layer of components utilizes and builds upon the services and capabilities of the lower layers, most often only directly interfacing with the layer immediately below it. In the primary server 100, the low level hardware includes a GPS receiver 170, and high precision clock and timing hardware 200 synchronized to a global time reference using the GPS receiver. In addition, the high performance network interface hardware 210 is used to connect the primary server 100 to the communications network 190. These hardware components are in addition to the standard I/O and other hardware 220 typically provided on a high-end network server, such as the SUN Enterprise™ server running the Solaris™ platform, by Sun Microsystems, Inc. of Palo Alto, Calif. Above the hardware level are standard and customized device drivers 230 that control and communicate directly with the hardware. The device drivers are used by the operating system 240 and higher-level applications so that direct hardware programming is not necessary. At the top level of FIG. 2G are two contest-related applications. The first application is the primary server daemon 250. This piece of software manages the sequence of operations for the contest as a whole, as well as managing the communication of queries, responses, and other information with the game servers. The other top level application running on the primary server 100 is the contest management interface 260. This application provides the user interface to the human operators of the contest. This software allows the operators to enter new questions and answers in to the Query/Answer Database 140, to set up and schedule contests, to set prize levels, to specify qualifications for entering the contests, to collect and view usage statistics, and to monitor ongoing contests. The contest management interface application communicates with the primary server daemon 250 in performing most of its tasks.

As illustrated in FIG. 2A, the single primary server 100 communicates indirectly with the client machines 160 through a number of game servers 150. These game servers relay queries to the client machines, and receive responses from those client machines. Preliminary judging and sorting of the responses is performed by the game servers 170, and these pre-processed results are then passed back to the primary server 100.

As shown in FIG. 2D, the client machine 160 has a layered architecture similar to the primary server 100, comprising: a global synchronization unit 170 and various hardware and software layers. It includes client software such as a contest client application 340, contest plug-in 330, and contest hooks and drivers 350.

As shown in FIG. 2E, the game server 150 has a layered architecture similar to the primary server 100, comprising: hardware components including a GPS receiver 170; high precision timing hardware 200; a high performance network interface 210; in addition to the standard hardware components 220. These hardware components are controlled through the use of a set of standard and customized device drivers 230. Many of these device drivers are provided by the hardware manufacturers, while some are specifically written or modified to handle the precise timing operations needed by the contest-promoting system of the present invention. The major application running on the game servers is the game server daemon 270. The game server daemon 270 receives, processes and responds to data from the primary server 100, the login server 120, and from its client machines 160.

Each contestant interacts with the contest system through a client machine 160. Each contestant uses a single client machine 160 to receive and view the contest queries as well as to enter and transmit their responses containing their answers to those queries. In the illustrative embodiment, each client machine may be realized as a standard personal computer, augmented by the addition of several software and hardware components. In FIG. 2D3, the basic components of each client machine 160 is shown. As shown in FIG. 2D3, each client machine 160 would initially comprise the standard hardware and software components typically associated with any personal computer. These components would include the operating system 240, standard device drivers 280, clock or timer hardware 290, input hardware, such as the keyboard, mouse, a microphone, etc. 300, output hardware, such as a video display and/or speakers 310. In addition to this hardware, each client machine would also require some sort of "web browser" 320 such as Netscape Navigator or Microsoft's Internet Explorer. This web browser is used to contact the "Contest WWW Site", to register with the contest system, and to download the other software components therefrom. These other components might include a contest plug-in 330 that would enhance the user's experience at the contest web site, in addition to the contest client 340, which is the primary interface between the contestant and the contest system. Each contest client receives and presents queries to the human contestant, as well as accepting the contestant's responses and sending them to the servers. Each contest client communicates through contest hooks and drivers 350 with the underlying input, output, and timing hardware, in order to handle the timing aspects of the game (i.e. contest). The hooks and drivers 350 are responsible for clock and display synchronization, as well as for generating timestamps associated with various events during the game. The global synchronization unit 175 is installed in the client machine to provide precisely timed events, traceable to internationally standardized reference clocks. The GSU 175 performs decryption operations, timestamping of client-machine/contestant responses, and supports timed query presentation.

When not actually playing a game, the contestant interacts with the contest web site through a web browser. The contest web site is "served" to that browser from one or more web servers 110. The web servers handle advertising, support, registration, downloading, and other similar tasks. As shown in FIG. 2F, the web server 110 comprises a number of major components comprising a standard I/O 220; a high performance network interface 210; standard device drivers 280; and the operating system 240. These components cooperate to support the operation of the web server software 360. The web server software 360 consists of an HTTP daemon, along with various scripts and utility programs used to handle user/contestant registration and to perform contest web site updates as new contests or results information become available.

Figure 2H:
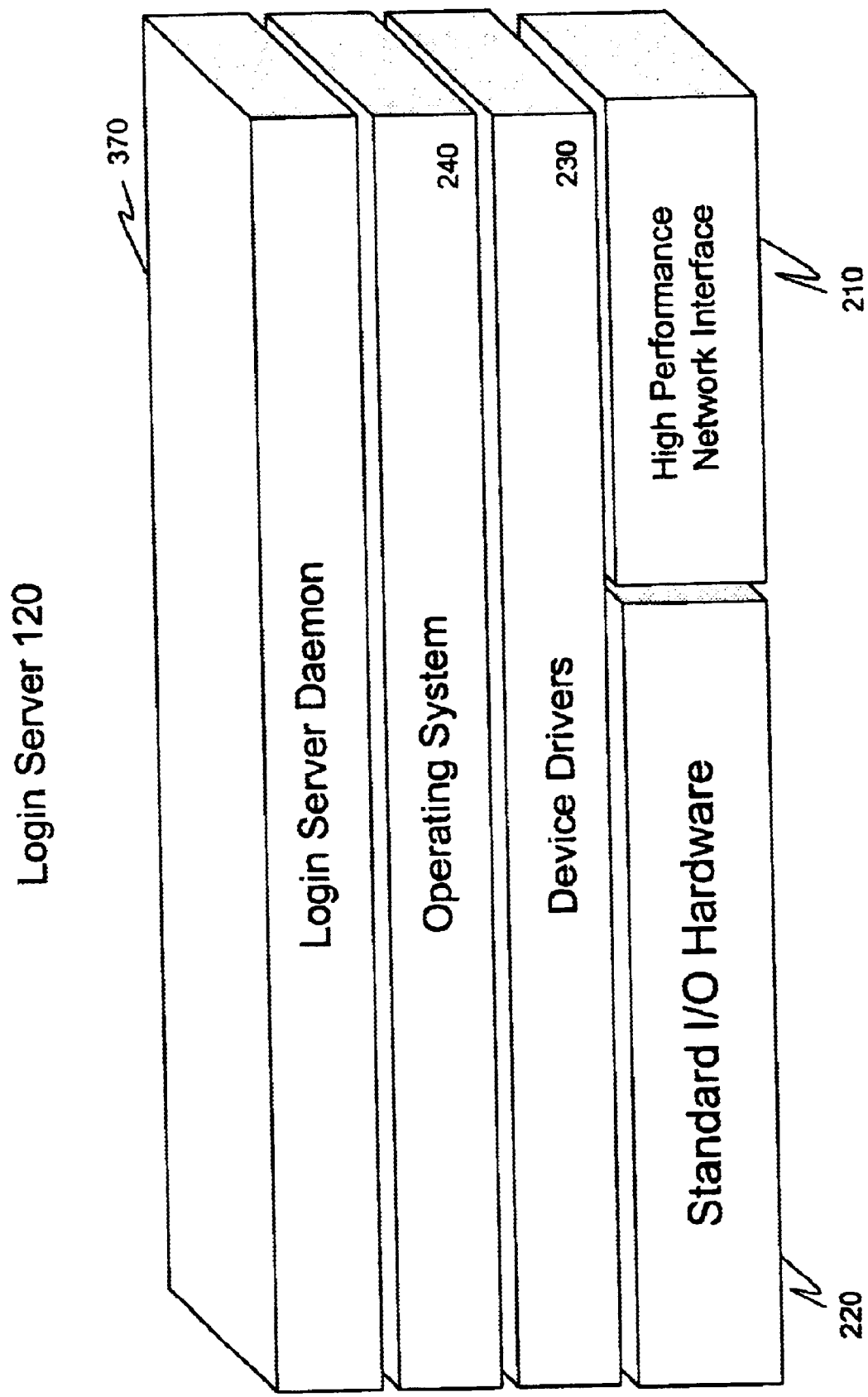
FIG. 2H is a schematic representation of some of the major components of the login server 120 employed in the system of the present invention, including the login server daemon 370 and a high performance network interface 210.

As shown in FIG. 2, the last primary computer-based component of the contest-promoting system is the login server 120. The function of the login server 120 is to accept login requests from each contestant's client machine, and assign an appropriate game server to that client. The login server 120 provides a single, well-known address for the client machines to contact when initializing a new game. The login server also serves to intelligently distribute the processing and communications load among the game servers. As shown in FIG. 2H, the login server 120 comprises a number of major components, namely: a standard I/O 220; a high performance network interface 210; standard device drivers 280; and the operating system 240. These components cooperate to support the operation of the login server daemon 370, which handles the login requests and server assignment functionality within the contest-promoting system.

As shown in FIG. 2, the contest-promoting system of the illustrative embodiment employs two database systems. The first database system is the contestant database 130. The contestant database records information about the user, such as their identity, preferences, contact information, and contest results and standing. The second database is the query/answer database 140. The query/answer database stores the problems and solutions for the game contests. These problems and solutions are originally created and stored in the database by the contest operators. They are then accessed and distributed by the primary server 100 to the contestant's client machines 160 during the contest.

As shown in FIG. 2, the final component contest-promoting system that deserves mention is the communications network 190. In general, communications over the network could be carried out using a variety of different communications methods. In general, each computer or device will establish a connection or connections to one or more of the other computers through the network 190. In practice, these connections will be "virtual" connections through a general network such as the Internet, rather than as a direct point-to-point physical connection. The topography of the primary virtual connections between the various contest system components are depicted in FIGS. 2A, 2B, and 2C, while the information flows transmitted through those connections are detailed in FIGS. 3A through 3G.

Virtual Communication Links and Hierarchies in the Contest Promoting System of the Present Invention Typical games implemented using the contest-promoting system of the present invention could involve thousands or even millions of contestants distributed over and possibly above the planet Earth. Because of the huge bandwidth required to handle transmission of the queries and responses from all of the client machines employed in the contest, the system of the present invention utilizes a hierarchy of servers illustrated in FIG. 2A. As shown in FIG. 2A, the primary server 100 acts as the root node of a tree-type interconnection of computers. The "leaves" of the tree structure are formed by the client machines 160 connected to the system. Between these devices lies a layer of game servers 150 which act as intermediaries (or "branch structures") between the primary server 100 and the client machines 160. Each game server communicates directly with the primary server 100 and with a set of client machines associated with that particular game server 150. In a large contest involving many thousands of contestants, there might be hundreds or thousands of game servers deployed in the system, each handling hundreds or thousands of client machines. These game servers could be distributed over the country or over the world, with each game server handling client machines in a certain region, thereby greatly reducing the communications loading on central "trunk" network links. As shown in FIG. 2A, there are also communication links between the primary server 100 and the contestant database 130 and the query/answer database 140. In this illustrative embodiment of the contest-promoting system hereof, each game server 150, client machine 160, and primary server 100 is equipped with a GPS receiver that is used to synchronize the local clock and the display of each client machine participating in the contest-promoting system.

Network traffic bandwidth associated with the higher level servers in the hierarchical configuration shown in FIG. 2 is reduced by performing some data processing on the game servers 150 themselves, rather than performing all computations on the primary server 100. For example, if a single winning contest, or a certain number (e.g. n) of winners are to be chosen in each contest, then each game server 150 can compare each response it receives and only transmit the "n" best responses onto the next higher level server. Also, management of time synchronized messaging with each client machine can be carried out by the game server 150 associated with that client machine, rather than by the primary server 100. Such techniques will serve to reduce the loading on the primary server 100. If the performance of all contestants is to be rated and sorted, then each game server 150 can sort the contestants playing on the client machines connected to that game server 150. Thereafter, these sorted lists of client machines can be easily and efficiently sorted by the primary server 100 using an insertion sort or method that takes advantage of the pre-sorted groups of contestants.

It is recognized that real world contests involve much more than the actual queries and responses that make up the core elements of the game. Many other steps and processes are necessary or desirable both from the point of view of the contestant, as well as from the point of view of the person or company running the contest. While the purpose of the contest from the point of view of the contestant is to have fun, to learn, or to win prizes, the purpose of the contest from the point of view of the contest operator may include other goals. For example, such goals may include: selling products; advertising; collecting marketing information or other statistical information; promoting their company or institution; educating a group of people; and so on. The basic query, response, and judging activities constitute the contest itself, while the other activities referred to above will be referred to as the non-contest activities. These non-contest activities can be divided into two major categories; those activities that directly support the operation of the contest; and those activities that are ancillary to the contest.

Non-contest activities that directly support the operation of the contest include one-time or rarely performed activities, as well as activities that must be performed immediately before or after each contest. One-time activities include contestant registration, system testing and qualification, and downloading plugins or other client-machine based components. Those periodic activities that must be performed before or after each contest include login, server assignment, and viewing contest results.

Registration is used to collect and record information about each contestant desiring to participate in a scheduled contest (e.g. listed on the Contest WWW Site). This information can include the name, address, telephone number(s), E-mail address, and any other information required or desired of each contestant by the contest organizer and/or sponsor(s). The contestant chooses or is assigned an identification number (or "handle") and a password, in order to protect their access to the contest process. At registration time, a number of tests may be performed on the contestant's system. These tests could be used to qualify the client machine to be used by the contestant, by determining whether it meets certain requirements necessary to successfully participate in the contest. In addition, data produced as a result of these tests may be recorded, either on the client machine or on one of the servers. This data could be used, in conjunction with other information collected during and/or after the contest, to help determine whether the contestant participated fairly in the competition. Another activity which is also performed before the contest is downloading any programs, installable components, and plugins, as well as any data required by them. These programs, components, and plugins, along with a browser or other programs already present on the contestants system will be used to present advertising and other information and content to the contestant, as well as to perform all operations of the contest on the client machine.

As shown in FIG. 2B, a number of system components are used to distribute and present HTML (or XML) encoded documents (with or without Java or Active-X applets) and associated web content to the contestants. As shown, such system components include a plurality of mirrored web servers 110, wherein each web server 110 is connected to a contestant database 130 and each serves a set of Web-enabled client machines 160 equipped with web browsers 320. A master web server 110 stores and provides the web site content to a set of client machines, utilizing HTTP, FTP, and other standard Internet protocols. In order to avoid overloading a single web server with many thousands or millions of connections, a number of mirror web servers 110 are used. The master web server transmits copies of the entire contest web site to the mirror web servers, which then are each able to serve a large number of client machines 160. As shown, each of the web servers 110 shares a common networked contestant database 130 which contains registration and other information. In addition to providing the contest "web site", the web servers also distribute the contest client software (340) using the HTTP or FTP protocols. Before downloading contest client software, each contestant/user is required to register on the web server 110. Registration involves filling out a web-based (e.g. HTML-encoded or XML-encoded) form containing the necessary personal and client machine information and submitting that form to the web server. Client machine qualification may be tested using either browser plug-ins or stand alone test programs downloaded from the web server.

In an extremely large multi-player contest, it is clear that multiple game servers will be necessary to handle communication with all the client machines involved during the contest. When a client machine initially connects to the contest-promoting system of the present invention, it will be done through a login server 120 located at some well-known Internet address. The login server will choose which game server should be utilized by this contestant's client machine. This choice will be based on a variety of information, including the location of the client machine, the characteristics of the connection to the client machine, and the number and characteristics of the connections already assigned, or anticipated to be assigned, to the game servers in the system. Load balancing algorithms will be used to distribute the connections to the game servers, thereby minimizing the possibility of overwhelming any one server, and insuring consistent connections for all the game clients.

FIG. 2C depicts the connections between the client machines 160, login server 120, and the contestant database 130. Except in extremely large configurations, it is probable that only a single login server would be needed, and all client machines would receive their game server assignments from that server. If a single login server is insufficient, then a hierarchical configuration similar to the one shown for the game servers in FIG. 2B could be used. As shown in FIG. 2C, each client machine is running the contest client 340, and it is this software that the contestant interfaces with when logging in to through the login server. In order to check passwords and the status of the contestant, the login server accesses the contestant database 130.

Global Synchronization Unit (GSU) of the Present Invention

While an optional component of the contest-promoting system described above, the global synchronization unit (GSU) 175, when used in each client machine 160, will greatly enhance the precision and security of the overall system. In general, the GSU 175 is a standalone system with important capabilities and many potential applications beyond the contest-promoting system of the present invention herein disclosed. The basic purpose of the GSU 175 is to either (i) perform actions in response to precise time and space conditions, or (ii) generate secure and verifiable time and space-stamped records of client-machine inputs and any other events captured by devices attached or otherwise connected to the GSU of the present invention.

In general, the GSU 175 has the ability to trigger or generate an event at a specific time instant or over a specific time interval. This event could be the display of an image, the start of a video or audio clip, the decryption of data, or the running of a program on the host machine. One purpose of this capability is to allow the synchronization of events on multiple client machines, each of which is equipped with a GSU. In situations requiring high security, data used in the generation of the event may be downloaded into the GSU in an encrypted form. This data is then decrypted and the event-triggered by the GSU at the precise instant desired.

In addition to triggering events based on time or time interval conditions, the GSU of the present invention can also trigger events at a client machine based on their location or velocity of the GSU, or on any combination of time, space, and velocity conditions thereof. In all cases, the GSU is configured through the host computer interface to perform a specific action when those conditions are satisfied.

Another major functionality of the GSU is to perform time and space stamping of external events. These events could be as simple as a communication line being asserted on the GSU input, or as complex as a set of patterns of inputs on a number of different inputs. The trigger for a time and space stamping action could constrained by timing, location, and velocity conditions of the GSU. In fact, the space and time stamp generation could even be triggered solely by internal information, for example, generating a time/space stamp upon the arrival of the GSU at a specific location, or at a predetermined time. In accordance with the principles of the present invention, a time/space stamp generated by the GSU 175 includes the location, exact time (e.g. to within +/−1 microsecond), and security information including, but not limited to, a hash or CRC (cyclic redundancy check) value derived from the input data associated with the event. The hash value will allow the data to be verified in the future to insured that it has not been altered since the time/space stamp was generated. The time/space stamp also will have an associated CRC value or digital signature to insure that the time/space stamp itself is genuine and unmodified.

The GSU of the present invention also provides the ability to authenticate digitally signed time and space stamps that it has previously generated, and to verify that data associated with that time and space stamp has not been modified since the stamp was created.

Applications of the GSU include, by are certainly not limited to: managing and judging geographically distributed race-based (i.e. time-constrained) contests; notarization of data; time-space stamping of executed legal documents (e.g. contracts, property transactions, patent applications, security interests, etc.) and transmitting the same to a centralized server for public recordation and/or filing in accordance with governmental or legal regulations; controlling, distributing, and authorization of lottery tickets and the like; and any other task in which precise, secure, and verifiable timing of events and triggering of timed events are required.

The Structure and Function of the Basic GSU of the Present Invention

FIG. 2D1 depicts one context of operation for a basic GSU. This figure shows a client machine 160 with attached input and output devices. This client machine is connected (using a direct hardware connection or infrared or radio frequency link) to a global synchronization unit (GSU) 175. In addition, the client machine 160 is connected through the Internet or other communication means 190 to a server equipped with a GPS Clock 170. In this context, the server could send an encrypted request to the client machine 160 to perform an action (for example displaying an image) at a specific time, as required in the contest-promoting system described hereinabove. This encrypted request is then loaded into the GSU 175 where it is decrypted and the desired event time recorded. At, or at some predetermined time before, the desired display time, the GSU 175 decrypts the image to be displayed and downloads the decrypted image back onto the client machine 160 for display. This method prevents access by the client machine or its operator to the image data before the allotted time.

An alternative function performed by the GSU in the context of FIG. 2D1 would be the ability to time and space stamp an input or event captured or generated by the client machine. In this case, data associated with the input or event would be uploaded to the GSU 175, which would create a digital signature for that data input, where the digital signature would also incorporate the time and location of the GSU at the moment the data was uploaded. The digital signature thus created could then be sent over the network to a server to serve as a record of the event taking place. At a later time, this record could be used to prove that the data existed at or before the time recorded in the timestamp, and the location of the GSU when the record was generated.

As shown in FIG. 2D2, a basic global synchronization unit (GSU) 175 comprises several required and optional components. The required components include a GPS Receiver 700 and an associated antenna 730. The GPS receiver 700 is connected to a central processor 750 that can store events and desired trigger time/locations, perform encryption and decryption functions, and calculate digital signatures verifying the authenticity of data including, for example, time and space information provided by the GPS receiver 700. Access to the central processor 750 is provided through a host computer interface 720, which could utilize standard or proprietary hardware and communication protocols to provide such access. Standard interface specifications that might be utilized therein include bus-based connections such as ISA, SCSI, or PCI; port-based connections such as USB, RS232, or PCMCIA; or other communication methods such as infrared or radio frequency links. In addition to these core components, the GSU of the present invention may also contain a number of optional components such as a high-frequency GPS disciplined clock 710, interfaced with the central processor 750, for providing much higher resolution time-stamps; a stand-alone encryption and decryption module 740, interfaced with the central processor 750, for providing enhanced speed and security; and/or non-volatile memory 760, interfaced with the central processor 750, for recording timestamps for later comparison and verification purposes. As discussed above, FIG. 2D3 shows the GSU in the context of a client machine for use in a time-constrained competition against others, as in the case of a contest, or against oneself under the constraint of a clock as the case of testing, or against changing supply and demand conditions in a market as in the case of real-time securities, commodities, or currency trading, or other forms of real-time and non-real-time auction processes.

The Structure and Function of the Enhanced GSU of the Present Invention

Figure 4:
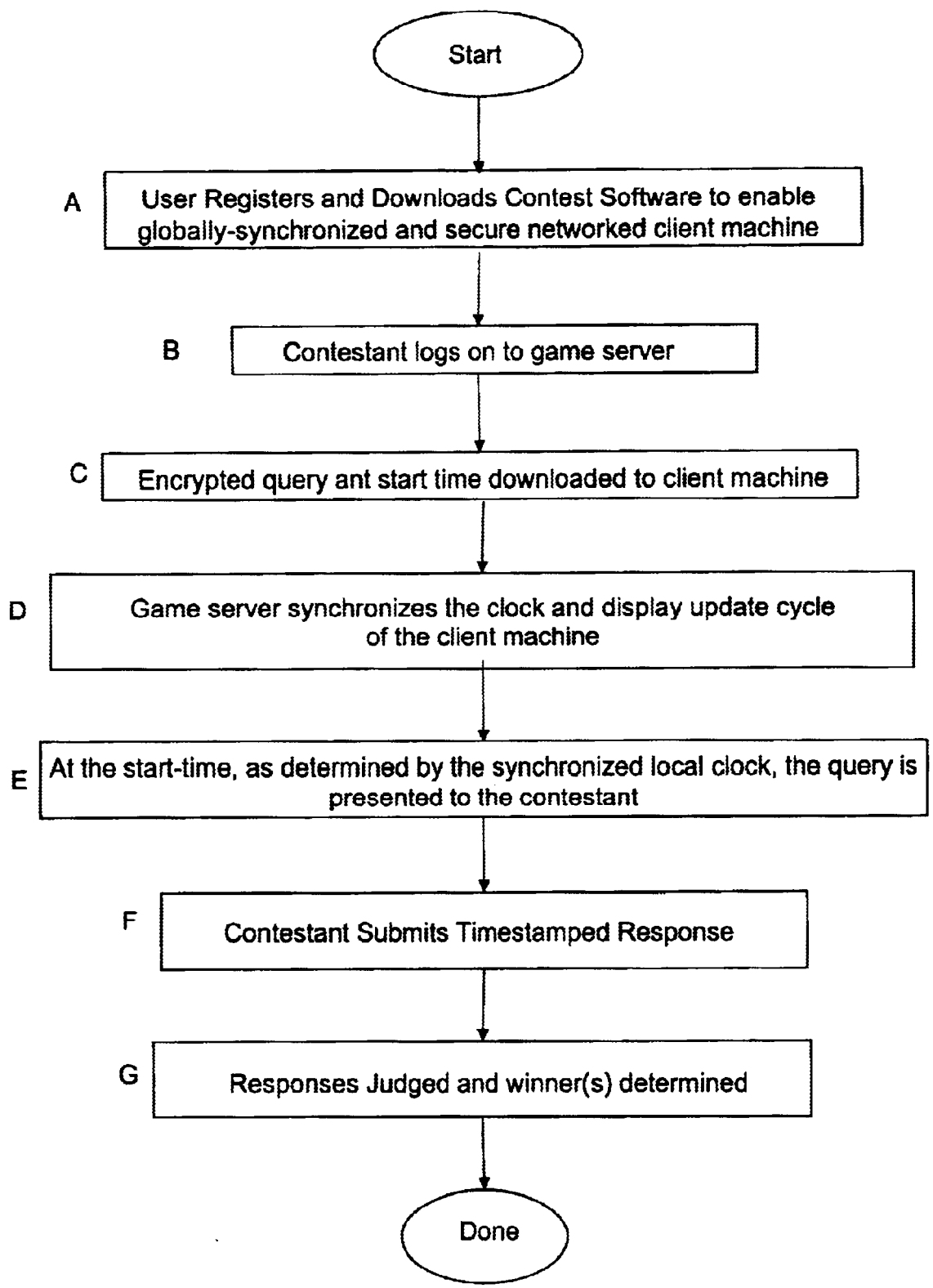

FIG. 2D4 depicts one context of operation for an enhanced version of the GSU. As shown therein, a client machine 160 is connected to the GSU 177 using either a direct hardware connection or infrared or radio frequency link known in the art. Instead of being directly connected to the client machine, the input and output hardware for the client machine is routed through the GSU 177. As shown, the client machine 160 is connected through the Internet or other communication means to an information server equipped with a GPS Clock 170. In this context, the server could send an encrypted request to the client machine 160 to perform an action (for example displaying an image) at a specific instant of time. This encrypted request is then loaded into the GSU 177 where it is decrypted and the desired event time recorded. At the desired display time, the GSU 177 can directly override the video output from the client machine 160, replacing it or overlaying it with the decrypted image. The enhanced GSU 177, by directly controlling the client machine display, can provide even more precise output event timing. In addition, security is enhanced because the decrypted image data is never actually sent to the client machine 177.

An alternative function which can be performed by the enhanced GSU 177 of the present invention, in the context of FIG. 2D4, would be the ability to time and space stamp an input or event captured or generated by input devices to the GSU 177 without the delays and security risks incurred by first passing the data inputs to the client machine 160. Thus, the enhanced GSU 177 provides much higher precision of data event timing at a client machine because the data inputs are fed directly through, and directly monitored by, the GSU 177.

Figure 5:
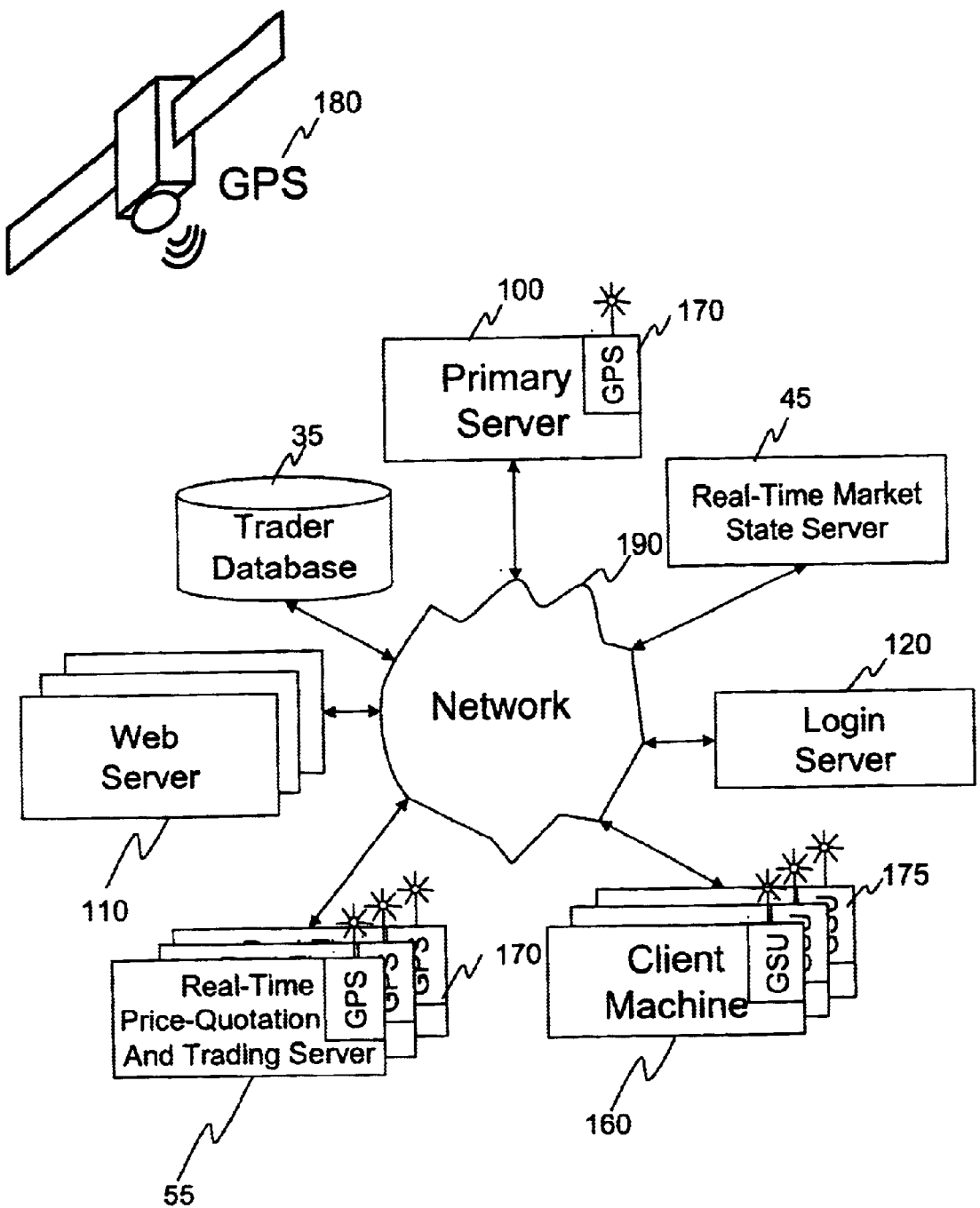
Figure 5A:
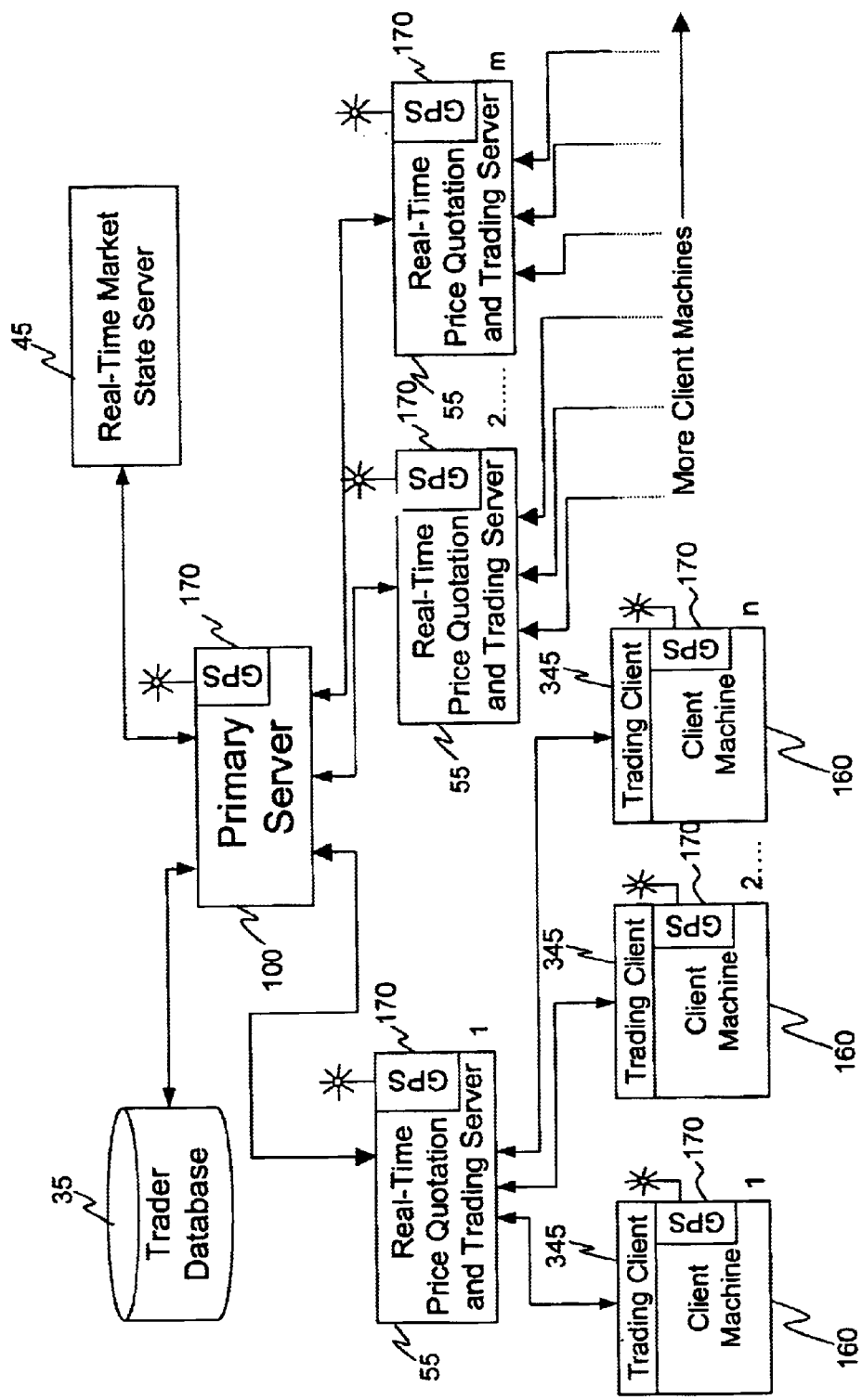
FIG. 5A is a schematic representation illustrating the connectivity: between the trader database, the real-time market state server, and plural real-time price quotation and trading servers, and the primary server; and between plural trading client machines and the real-time price quotation and trading servers.

As shown in FIG. 2D5, the enhanced GSU 177 of the present invention comprises several required and optional components. As shown therein the required components include a GPS Receiver 700 and an associated antenna 730. The GPS receiver 700 is connected to a central processor 750 that can store events and desired trigger time/locations, perform encryption and decryption functions, and calculate digital signatures verifying the authenticity of data including, for example, time and space information provided by the GPS receiver 700. Access to the central processor 750 is provided through a host computer interface 720, which could utilize standard or proprietary hardware and communication protocols to provide such access. Standard interface specifications that might be utilized include bus-based connections such as ISA, SCSI, or PCI; port-based connections such as USB, RS232, or PCMCIA; or other communication methods such as infrared or radio frequency links.

Unlike the basic GSU 175 described above, the enhanced GSU 177 also includes at least one of the following two components: an input device passthrough monitoring module 770; and an output passthrough and signal generation module 780, as shown in FIG. 2D5.

The function of the input device passthrough monitoring (IPM) module 770 is to provide a "passthrough" (e.g. input and output port) for a specific input device or class of input devices. The IPM module 770 will monitor the data passing through, and generate digital signatures or CRC values of the data when requested by the central processing unit 750. In addition, the IPM module 770 could be programmed by the central processing unit 750 to trigger the acquisition of a time/space stamp or other event upon the receipt of a specific input or pattern of input of data into the IPM module 770. The IPM module 770 could be manufactured to interface with any type of input device, including a mouse, keyboard, microphone, video camera, scanner, barcode reader, pressure tablet, a voice recognition system, or any other analog or digital data input device.

The function of the output passthrough and signal generation (OPSG) module 789 is to provide a passthrough (e.g. input and output port) for a specific output device or class of output devices. The OPSG module 780 will have the ability to block signals from the host computer passing through the GSU 177, and to insert or overlay its own signals for presentation on the output device. For example, the OPSG module 780 could be used for the video display device. The host computer video output would be connected to the GSU 177, and another cable connected from the GSU 177 to the display device. The GSU could then "take over" the display device and display its own images or videos on the display device. Typically this capability would be activated in response to a timed event, in order to simultaneously display output on multiple GSU-equipped client machines (e.g. e.g. operating within a competition-supporting system of the present invention). OPSG modules 780 could be created to interface with a number of different-output devices, including video displays, speakers, or printers.

In addition to these required core components, the enhanced GSU 177 may also contain a number of optional components such as, for example: a high-frequency GPS disciplined clock 710, interfaced with the central processor 750, for providing much higher resolution time-stamps; a stand-alone encryption and decryption module 740, interfaced with the central processor 750, for providing enhanced speed and security; and/or non-volatile memory 760, interfaced with central processor 780, for recording timestamps for later comparison and verification purposes.

Processes Involved During the Operation of the Contest-Promoting System of the Present Invention In FIG. 4, the high level operations performed by the contest-promoting system of FIG. 2 are described.

Collectively, these operations enable a contestant to compete many other contestants, in a secure and fundamentally fair time-constrained contest, wherein each contestant is provided with a common "start-time" regardless of the location of his or her client machine on the infrastructure of the Internet, for the type of interconnection provided thereto (e.g. POTS line, ISDN, frame-relay or T1 line). The flow-chart of FIG. 4 sets forth the seven basic steps or operations carried out by the contest-promoting system of FIG. 2. These operations are indicated at Blocks A through G in FIG. 2. As a overview of the method hereof, these operations will be first briefly described below, and thereafter, each operation will be described in greater, detail with reference to FIGS. 4A through 3G, respectively.

As indicated at Block A in FIG. 4, the first major operation carried out by the contest-promoting system hereof involves registration of each user as a contestant, and the creation of a globally-synchronized and secure networked client machine through which the contestant may participate in a timed-constrained question, and answer type contest, while competing against large numbers of other contestants for potentially high stakes.

As indicated at Block B in FIG. 4, the second major operation carried out by the contest-promoting system hereof involves the contestant using the contest client software on the client machine to log on to the game server 150, and the establish a communication channel therewith.

As indicated at Block C in FIG. 4, the third major operation carried out by the contest-promoting system hereof involves transmitting the query and start-time from the primary server to the client machine.

As indicated at Block D in FIG. 4, the fourth major operation carried out by the contest-promoting system hereof involves characterization of the client machine's local clock with the master clock on the primary server, and the synchronization of the client machine display update cycle with the desired start-time for the contest.

As indicated at Block E in FIG. 4, the fifth major operation carried out by the contest-promoting system hereof involves presenting the query to the contestant precisely at the start-time, as determined by a local clock that is characterized with respect to a global master clock located on the primary server.

As indicated at Block F in FIG. 4, the sixth major operation carried out by the contest-promoting system hereof involves accepting the contestants response, attaching a timestamp to that response, and transmitting the response and timestamp to the servers.

As indicated at Block G in FIG. 4, the seventh major operation carried out by the contest-promoting system hereof involves judging the responses from all the contestants and determining the winner. In addition, each contestants standing or rank is determined for the contest.

Details Relating the Operation Specified in Block a in FIG. 4

Figure 4A:
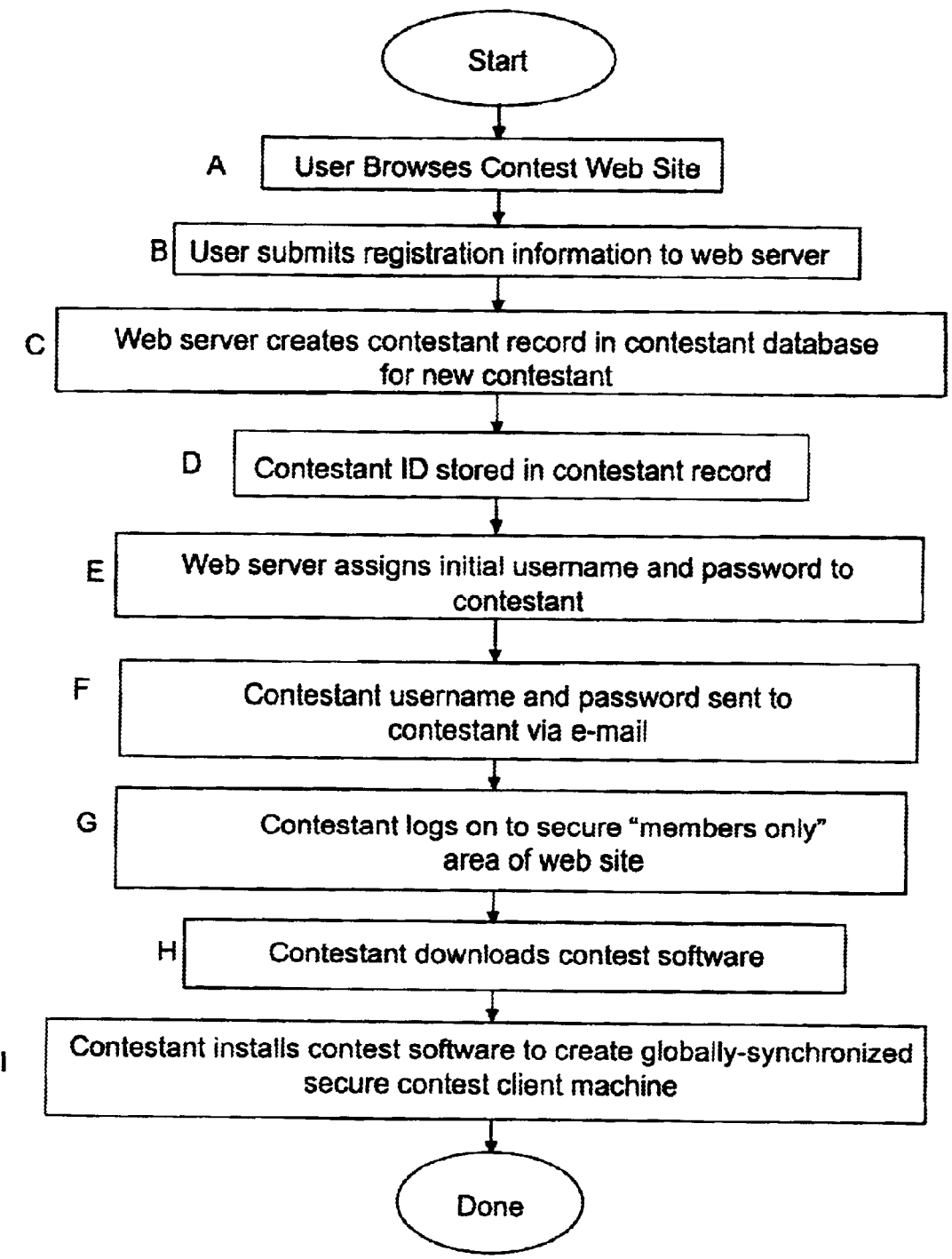
FIG. 4A is a flowchart describing in greater detail a method for registering and downloading contest software in the system of FIG. 2.

In FIG. 4A, the suboperations are shown for carrying out the method of registering and downloading of contest software indicated at Block A in FIG. 4.

Figure 3A:
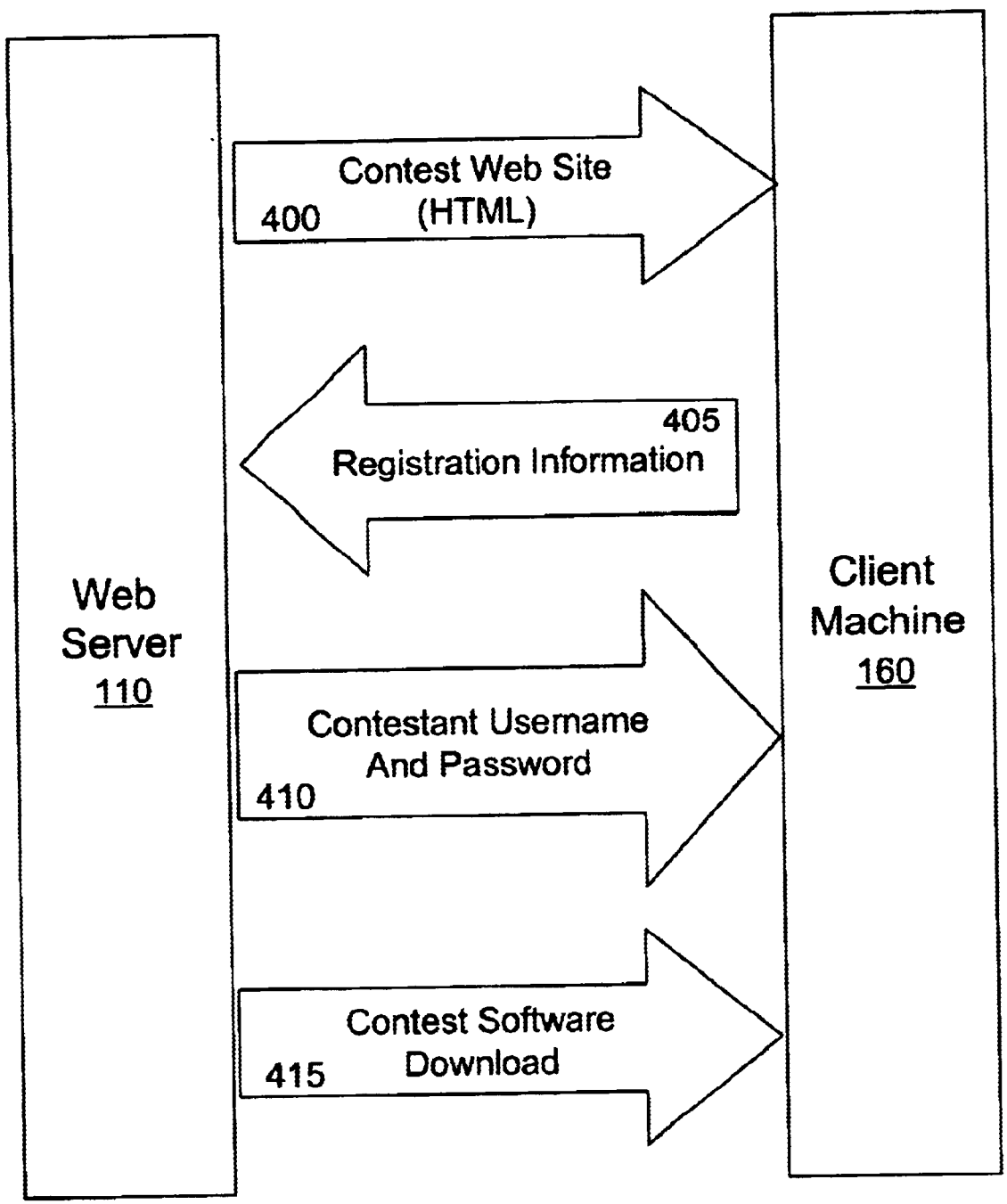
FIG. 3A is a schematic representation of the flow of data and messages between a web server 110 and a client machine 160 employed in the system of the present invention, wherein the data flow includes web site content transmitted from the web server to the client machine, encrypted registration information posted to the web server from the client machine, preliminary contestant username and password sent to the client machine, and contest software downloaded from the web server to the client machine.

As indicated at Block A in FIG. 4A, a potential contestant browses the contest WWW site ("the contest web site"). In general, the contest web site will include information about the contest, including descriptions of the contest client software, contestant qualifications, contest regulations, instructions on how to play, information about different varieties of the contest, lists of prizes and awards offered, advertising, lists of contest sponsors, lists of previous winners, and the standings or ranks of other contestants. FIG. 3A indicates the flow of information between the user's client machine 160 and the web server 110 containing HTML (and/or XML) encoded documents comprising the contest web site. In this figure, as well as in FIGS. 3B through 3G, the large arrows extending from one computer to another represent a message or group of messages containing related information. Messages indicated by 400 in FIG. 3A contain the web content being delivered to the client machine 160 from the web server 110.

In addition to the informational content of the contest web site, provision will also be made to allow the user to register to become a contestant. As indicated at Block B in FIG. 4A, upon deciding to enter the contest, the user fills out an on-line registration form, using either standard HTML (or XML) forms, or forms generated by Java or Active-X applets, or by a CGI script in a manner well known in the art. During the registration process indicated at Block B in FIG. 4A, there may also be a qualification procedure, wherein the user performs some test either of their own abilities and/or of the capabilities of their computing system. These tests could be administered through forms along with the registration process, or could involve the user downloading and running customized plug-in modules or stand-alone applications on his or computing system. Message 405 in FIG. 3A contains registration information being transmitted from the client machine 160 to the web server 110. This information is encrypted using standard secure HTTP methods known in the art.

As indicated at Block C of FIG. 4A, the web server 110 creates a record in the contestant database 130 for this user upon completing receipt of the registration information therefrom. The registration information is stored in this record, establishing the user as a contestant permitted to participate in one or more on-line multi-player contests to be promoted (i.e. enabled) the system of the present invention.

As indicated at Block D of FIG. 4A, a contestant ID is then assigned to the new contestant. This ID code uniquely identifies the contestant for all time, unlike a username, password, e-mail address or other information that may be changed in the future by this player/contestant. The contestant ID is recorded in the contestant database 130, and is used internally by the contest software of the system.

As indicated at Block E in FIG. 4A, the contestant is assigned a username and a temporary password for use when playing the contest. The username may be assigned by the system, or it may be chosen by the user as a part of the registration procedure. The password is generated randomly, and will most likely be changed by the contestant after logging into the system the first time. The username and password are stored in the contestant database 130.

As indicated at Block F in FIG. 4A, an e-mail message containing the username and temporary password are sent to the contestant. This e-mail message from the web-server 110 to the client machine 160 is depicted as Message 410 in the data flow process shown in FIG. 3A.

As indicated at Block G in FIG. 4A, the contestant logs onto a secure, members-only area of the contest web-site using his or her username and temporary password. This area allows the contestant to view and update his or her personal information (e.g. username, password, e-mail address, residence address and telephone numbers, and so on).

As indicated at Block H in FIG. 4A, the contestant downloads the contest software from the web server 110 to his or her client machine 160, i.e. from the members-only area of the contest web site. This contest software download is accomplished using HTTP, FTP, or other file transfer protocol, as represented by Message 415 shown in the information flow proceeds of FIG. 3A.

As indicated at Block I of FIG. 4A, the contestant installs the client software on his or her machine. This procedure will involve either executing the downloaded installation file, or initially decompressing the downloaded file and then executing a setup application contained within the compressed archive. The installation procedure will install the contest client 340 application, as well as one or more customized device drivers 350 required by the contestant's client machine. The device drivers will be used to communicate directly with the local clock and any timing hardware (GPS, etc) used in the client machine. Upon successful installation of the client software, the contestant's computing system will become a fully enabled "client machine", and thus ready to participate in a contained competition in accordance with the principles of the present invention.

Details Relating the Operation Specified in Block B in FIG. 4

In FIG. 4B, the suboperations are shown for carrying out the method of logging a contestant onto the game server 150 indicated at Block B in FIG. 4. In general, this procedure involves a number of "behind-the-scenes" activities by the various server systems, in addition to the actual log on process. Initially, all servers and clients in the system are provided with the address of the login server 120 as well as with the login server's encryption "public key", which is used to send secure message to the login server.

Figure 3B:
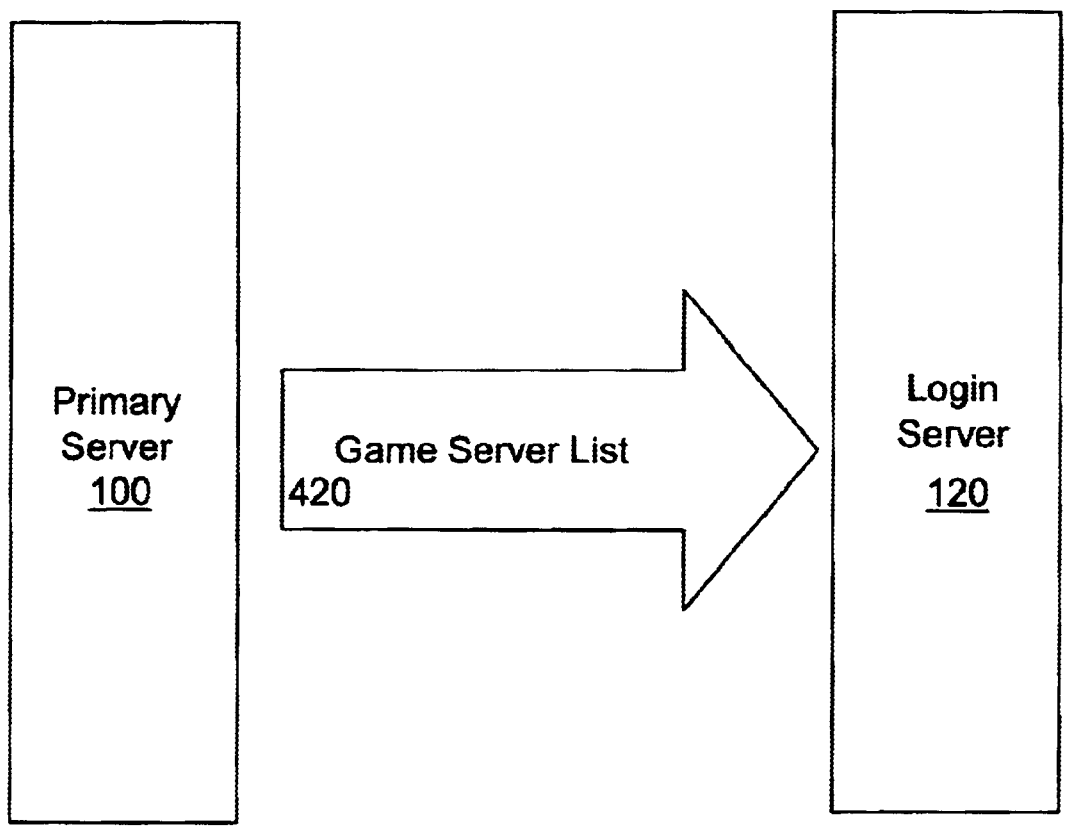
FIG. 3B is a schematic representation of the flow of data and messages between the primary server 100 and the login server 120 employed in the system of the present invention, wherein the data flow includes a list of game servers sent from the primary server to the login server.

As indicated at Block A in FIG. 4B, the primary server 100 transmits a list of all the participating game servers to the login server 120. This message, shown as 420 in FIG. 3B, is encrypted using the login server's public key. The login server 120 decrypts and stores this message using its private key.

Figure 3C:
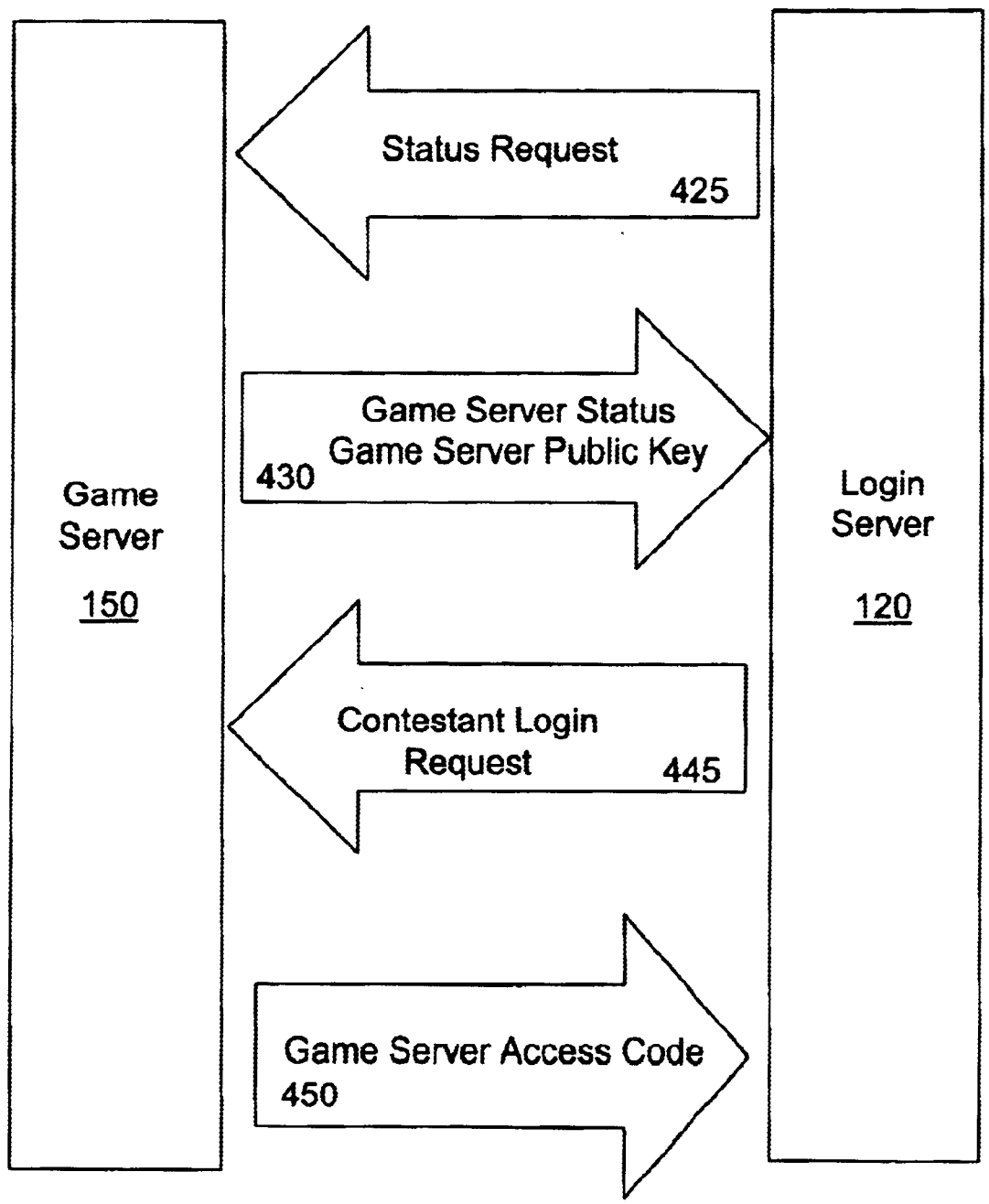
FIG. 3C is a schematic representation of the flow of data and messages between a game server 150 and the login server 120 employed in the system of the present invention, wherein the data flow includes a request for game server status by the login server, and the request includes the login server's public key for encryption, and wherein the data flow also includes an encrypted reply by the game server to the login server containing status and loading information about the game server, as well as the game server's public key for encryption use by the login server and client machine, wherein the data flow also includes an encrypted contestant login request from the login server to the game server and a corresponding encrypted reply from the game server to the login server containing a game server access code.

As indicated at Block B in FIG. 4B, the login server sends a status request message to each of the game servers. In FIG. 3C, this status request message is indicated by Message 425.

As indicated at Block C in FIG. 4B, each game server 150 sends a reply in response to the status request message (i.e. Message 425), containing information about the status of the game server, including current loading, indications of maximum server capacity, geographical area of coverage, and other information. In addition, this reply contains the game server's public encryption key. The entire reply, indicated by Message 430 in FIG. 3C, is encrypted using the login server's public key. Status request message 425 and response message 430 occur during the initialization of the contest system, as well as periodically throughout the operation of each contest enabled by the system hereof.

As indicated at Block D in FIG. 4B, the contestant must log on to the system using the contest client application when the contestant decides to participate in a particular contest. During this stage of the process, the contest client machine 160 requests a username and password from the contestant for the convenience of the contestant. This username and password may be stored locally on the client machine to avoid the contestant having to re-enter the username and/or password every time he or she plays a game or participates in a contest.

As indicated at Block E in FIG. 4B, the contest client software 340 transmits the username and password to the login server 120. The username, password, and the client machine's public key are first encrypted using the login server's public key, and the resulting login request, indicated as Message 435 in FIG. 3D, is sent from the client machine 160 to the login server 120.

As indicated at Block F in FIG. 4B, the login server 120 decrypts the login request, obtaining the username and password. The username and password are obtained by performing a lookup operation in the contestant database 130, thereby obtaining a contestant ID.

Figure 3D:
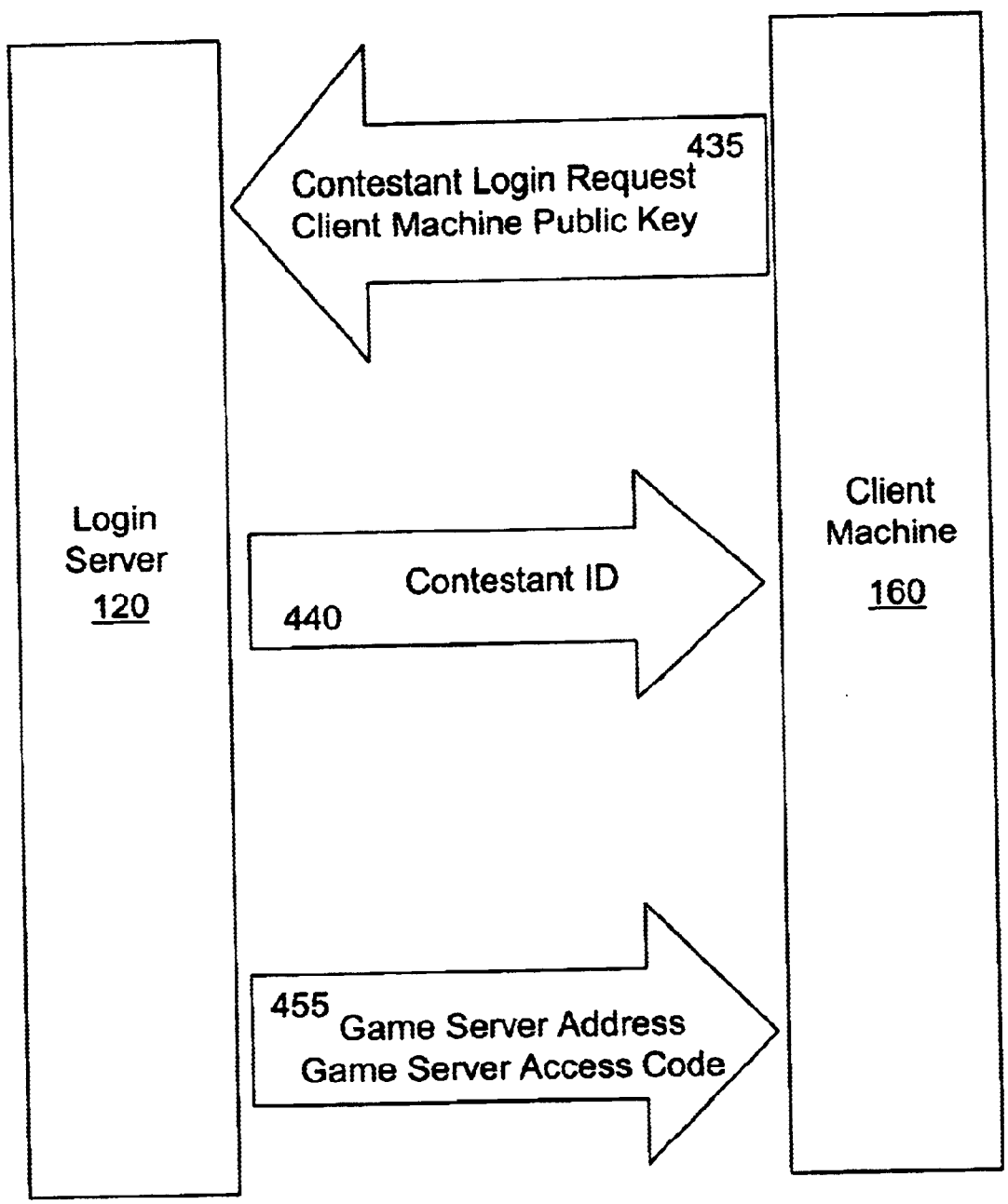
FIG. 3D is a schematic representation of the flow of data and messages between the login server 120 and a client machine 160, this data includes an encrypted contestant login request from the client machine to the login server, a message containing an encrypted contestant id sent from the login server to the client machine, and an encrypted message from the login server to the client machine containing a game server address and associated game server access code.

As indicated at Block G in FIG. 4B, the contestant ID is transmitted to the client machine 160, as Message 440 shown in FIG. 3D. The client machine 160 stores this ID for later use.

As indicated at Block H in FIG. 4B, the login server 120 selects an appropriate game server 150 for this contestant, based on loading, geographical location, and other factors.

As indicated at Block I of FIG. 4B, upon selecting a game server, the login server 120 sends a login request, indicated as Message 445 in FIG. 3C, containing the contestant ID and the client machine address to the selected game server. This message 445 is encrypted using the game server's public key. If the login request is granted, then the game server 150 creates a message containing a game server access code, indicated as Message 450 in FIG. 3C, encrypted using the login server's public key.

As indicated at Block J in FIG. 4B, this message (containing the game server access code) is sent from the game server 150 to the login server 120. Notably, the game server access code is a key created using the contestant ID and the client machine address. This code will only allow the specified contestant to log in using that code.

The login server decrypts Message 450, and then creates a new message, indicated as Message 455 in FIG. 3D, containing the game server's address and the game server access code. As indicated at Block K in FIG. 4B, Message 455 is encrypted using the client machine's public key, and sent from the login server 120 to the client machine 160.

The client machine decrypts Message 455 containing the game server address and the game server access code using its private decryption key. The client machine then creates a message, indicated as Message 460 in FIG. 3D, containing the contestant ID, the game server access code, and a client machine public encryption key. As indicated at Block L in FIG. 4B, Message 460 is sent from the client machine 160 to the game server 150 specified by the game server address received from the login server 120. The game server 150 responds with Message 463 containing the game server public key. At this point, the client machine 160 has successfully logged on to the game server 150 chosen for the client machine by the login server 120.

Details Relating the Operation Specified in Block,C in FIG. 4

Figure 4C:
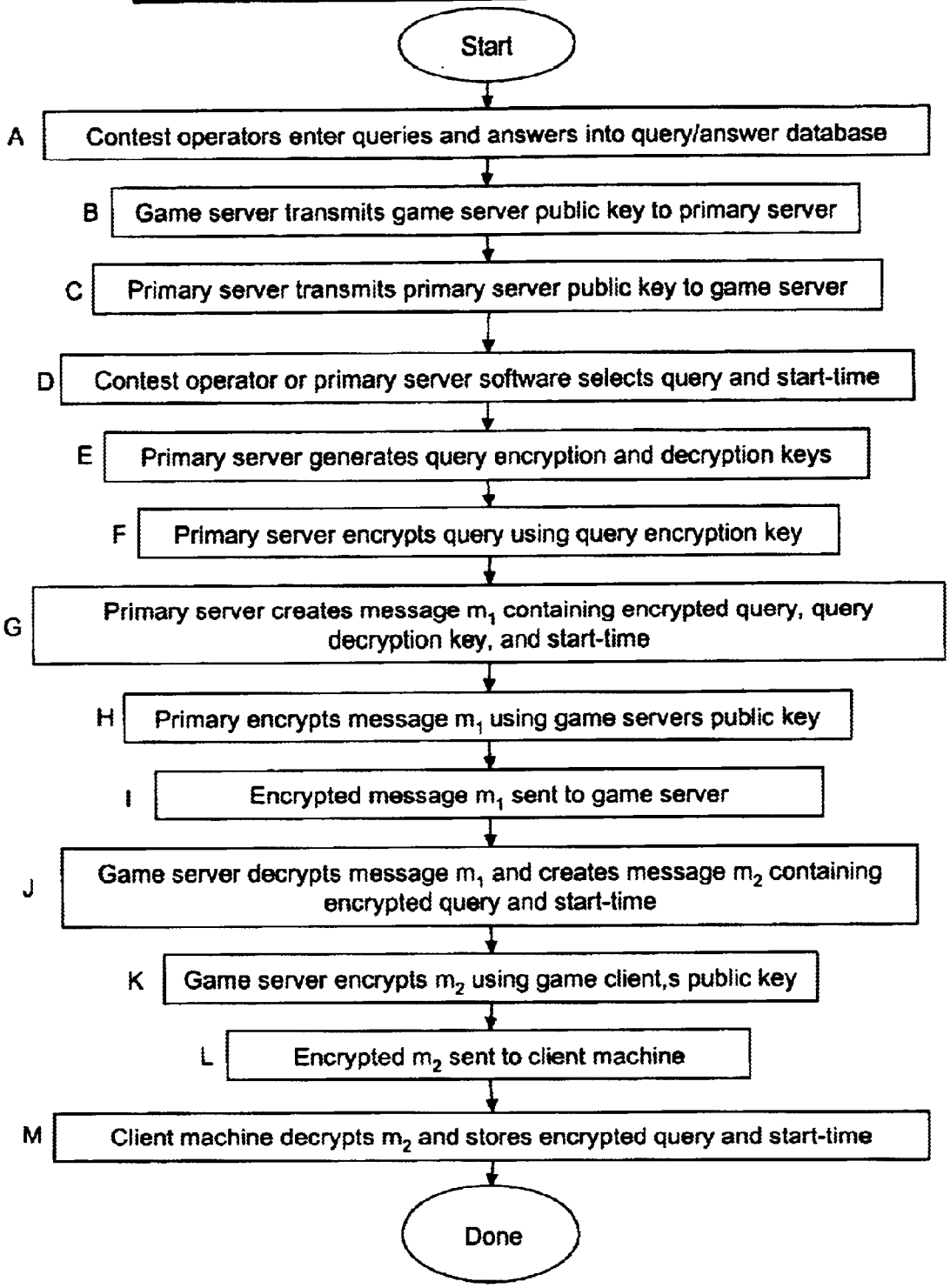
FIG. 4C is a flowchart describing in greater detail a method for downloading an encrypted query and start-time to the client machine 160.

In FIG. 4C, the suboperations are shown for carrying out the method of downloading an encrypted query and start-time to the client machine indicated at Block C in FIG. 4.

All of the contest questions and answers originate with the game/contest designers who typically will be human beings, although not necessarily the case for all types of time-constrained competitions.

As indicated at Block A in FIG. 4C, human operators enter the questions and associated answers relating to a particular contest into the query/answer database 140.

Figure 3E:
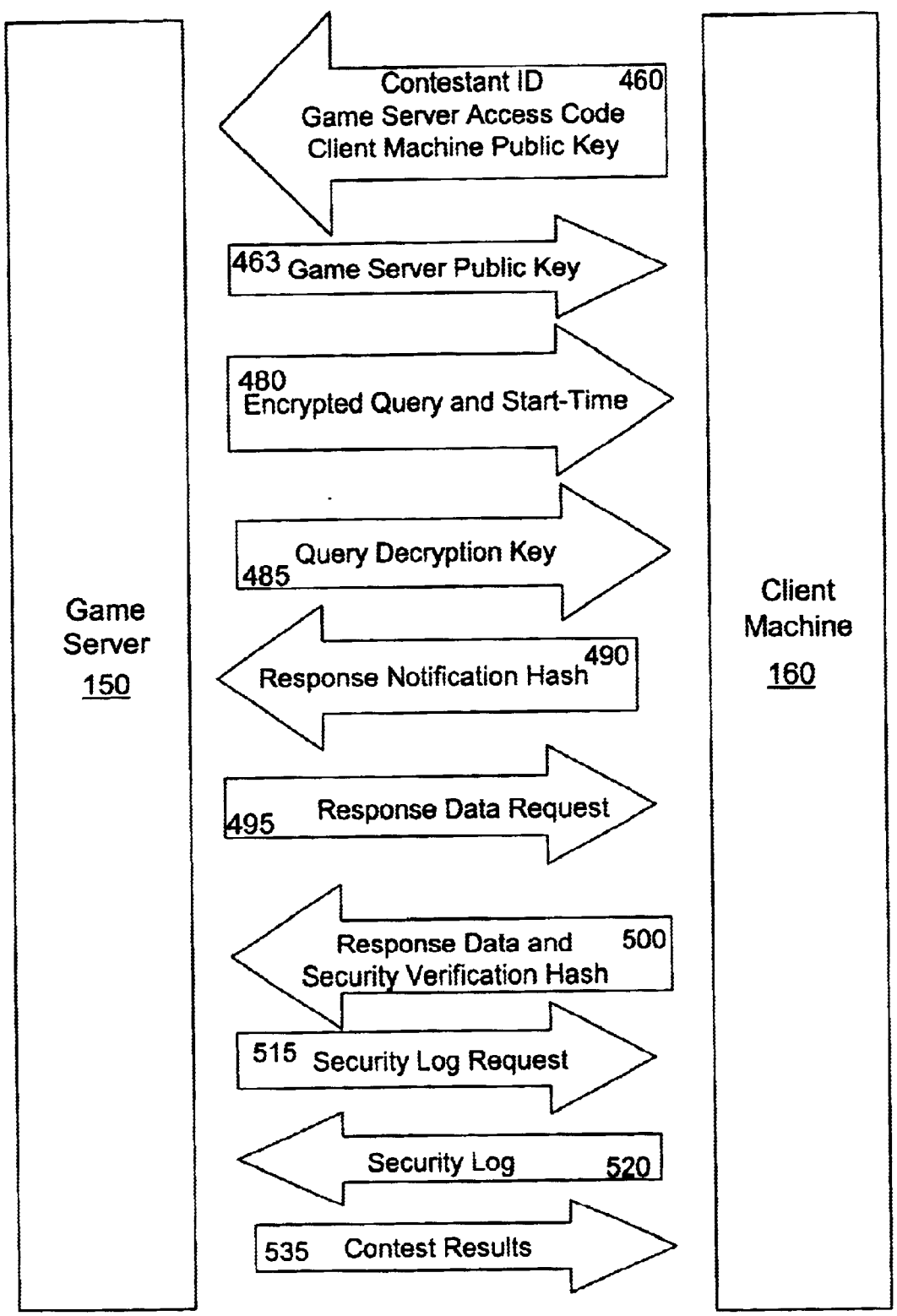
FIG. 3E is a schematic representation of the flow of data and messages between a game server 150 and a client machine 160, wherein the data flow includes a message from the client machine to the game server containing a contestant ID, a game server access code, and a client machine public key, an additional message from the game server to the client machine containing the game server public key, an additional message from the game server to the client machine containing and encrypted query and start-time, a further message from the game server to the client machine containing an encrypted query decryption key, a further message from the client machine to the game server containing a response notification hash, a further message from the client machine to the game server containing the encrypted response data and security verification hash, a further message from the game server to the client machine containing the security log request, a further message from the client machine to the game server containing the encrypted security log, a final message from the game server to the client machine containing the contest results.
Figure 3F:
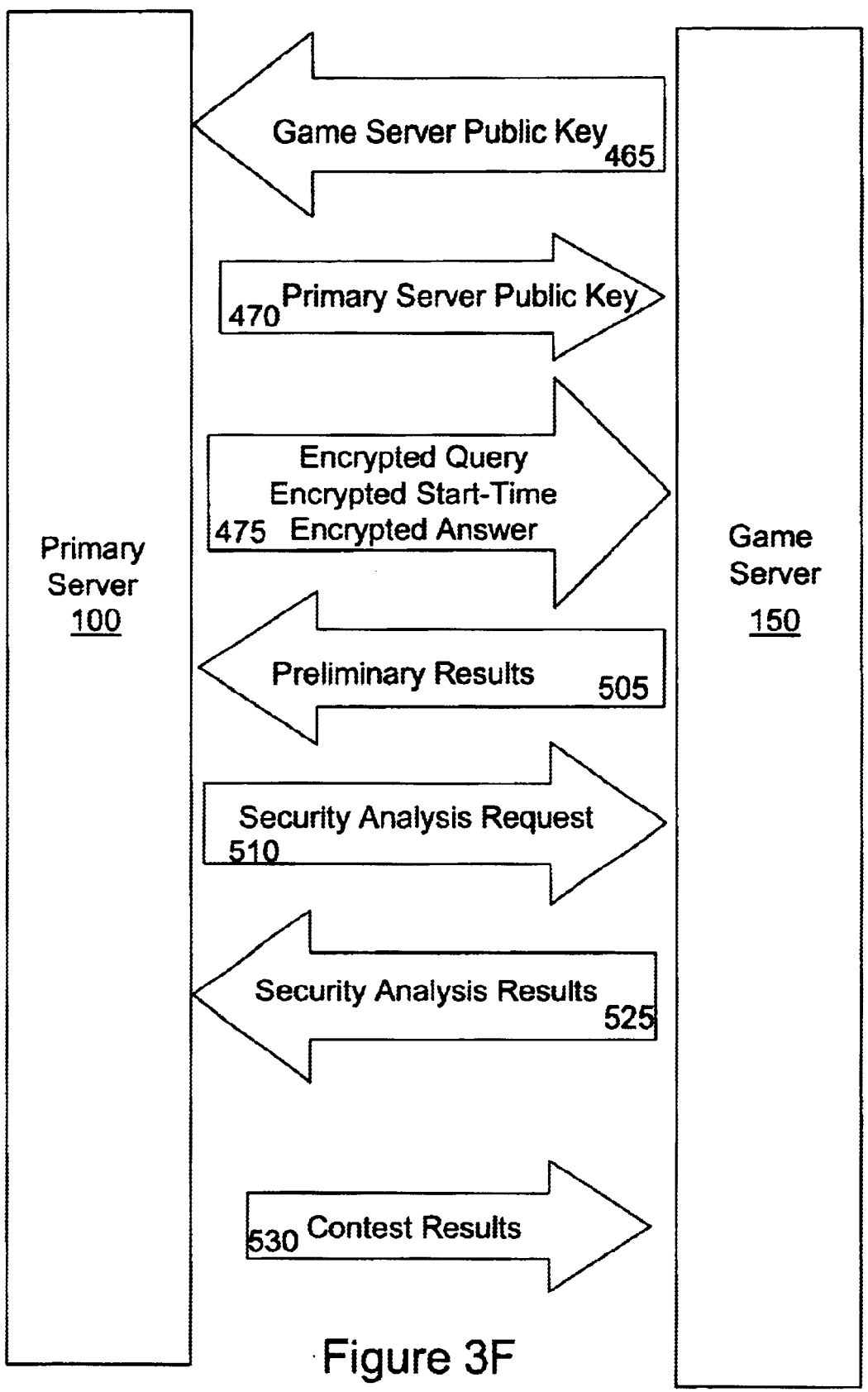
FIG. 3F is a schematic representation of the flow of data and messages between the primary server 100 and a game server 150, wherein the data flow includes a message from the game server to the primary server containing the game server public key, an additional message from the primary server to the game server containing the primary server public key, a further encrypted message from the primary server to the game server containing the encrypted query, encrypted start-time, and encrypted answer, a further message from the game server to the primary server containing the encrypted preliminary results for the contest, a further message from the primary server to the game server containing an encrypted security analysis request, a further message from the game server to the primary server contains the encrypted security analysis results, a final message from the primary server to the game server containing the encrypted contest results.

As indited at Block B in FIG. 4C, at some point before the contest begins, the game server 150 sends to the primary server 100, a message, indicated as Message 465 in FIG. 3F, containing its public encryption key. Similarly, as indicated at Block C in FIG. 4C, the primary server sends to the game server 150, a message indicated as Message 470 in FIG. 3F, containing its public encryption key.

As indicated at Block D in FIG. 4C, when a particular contest is created, the human operators, accessing the system through the contest management interface 260, select queries from the database to be used in the contest. For each query, the operator assigns a desired start-time. Selecting queries and assigning start-times could also be done automatically by the contest management interface software.

As indicated at Block E in FIG. 4C, for each query and start-time, the primary server generates a unique set of query encryption and decryption keys.

As indicated at Block F in FIG. 4C, using the query encryption key, the primary server 100 encrypts the query.

As indicated at Block G in FIG. 4C, the primary server 100 creates a message, indicated as Message 475 in FIG. 3F, containing the encrypted query, the query decryption key, and the desired start-time.

As indicated at Block H in FIG. 4C, the entire Message 475 is encrypted using the game server's public encryption key.

As indicated at Block I in FIG. 4C, the entire Message 475 is sent from the primary server 100 to the game server 150.

As indicated at Block J in FIG. 4C, upon receiving the Message 475 from the primary server 100, the game server 150 decrypts the Message 475 and creates a new message, indicated as Message 480 in FIG. 3F.

As indicated at Block K in FIG. 4C, this new Message 480 is encrypted by the game server using the client machine's public key.

As indicated at Block L in FIG. 4C, the resulting encrypted Message 480 is sent to the client machine.

As indicated at Block M in FIG. 4C, the client machine decrypts the Message 480, and stores the encrypted query contained within, along with the start-time on the client machine 160.

At this point, the client machine 160 creates and begins appending data to a security verification log file. This encrypted file will contain a variety of information about the timing of the query/response process. Among other data, the security verification log will record the arrival-time (in local time) of the encrypted query from the game server 150.

Details Relating the Operation Specified in Block D in FIG. 4 when Using Basic GSU of the Present Invention In FIG. 4D, the suboperations are shown for carrying out the method of characterizing the client machine's local clock and synchronizing the client machine display update cycle indicated at Block D in FIG. 4 for a system that utilizes a basic GSU 175. When using a GSU, there is no need to characterize the local clock, and the only procedure necessary is to adjust the display refresh cycle such that a cycle completes precisely at the desired start-time.

The GSU of the present invention is used to measure the video refresh rate of the video display adapter. Almost every video display adapter used in personal computers has a set of registers used to control and monitor the scanning and refresh periods and rates. One standard function is the ability to query the adapter to determine whether it is currently in a vertical retrace period or not. By using this function over a period of time, and recording the local clock time each time the display enters vertical retrace, the period and phase of the display update cycle is determined with respect to local clock time. By reading the display adapter registers, it is simple to determine the difference between the time the last line of the displayed image is drawn and the beginning of the next vertical retrace. The instant that the last line of the display is drawn in any display update period will be referred to as the display time ($t_d$). Using this calculated period and phase, the display times are extrapolated forward in time to find the display time closest to the desired start-time. As indicated at Block A in FIG. 4D1, the error ($E_d$) between the display time ($t_d$) and the desired local clock start time ($t_{sl}$) is calculated. Throughout this process, the times associated with each vertical retrace are appended to the security verification log.

Since it is desired to have the client machine display the query simultaneously on all client machines (i.e. at the common start-time), the error term $E_d$ is minimized by shifting the phase of the display update cycle. A value of 0 for $E_d$ indicates that the display will complete drawing the given image at the precise moment of the start-time. The phase of the display update cycle is adjusted by increasing or decreasing the display update period over a number of update cycles. This period is typically determined by several registers on the display adapter, controlling the so-called "vertical total", "horizontal total", and the "dot clock". The vertical total is the total count of lines, both displayed and un-displayed (within the vertical blanking and retrace period), that make up one display update cycle. Similarly, the horizontal total measures the number of pixels, both displayed and within the horizontal blanking and retrace period. The dot clock frequency determines the number of pixels per second rendered to the display. By adjusting any one of these three values temporarily, the period of the display update cycle may be changed, again temporarily. Although it might be possible to align $t_d$ with $t_{sl}$ within a single update cycle, it is probably not desirable to make such a large modification to the display update period, since this can cause monitor clicking and may temporarily disrupt the displayed image. Instead, the display update period is modified only slightly (perhaps adjusting the vertical total by one or two lines), and the period is left adjusted until enough phase shift accumulates to reduce $E_d$ to near zero, at which time the display update period is restored to its original value. As indicated at Block B in FIG. 4D1, the client machine adjusts the display update cycle over a number of cycles in order to minimize $E_d$ and completely display the query at the desired start-time.

Note that depending on the accuracy of the clocks, the frequency drift of the clocks and the refresh update cycle, and the distance into the future that the display time is extrapolated, it may be necessary to repeat the alignment procedure to reduce these errors. The display time alignment procedure should be considered an ongoing process, perhaps being performed concurrently with other steps in the contest process. As always, information about this process is recorded in the security verification log, providing a continuous trace of the operations taking place and the timing of those operations.

Details Relating the Operation Specified in Block D in FIG. 4 when Using the Enhanced GSU of the Present Invention In FIG. 4D, the suboperations are shown for carrying out the method of synchronizing the client machine display update cycle indicated at Block D in FIG. 4, for a system that utilizes an enhanced GSU 177. When using an enhanced GSU 177, there is no need to characterize the local clock. In addition, the display monitor is connected directly to the GSU 177, with the video signal from the client machine being passed through the GSU. The enhanced GSU can override the signal from the client machine, replacing it with its own video signal, which is automatically synchronized with the GSU clock. As indicated at Block A in FIG. 4D2, there are no steps required by the client machine to achieve this synchronization.

Details Relating the Operation Specified in Block D in FIG. 4 without Using the GSU of the Present Invention In FIG. 4D, the suboperations are shown for carrying out the method of characterizing the client machine local clock and synchronizing the client machine display update cycle indicated at Block D in FIG. 4, for a system that does not utilize a global synchronization unit.

As indicated at Block A in FIG. 4D3, the local clock is "characterized". This process of characterization can be understood as follows. Given an abstract idealized "universal clock time", t, a local clock $t_l=f(t)$ (e.g. the system timer, real time clock, or for greater precision, the CPU clock cycle counter), and a global clock $t_g=g(t)$ maintained on the primary server, the local clock is said to be "characterized" when it is expressed as a function of the global clock value, $t_l=f(g^{-1}(t_g))$. Characterization of the local clock with respect to the global clock will be defined as determining some function $h(x)=f(g^{-1}(x))$. Over reasonable time periods, and assuming fairly high quality timing hardware, $h(x)$ will be well approximated by a linear function. The simplest method of determining this function is to use standard curve-fitting techniques. If the global clock on the primary server 100 is a GPS-based time reference, the local clock may be characterized very precisely by also using a GPS reference in the client machine. The GPS hardware can easily produce an extremely accurate and stable 1 Hz signal. This signal is connected to one of the CPU IRQ lines. This causes the CPU to enter an interrupt service routine every second. At the instant the interrupt is triggered, the CPU can record the reading of the local clock (CPU cycle counter register). After collecting a number of such samples, the function $h(x)$ may be approximated to a high degree of accuracy.

The statistical information collected in order to determine the clock characterization function is appended to the security verification log.

As indicated at Block B in FIG. 4D3, after determining $h(x)$, the client machine then uses this function to calculate the local clock time ($t_{sl}$) corresponding to the desired global clock start-time ($t_{sg}$) for the contest.

Next the video display update cycle is measured using the local clock. Almost every video display adapter used in personal computers has a set of registers used to control and monitor the scanning and refresh periods and rates. One standard function is the ability to query the adapter to determine whether it is currently in a vertical retrace period or not. By using this function over a period of time, and recording the local clock time each time the display enters vertical retrace, the period and phase of the display update cycle is determined with respect to local clock time. By reading the display adapter registers, it is simple to determine the difference between the time the last line of the displayed image is drawn and the beginning of the next vertical retrace. The instant that the last line of the display is drawn in any display update period will be referred to as the display time ($t_d$). Using this calculated period and phase the display times are extrapolated forward in time to find the display time closest to the desired start-time.

As indicated at Block C in FIG. 4D3, the client machine calculates the error ($E_d$) between the desired local clock start-time ($t_{sl}$) and the closet display update cycle (i.e. display time ($t_d$)). Throughout this process, the times associated with each vertical retrace are appended to the security verification log.

Since it is desired to have the client machine display the query simultaneously on all client machines, the error term $E_d$ is minimized by shifting the phase of the display update cycle. A value of 0 for $E_d$ indicates that the display will complete drawing the given image at the precise moment of the start-time. The phase of the display update cycle is adjusted by increasing or decreasing the display update period over a number of update cycles. This period is typically determined by several registers on the display adapter, controlling the so-called "vertical total", "horizontal total", and the "dot clock". The vertical total is the total count of lines, both displayed and un-displayed (within the vertical blanking and retrace period), that make up one display update cycle. Similarly, the horizontal total measures the number of pixels, both displayed and within the horizontal blanking and retrace period. The dot clock frequency determines the number of pixels per second rendered to the display. By adjusting any one of these three values temporarily, the period of the display update cycle may be changed, again temporarily. Although it might be possible to align $t_d$ with $t_{sl}$ within a single update cycle, it is probably not desirable to make such a large modification to the display update period, since this can cause monitor clicking and may temporarily disrupt the displayed image. Instead, the display update period is modified only slightly (perhaps adjusting the vertical total by one or two lines), and the period is left adjusted until enough phase shift accumulates to reduce $E_d$ to near zero, at which time the display update period is restored to its original value. This alignment of the display update cycle with the desired start-time satisfies the criteria set forth at Block D in FIG. 4D3.

Note that depending on the accuracy of the clocks, the frequency drift of the clocks and the refresh update cycle, and the distance into the future that the display time is extrapolated, it may be necessary to repeat the alignment procedure to reduce these errors. The display time alignment procedure should be considered an ongoing process, perhaps being performed concurrently with other steps in the contest process. As always, information about this process is recorded in the security verification log, providing a continuous trace of the operations taking place and the timing of those operations.

Details Relating the Operation Specified in Block E in FIG. 4 when Using the Basic GSU of the Present Invention In FIG. 4E1, the suboperations are shown for carrying out the method of presenting the query to the contestant at the contest start-time indicated at Block E in FIG. 4, for a system that utilizes a basic GSU 175. At this point, the encrypted query and start time has been stored on the client machine, and the display time has been aligned with the desired start-time.

As indicated at Block A in FIG. 4E1, the client machine uploads the encrypted query and start time to the GSU 175.

As indicated at Block B in FIG. 4E1, a short time prior to the desired start-time, the GSU 175 decrypts the query. This query is then downloaded to the client machine.

As indicated at Block C in FIG. 4E1, the query is then rendered to an off-screen memory area in preparation for display on the screen.

As indicated at Block D in FIG. 4E1, during the vertical retrace period that is one cycle before the display time, the off-screen image is flipped to the display, using hardware page-flipping techniques, or by blitting the image to the screen during the retrace period.

As indicated at Block E in FIG. 4E1, with the query image now residing in the currently displayed video memory, the client machine display draws the query onto the screen, reaching the bottom of the display at the start-time for the contest.

Finally, the client machine records the local time at the moment the vertical retrace begins, which should be simultaneous with the desired start-time. This time is also stored in the security verification log.

After the image is displayed, the client machine is primarily waiting for the contestant to enter their answer or response to the query that was presented. However, during this time, the client machine is not idle, but rather continues to monitor the various clocks and timing systems on the client machine (e.g. system timer, real time clock, CPU cycle counter, vertical retrace signal, etc). Information about the clocks is stored in the security verification log.

Details Relating the Operation Specified in Block E in FIG. 4 when Using the Enhanced GSU of the Present Invention In FIG. 4E2, the suboperations are shown for carrying out the method for presenting the query to the contestant at the contest start-time indicated at Block E in FIG. 4, for a system that utilizes an enhanced GSU 177. At this point, the encrypted query and start time has been stored on the client machine.

As indicated at Block A in FIG. 4E1, the client machine uploads the encrypted query and start time to the GSU 177.

As indicated at Block B in FIG. 4E2, the GSU decrypts the query immediately prior to the desired start-time. The query is then rendered by the GSU into its own display memory.

As indicated at Block C in FIG. 4E2, the GSU overrides the display, using its own synchronized refresh rate, and presents the query precisely at the desired start-time.

Details Relating the Operation Specified in Block E in FIG. 4 when Not Using the GSU of the Present Invention In FIG. 4E3, the suboperations are shown for carrying out the method of presenting the query to the contestant at the contest start-time indicated at Block E in FIG. 4, for a system that does not utilize a global synchronization unit. At this point, the encrypted query has been stored on the client machine, the start-time is known in terms of the local clock, and the display time has been aligned with the desired start-time.

As indicated at Block A in FIG. 4E3, the game server transmits the query decryption key to the client machine. This query description key is shown as Message 485 in FIG. 3E. The timing of this message is important, since it must be sent early enough to allow the client machine time to decrypt and display the message before the desired start-time. On the other hand, if the query decryption key is sent too early, it compromises the security of the system since an unscrupulous user could use the key to decrypt the query and view it ahead of the start-time, thereby gaining an advantage over other users. Extensive testing will be used to determine the best timing for this message.

As indicated at Block B in FIG. 4E3, the client machine decrypts the query upon receipt of the query decryption key. In addition, the local clock time of the receipt of the query decryption key is recorded in the security verification log.

As indicated at Block C in FIG. 4E3, the query is then rendered to an off-screen memory area, in preparation for display on the screen.

As indicated at Block D in FIG. 4E, during the vertical retrace period that is one cycle before the display time, the off-screen image is flipped to the display, using hardware page-flipping techniques, or by blitting (i.e. copying) the image to the screen during the retrace period.

As indicated at Block E in FIG. 4E3, with the query image now residing in the currently displayed video memory, the client machine display draws the query onto the screen, reaching the bottom of the display at the start-time for the contest. Finally, the client machine records the local time at the moment the vertical retrace begins, which should be simultaneous with the desired start-time. This time is also stored in the security verification log.

After the image is displayed, the client machine is primarily waiting for the contestant to enter their answer or response to the query that was presented. However, during this time, the client machine is not idle, but rather continues to monitor the various clocks and timing system on the computer (system timer, real time clock, CPU cycle counter, vertical retrace signal, etc). Information about the clocks is stored in the security verification log.

Details Relating the Operation Specified in Block F in FIG. 4 when Using the Basic GSU of the Present Invention In FIG. 4F, the suboperations are shown for carrying out the method of submitting a time-stamped contestant response to a previously presented query indicated at Block F in FIG. 4, for a system that utilizes a basic GSU 175.

As indicated at Block A in FIG. 4F1, the response is entered into the client machine using any of several different, methods depending on the specific contest being administered. For example, the response could consist of a single letter typed on the keyboard, a mouse click, a typed in sentence, a recorded audio segment, or other input. For timing purposes, however, it is necessary for the client machine to have a clear indication of the instant that the contestant submits this response. The response submission is typically indicated by either a mouse click at a certain location, or by a certain keypress (the<enter>key for example).

As indicated at Block B in FIG. 4F, the response submission and response is immediately sent to the GSU, which generates digitally signed time and space stamp for the response. This time and space stamp is appended to the security verification log.

As indicated at Block C in FIG. 4F1, the time and space-stamp is sent from the client machine 160 to the game server 150.

As indicated at Block D in FIG. 4F1, the game server 150 requests the actual (i.e. full) response from the client machine by sending a response request message, indicated as Message 495 in FIG. 3E. In many cases, if the response time contained within the Response Notification Message disqualifies the contestant from any chance at winning, then it will not be necessary to request the complete response, thereby greatly reducing the bandwidth requirements for this phase of the contest.

As indicated at Block E in FIG. F, if requested, the client machine encrypts the response, the response timestamp, and a hash-value of the security verification log in order to create a message, indicated as Message 500 in FIG. 3E.

As indicated at Block F in FIG. 4F1, Message 500 is then sent to the game server 150 and the security verification log is closed and write-protected.

Details Relating the Operation Specified in Block F in FIG. 4 when Using the Enhanced GSU of the Present Invention In FIG. 4F2, the suboperations are shown for carrying out the method of the contestant submitting a timestamped response to the previously presented query indicated at Block F in FIG. 4, for a system that utilizes an enhanced global synchronization unit 177. With the enhanced GSU 177, the input device is connected directly to the GSU 177.

As indicated at Block A in FIG. 4F2, the contestant uses the input device to enters the response into the client machine 160 through the GSU passthrough connection.

As indicated at Block B in FIG. 4F2, the GSU 177 automatically generates a digitally signed time and space stamp for the response. This time and space-stamp is appended to the security verification log.

As indicated at Block C in FIG. 4F2D, the time and space stamp is from the client machine to the game server 150.

As indicated at Block D in FIG. 4F2, the game server 150 requests the actual response from the client machine 160 by sending a response request message, indicated as Message 495 in FIG. 3E. In many cases, if the response time constrained within the response notification message disqualifies the contestant from any chance at winning, it will not be necessary to request the complete response, thereby greatly reducing the bandwidth requirements for this phase of the contest.

As indicated in Block E in FIG. 4F2, if requested, the client machine encrypts the response, the response timestamp, and a hash-value of the security verification log to create a message, indicated as Message 500 in FIG. 3E.

As indicated at Block F in FIG. 4F2, Message 500 is sent to the game server 150 and the security verification log is closed and write protected.

Details Relating the Operation Specified in Block F in FIG. 4 when Not Using the GSU of the Present Invention In FIG. 4F, the suboperations are shown for carrying out the method of contestant submitting a timestamped response to the previously presented query indicated at Block F in FIG. 4, for a system that does not utilize a global synchronization unit (GSU).

As indicated at Block A in FIG. 4F3, the contestant enters a response into the client machine using any of several different methods depending on the specific contest being administered. The response submission is detected by a customized low-level device driver, preferably by "hooking" an interrupt caused by the device.

As indicated at Block B in FIG. 4F3, the interrupt handler in the client machine records the local time "timestamp" corresponding to the moment the response was submitted. This local time is appended to the security verification log.

Immediately upon receipt of the response submission, after recording the timestamp, the client machine calculate a hash or CRC (cyclic redundancy check) value using the contestant's response and the timestamp. The hash value is appended to the security verification log.

As indicated at Block C in FIG. 4F3, a message containing the hash value and the response time, indicated as Message 490 in FIG. 3E, is immediately sent from the client machine 160 to the game server 150. This "response notification hash" Message is particularly useful when large responses, such as those generated from a microphone, are obtained, since the tiny packet-size will be less subject to a delay due to the bandwidth of the network. The time of receipt of the response notification hash by the game server 150 can serve as an estimate of the actual response time for later security verification.

As indicated at Block D in FIG. 4F3, the game server 1750 requests the actual (i.e. full) response from the client machine by sending a response request message, indicated as Message 495 in FIG. 3E. In many cases, if the response time contained within the response notification Message disqualifies the contestant from any chance at winning, it will not be necessary to request the complete response, thereby greatly reducing the bandwidth requirements for this phase of the contest.

As indicated at Block E in FIG. 4F3, if requested, the client machine encrypts the response, the response timestamp, and a hash-value of the security verification log to create a message, indicated as Message 500 in FIG. 3E.

As indicated at Block F in FIG. 4F3, Message 500 is then sent to the game server and the security verification log is closed and write protected.

Details Relating the Operation Specified in Block G in FIG. 4

Figure 4G:
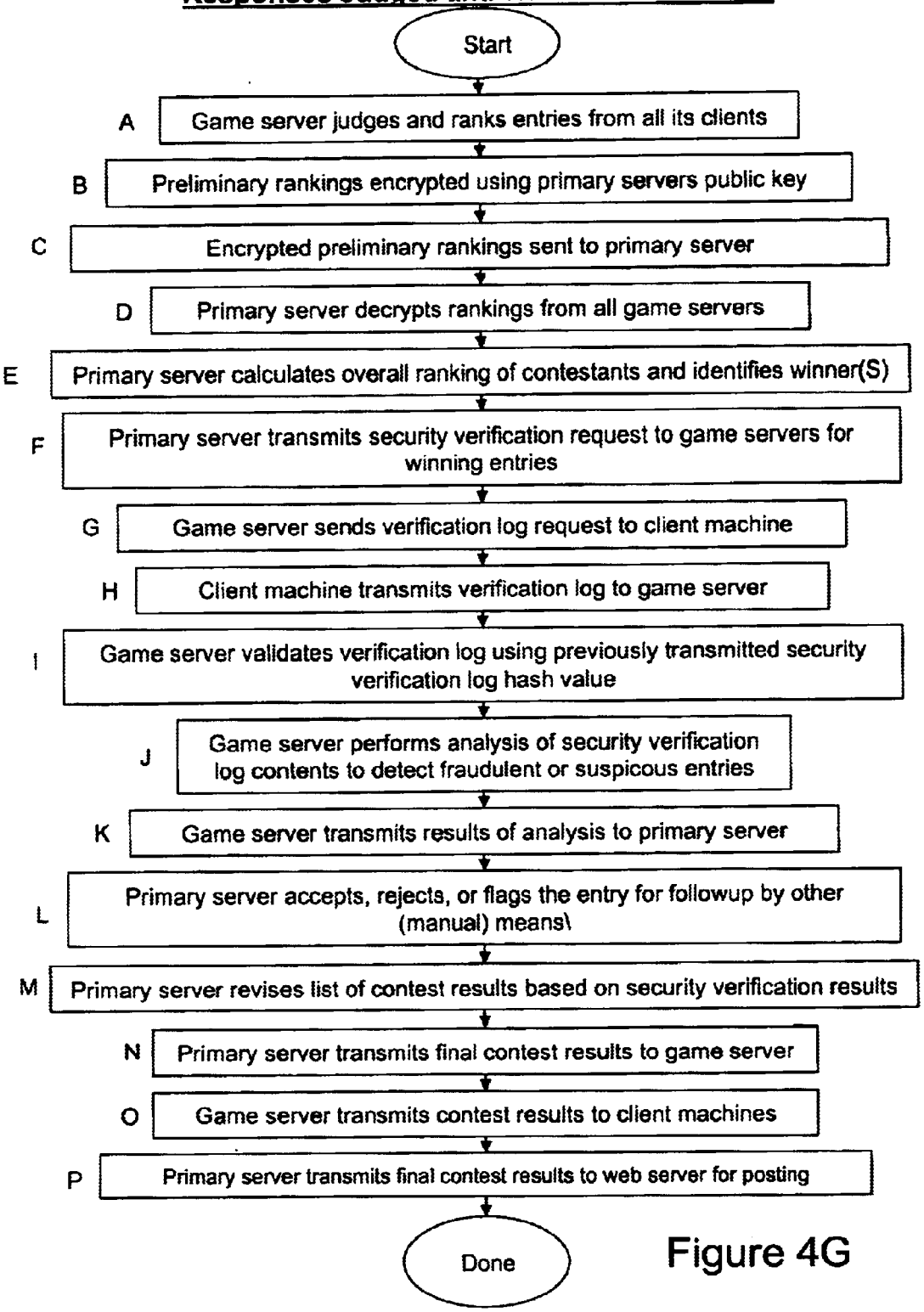
FIG. 4G is a flowchart describing in greater detail a method for fairly judging the contest and determining the winners of that contest is outlined.

In FIG. 4G, the suboperations are shown for carrying out the method of fairly judging the contest and determining the winners of that contest indicated at Block G in FIG. 4.

As indicated at Block A in FIG. 4G, as responses are received by each game server from its client machines, the responses are compared with the correct answers in database 140. Of those responses containing correct answers, the timestamps are compared to rank the responses from fastest to slowest.

As indicated at Block B in FIG. 4G, the sorted preliminary results are then encrypted using the primary server's public key.

As indicated at Block C in FIG. 4G, the encrypted preliminary results (i.e. rankings), indicated as Message 505 in FIG. 3F, as sent from the game server 150 to the primary server 100.

As indicated at Block D in FIG. 4G, the encrypted preliminary results from each game server are decrypted by the primary server 100. Using an insertion sort or other similar method, the pre-sorted preliminary rankings from the games servers are merged into a single sorted list of responses.

As indicated at Block E in FIG. 4G, from the presorted list, the primary server 100 calculates the overall ranking of the contestants and identifies the winner or winner(s) of the contest.

As indicated at Block F in FIG. 4G, for each winning response, the primary server 100 sends a security analysis request, indicated as Message 510 in FIG. 3F, to the game server that is connected to the corresponding client machine of the contestant who submitted that response.

As indicated at Block G in FIG. 4G, in response, each game server sends the security log, indicated as Message 515 in FIG. 3E, to the corresponding client machine.

As indicated at Block H in FIG. 4G, the client machine transmits to the game server, the security verification log, indicated as Message 520 in FIG. 3E, encrypted using the game server's public key.

As indicated at Block I in FIG. 4G, the game server decrypts and verifies the integrity of the security verification log using the hash-value of the security verification log.

As indicated at Block J in FIG. 4G, the game server uses the content of the security verification log to attempt to detect fraudulent activities. The response notification hash is used to make sure the response sent is consistent with the response entered at the response notification time. In addition, all of the various timing measurements can be analyzed for consistency and compared to the corresponding transmission and receipt times of messages by the game server.

As indicated at Block K in FIG. 4G, the game server compiles the results from all the requested security logs for its client machines and transmits this message, indicated as Message 525 in FIG. 3F, to the primary server 100.

As indicated at Block L in FIG. 4G, upon receiving the compiled results from all the game servers, the primary server either accepts, rejects, or flags the winning responses for further analysis by other means.

As indicated at Block M of FIG. 4G, a revised list of winners is created by the primary server based on these changes.

As indicated at Block N in FIG. 4G, this revised list is encrypted using the game server's public key and the resulting message, indicated as Message 530 in FIG. 3F, is sent back to the game server 150.

As indicated at Block O in FIG. 4G, each game server in turn transmits the contest results, indicated as Message 535 in FIG. 3E, to each of the client machines 160.

Figure 3G:
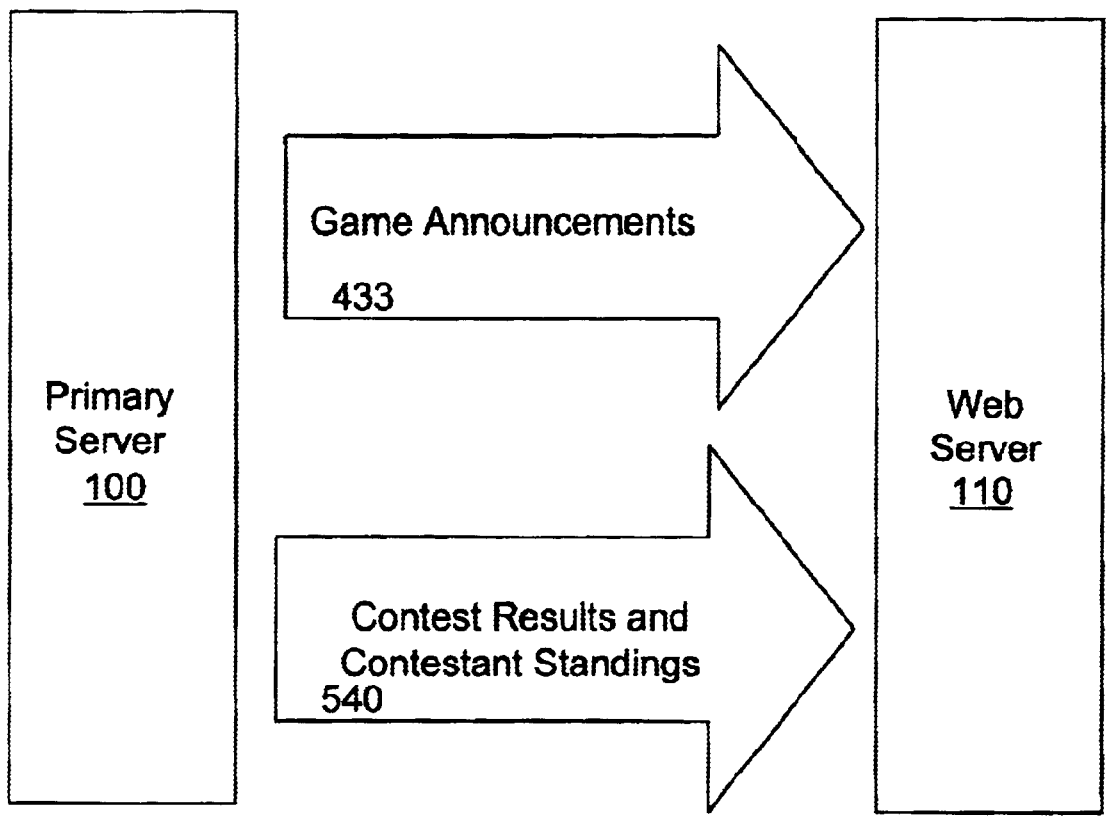
FIG. 3G is a schematic representation of the flow of data and messages between the primary server 100 and a web server 110, wherein the data flow includes game announcements delivered via ftp from the primary server to the web (http) server, and additional data delivered via ftp from the primary server to the web server includes contest results and contestant standings.

As indicated at Block P of FIG. 4G, a message containing the contest results, indicated as Message 540 in FIG. 3G, is sent from the primary server 100 to the web server 110 for posting on the contest web site.

Alternative Embodiments of the System and Method of the Present Invention Using Network Clock Synchronization In the illustrative embodiment of the system of the present invention described above, a global time reference is accessed (by each of the client machines) through the use of global positioning system (GPS) receivers located in both the client machines (within the GSUs) as well as in the primary server 100. The GPS system receives time signals from GPS satellites 180 which, in turn, receive their time signals from an atomic clock. The GPS receivers offer the most precisely synchronized time signal available for use in a distributed system of this type.

However, in particular applications, it may not be economically feasible to equip every client machine with a GSU. In such cases, an alternative method of distributing the master clock time to the clients must be used when characterizing the local clocks on the client machines or when synchronizing the client machine display update cycle.

A solution to this problem is to transmit the master clock time signals from the primary server 100, over the network 190, to the client machines 160. There is a standard method for distributing time signals over the Internet which is embodied in the network time protocol well known in the art. The network time protocol, or NTP, compensates for network latency when distributing the time signals by performing statistical analysis of the network latencies between the computers, and then taking that latency into account when transmitting the time from one machine to another. The techniques used in NTP can easily be adapted for use in characterizing the client machine's local clock, instead of using the GPS for that purpose. The characterized local clock can then be used for synchronizing the display and for causing the presentation of the query at the desired start-time. Although the generic NTP protocol could be used, in the case of the contest system security considerations dictate that additional encryption and other security measures be taken to minimize the chance of tampering with the system.

An alternative way of providing a much more accurate start-time than that achieved using the method proposed in U.S. Pat. No. 5,820,463, would be to use NTP to characterize the local clock, and then use that local clock to trigger display of a query results. This is because the prior art method of U.S. Pat. No. 5,820,463 bases the start-time on the timing and latency of a single message containing the decryption key, while the improved method of the present invention bases its start-time on the local clock, which has been characterized using many repeated messages, thereby minimizing the effects of random fluctuations in individual message latencies. The preferred embodiment of the present invention incorporating GPS entirely eliminates the effects of (variable) network latency, by bypassing the Internet through the use of satellite transmissions, wherein the latencies caused by the distance to the satellite are automatically compensated for.

In summary, the system and method of the present invention described hereinabove include a number of measures to ensure the fairness of the contest and the security of the contest against dishonest contestants and malicious third parties. Encryption is used extensively for most messages passing between machines. Confidential message protocols, combined with encryption prevent hackers from intercepting and modifying messages, thereby disrupting the contest or giving an unfair advantage to any contestant. In addition, extensive logging of all aspects of the timing procedure allows post contest analysis to detect any inconsistencies that might indicate tampering. The client software can also generate self-checking Cheating will be greatly discouraged by the knowledge that the contestant can be disqualified for any discrepancy in this log.

In addition, the system and method of the present invention can also verify that the original, unmodified client software is being executed during each competition. The system and method of the present invention may also use a challenge-response verification scheme, in which the game server sends a series of messages to the client machine software, and verifies whether the responses to those messages are as expected. The challenges and responses will include a variety of methods, varying over time, to prevent a hacker from recording the "correct" answers to queries. The responses could include pseudo-random numbers, generated using a method known by both the client and server, in which it is extremely difficult to predict the next number, or to reverse-engineer the algorithm used to generate those numbers. The challenge-response verification messages can be used at any point during the contest, for example during the time the system is waiting for a query, or waiting for a response from the contestant, or after the submission of the response.

An extremely motivated hacker might be able to circumvent some of the defenses presented above by completely disassembling the client software, thereby understanding the encryption and obscuration methods used. Therefore, the system and method of the present invention may also include another layer of security through the use of just-in-time downloaded code fragments or through the use of encrypted code fragments with just-in-time downloaded decryption keys. In accordance with this method, crucial parts of the client software, particularly those used for secure communications (encryption and decryption), those used for clock manipulation and monitoring, and those used to perform self-checking on the program.

Clearly the embodiment that incorporates a GSU 175, and in particular the enhanced GSU 177 has much stronger security, since the encryption and decryption on the client machine may be performed entirely within the GSU hardware. Additionally, as timestamping and query presentation timing are performed in hardware, many of the opportunities to trick the system are avoided. For the highest level of security, the GSU itself will be physically sealed with tamper-evident devices, and in the event of a large prize award, the GSU will be examined as part of the requirements when claiming the prize.

Remote Creation and Administration of Contests within the Contest-Promoting System of the Present Invention The contest-promoting system of FIG. 2 described hereinabove utilizes a "centralized" contest creation and administration subsystem, wherein the contest management interface software 260 located on the primary server 100 is used by the contest administrators to enter questions and answers into database 140, to design and specify contests, to schedule contests, and to monitor and control those contests.

Figure 6:
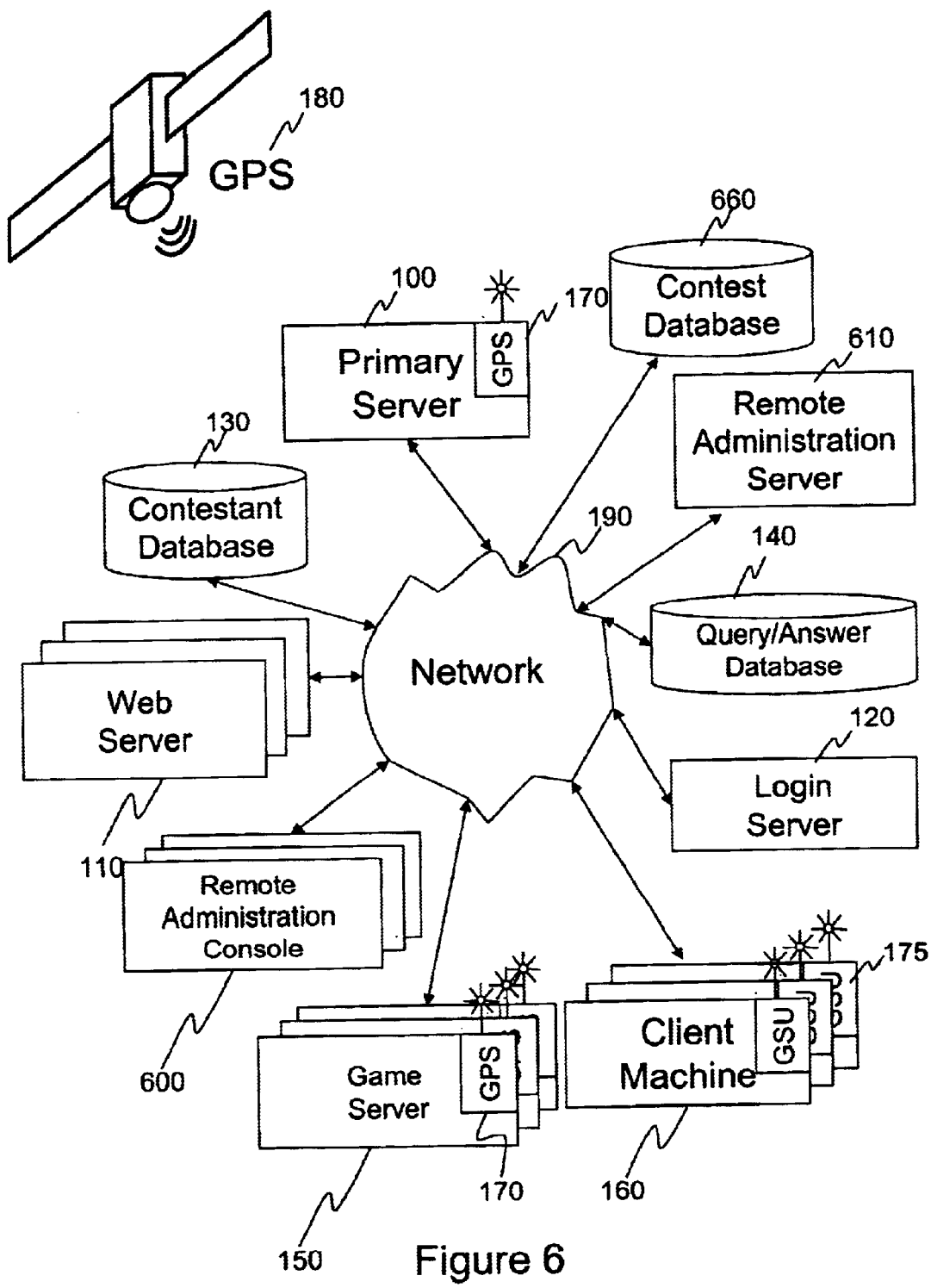
FIG. 6 is a schematic representation of a modified embodiment of the Internet-based competition-promoting system of the present invention, wherein one or more remote administration consoles 600, contest database 660, and a remote administration server 610 are provided for remotely creating and administering contests over the Internet.
Figure 6A:
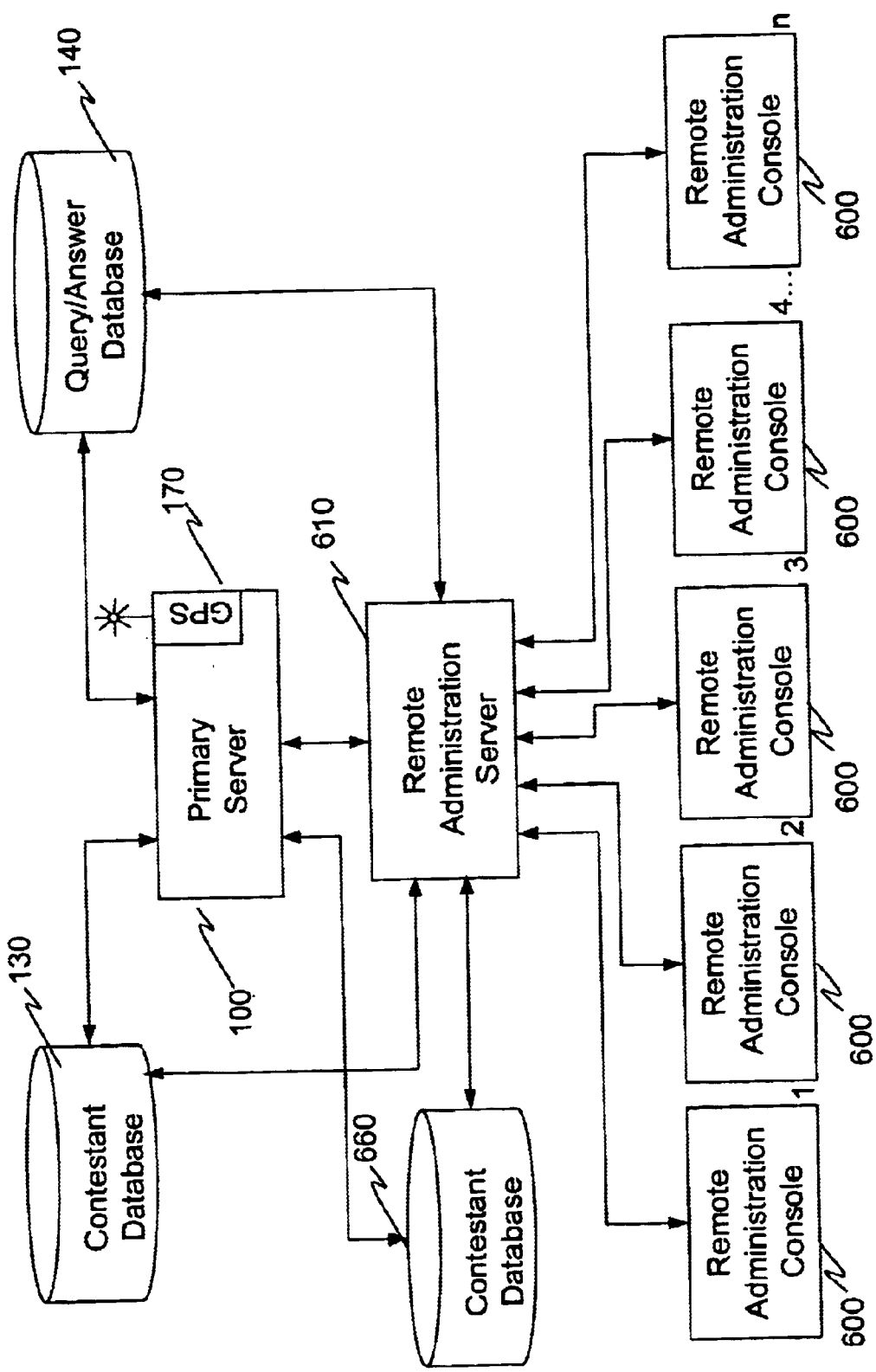
FIG. 6A is a schematic representation of the components shown in FIG. 6 directly involved in the remote administration of contests, showing the virtual network connections between the primary server 100 and a remote administration server 610, between the remote administration server 610 and a contest database 660, contestant database 130, and query answer database 140, as well as between the remote administration server 610 and one or more remote administration consoles 600.
Figure 6B:
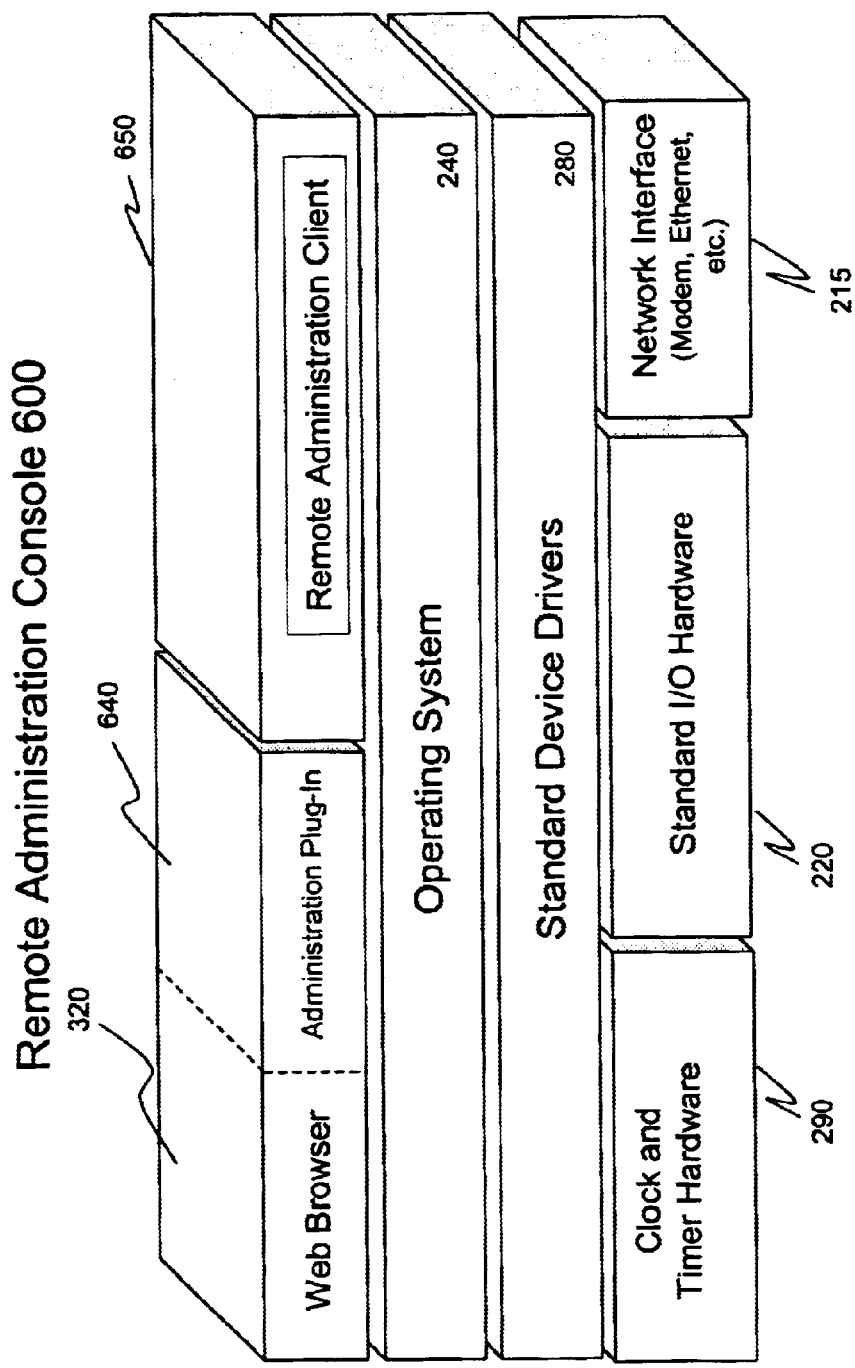
FIG. 6B is a schematic representation of some of the major components of a remote administration console 600 employed in the system of FIG. 6, showing various hardware and software layers, including the administration software being comprised of a remote administration client application 650 and a remote administration plug-in 640.
Figure 6C:
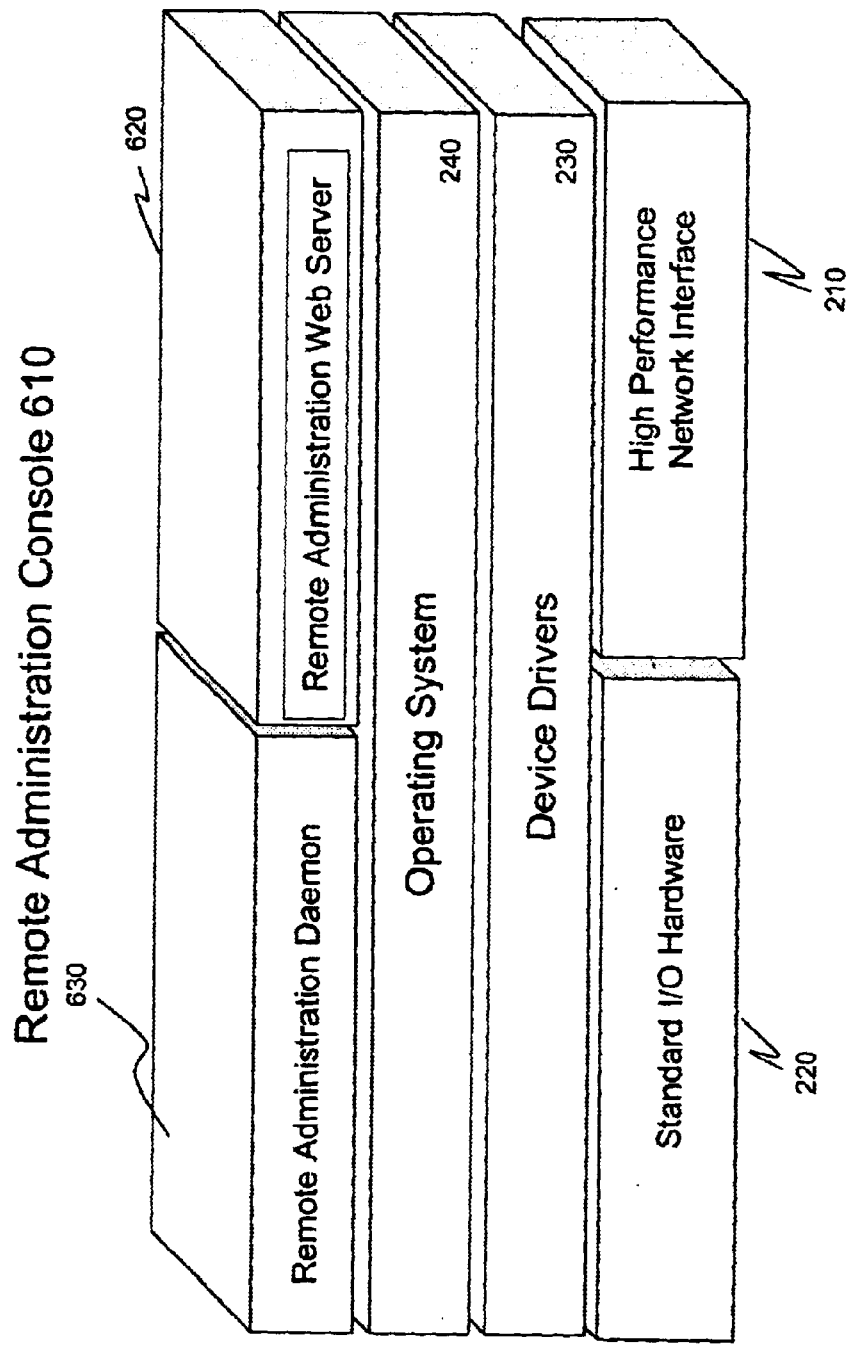
FIG. 6C is a schematic representation of some of the major components of a remote administration server 610 employed in the system of FIG. 6, showing various hardware and software layers, including the remote administration web server 620 and the remote administration daemon 630.

In order to provide contest administrators greater flexibility in contest creation, management and execution, the contest-promoting system of FIG. 2 can be modified to further include additional components and processes depicted in FIGS. 6 through 6C which collectively enable contests to be created and administered from any number of remote administration consoles 600 located anywhere around the globe. This feature of the present invention has a number of important advantages. For example, remote contest creation and administration creates additional opportunities and potential business models. In particular, administration of tests and quizzes in educational settings is an ideal application for a remotely administered time-constrained contests (or tests) carried out using the contest-promoting system of the present invention. Often, teachers, professors, and other educators wish to control the content and format of the testing and evaluation tools they provide. Using the contest-promoting system shown in FIG. 6, the educator can easily set up a remote administration console 600, and then use that console to design, test, schedule, and administer a test to their students.

As shown in FIG. 6, the remotely-administered contest-promoting system of the present invention is similar to the centrally-administered contest-promoting system of FIG. 2 and therefore includes: the primary server 100; client machines 160; game server 150; login server 120; web server 110; contestant database 130; login server 120; and the network 190. In addition, as shown in FIG. 6A, the remotely administered contest-promoting system of the present invention further includes: the remote administration server 610; the remote administration consoles 600; and the contest database 660.

As shown in FIG. 6B, the remote administration console 600 is a general purpose personal computer (PC) utilizing standard components such as, for example: the operating system 240; device drivers 280; network interface 215; standard I/O hardware 220; and clock and timer hardware 290. In addition, remote administration console 600 is provided with several software applications, such as a web browser 320, a remote administration plug-in 640, and a remote administration client application 650. The remote administration software, consisting of the remote administration plug-in 640 and the remote administration client 650, is downloaded and installed following a procedure similar to that used to obtain the contest client software for the client machines. Users must register on a web site to obtain authorization to administer contests using the system. This procedure follows an outline similar to that presented in FIG. 4A. However, in this case, the web site accessed is the remote administration web site served by the remote administration server 610.

The remote administration client software 650 is an application or group of applications which perform a number of different tasks, including designing and entering queries and answers, testing the contest, scheduling contest times, identifying those contestants eligible to participate in the contest, and submitting the completed contest to the remote administration server. The remote administration plug-in 640, in conjunction with the web browser 320, may be used to monitor the contest and to view and download contest results.

As shown in FIG. 6C, the remote administration server 610 is a high performance server using a standard operating system 240, device drivers 230, standard I/O hardware 220, and a high performance network interface 210. On this system, two primary applications are run, namely: the remote administration web server 620; and the remote administration daemon 630. The remote administration web server 620 supports the contest management web site, which provides information to users wanting to create and manage their own contests or tests. The remote administration daemon 630 communicates with the remote administration clients 650 running on an arbitrary number of remote administration consoles 600. The remote administration daemon 630 collects information about requested contests and their schedules. Information about the scheduling, participants, and references to questions and answers are stored in the contest database 660, for later use by the primary server 100. The remote administration server also accesses the contestant database 130 to verify contestants and record performance data about the contestant or test taker. The actual queries and answers are stored in the query/answer database 140. Virtual network connections between the remote administration components are shown in FIG. 6A.

Live Television Broadcasting of Contests for the Enjoyment of Spectators Supported by the System of the Present Invention In virtually every contest, sport and public entertainment event, there is some form of product and/or service advertising aimed at the spectators, and not the contestants. Thus, from an economic standpoint, the contest-promoting system of the present invention also includes several provisions which allow as many spectators as possible to view the contest and its associated advertising. Although the Internet is growing at an amazing pace, the number of participants is still small compared to the vast numbers of people who own television sets and regularly view television. In order to reach this additional audience, the contest-promoting system of the present invention is particularly adapted to enable spectators to view television broadcasts of Internet-based contests enabled by the system hereof.

Figure 7:
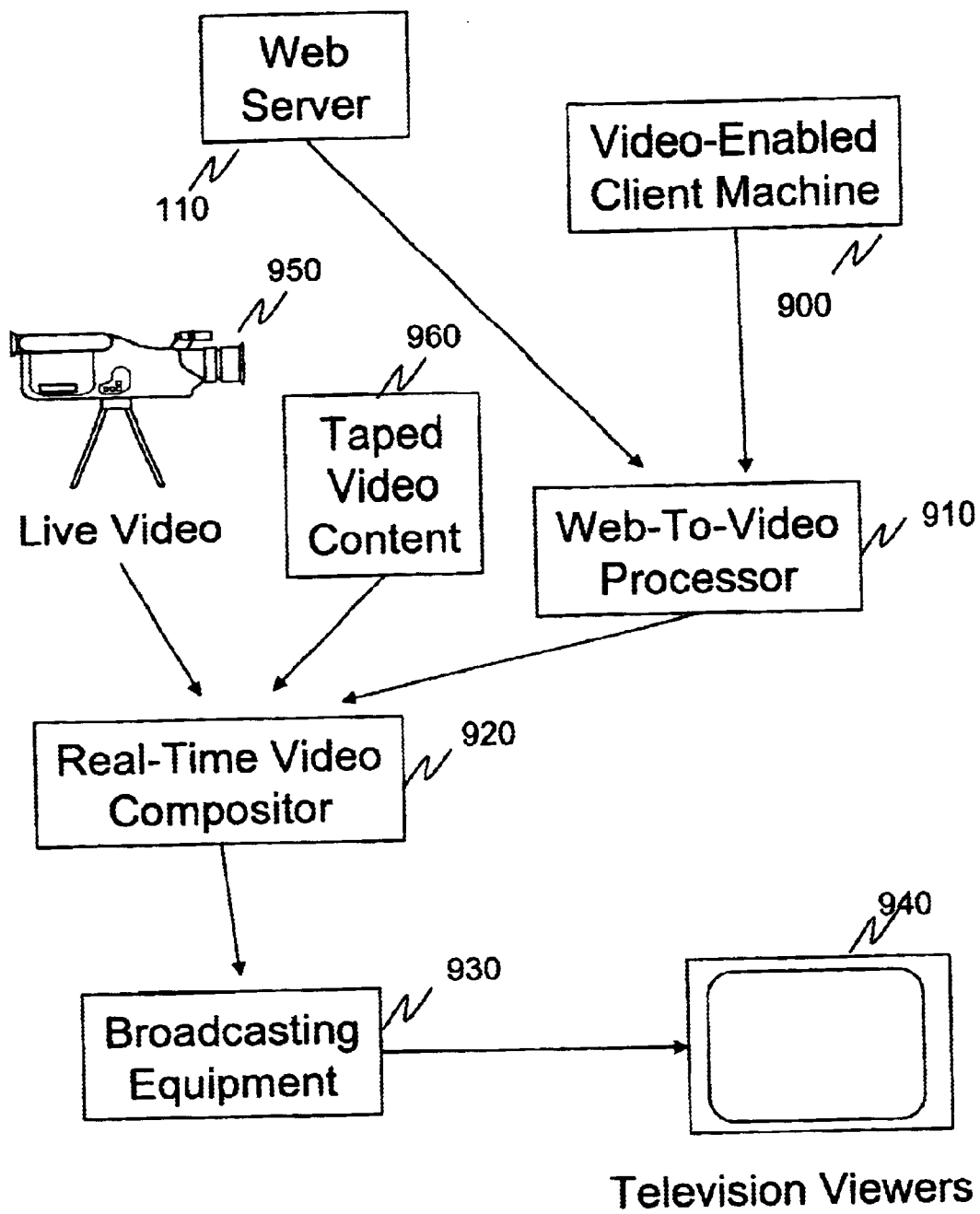
FIG. 7 is a schematic representation of a subsystem for providing the competition-promoting systems of the present invention with a television-based spectator interface, showing comprising a web server 110, a video-enabled client machine 900, a web-to-video processor 910, taped video content playback unit 960, live video source (e.g. camera) 950, a real-time video compositor 920, broadcasting equipment 930, and television viewers 940.

As shown in FIG. 7, the contest-promoting system of the present invention depicted in FIGS. 2 through 4G and 6 through 6C, also comprises a number of system components which are configured so that live video, taped video program content, and real-time information and results can be combined and distributed "on the fly" to spectators viewing one or more contests on standard television sets throughout the world. As shown in FIG. 7, these additional system components include: the web server 110; video-enabled client machines 900, web-to-video processor 910, real-time video compositor 920; taped video content playback unit 960; live video sources (e.g. cameras) 950; broadcasting equipment 930; and television viewers 940.

In order to enhance and dramatize the contest for the viewers, live video images are captured by each video-enabled client machine 900. In general, each video-enabled client machine 900 is equivalent to a client machine 160 with the addition of a video camera and associated video compression and transmission software. The video camera and software is readily available as part of commercially available video conferencing systems well known in the art.

In addition to delivering video images of the contestants, the system also allows both live video 950 and taped video content 960 to be incorporated into the complete video broadcast. This content could include advertising, information related to the contest, as well as a live MC or host for the contest.

The function of the web-to-video processor 910 is to filter, format and render (i) data generated by the primary server 100 and distributed through the web servers 10, and (ii) data transmitted by the video-enabled client machine. 900. The contest creators or administrators can create a specially designed "web-page" containing all of the information to be shown in the live broadcast. This page can include dynamic elements such as Java™ or ActiveX™ components so as to continually update and refresh queries, answers, scores, contestant information, and other data. The web-to-video processor 910 is provided with an HTML (or XML) rendering engine along with a Java virtual machine (JVM) and other dynamic web technologies.

Figure 7A:
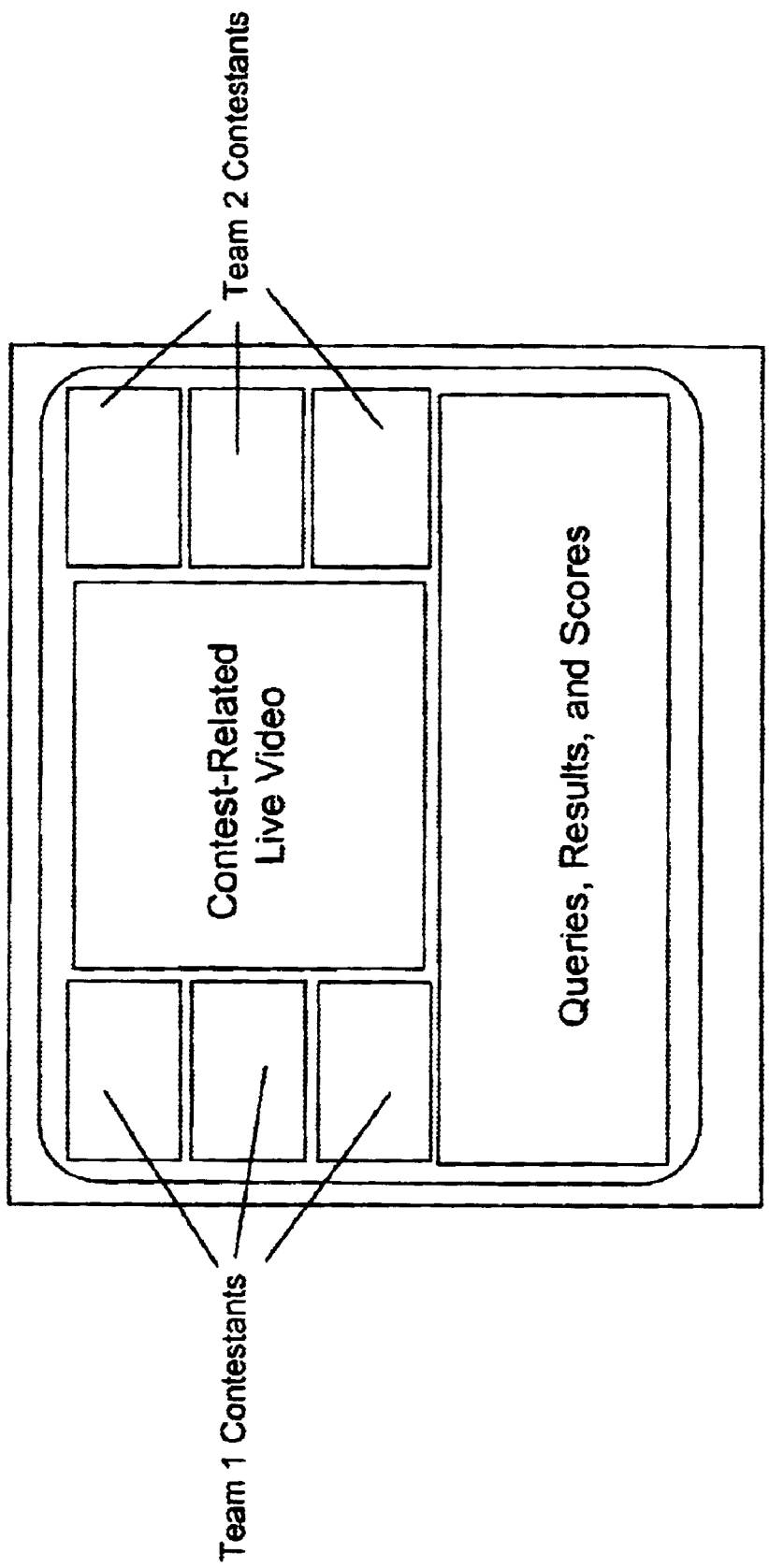
FIG. 7A is a schematic representation showing an exemplary layout for displaying contest live video, contestant images, and live contest queries, results, scores and statistics on a television-based spectator interface.

As shown in FIG. 7, video streams from the live video camera 950, taped video playback unit 960, and from the web-to-video processor 910 are combined and laid out by the real-time video compositor 920; resulting in a single unified view depicting the various aspects of the contest currently in progress. FIG. 7A shows just one possible video display layout for a contest between two teams of three people, wherein live video is displayed in the top-center of the display screen, and the formatted output of the web server 100 is displayed along the bottom of the display screen.

During the operation of the contest, the real-time video compositor 920 sends the final video signal to standard broadcasting equipment 930, which transmits the video signal to the spectators television sets 940 via cable, satellite, and/or radio waves.

Figure 8:
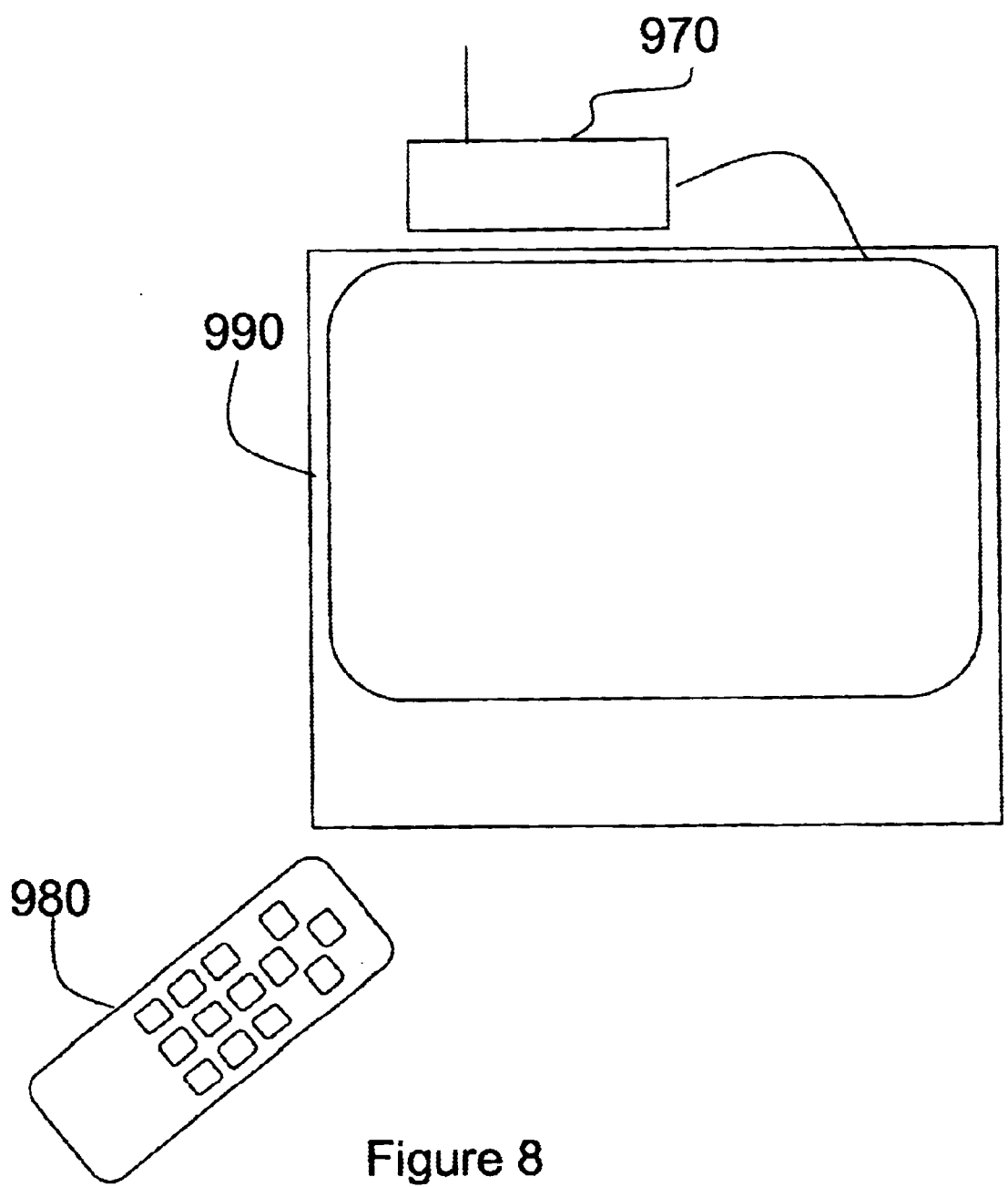
FIG. 8 is a schematic representation showing the basic components of a television-based client machine according to the present invention, shown comprising a set-top client machine 970 connected to the user's television set 990 using a standard NTSC or PAL cable, and a remote-control input device 980 for controlling the client machine.
Figure 8A:
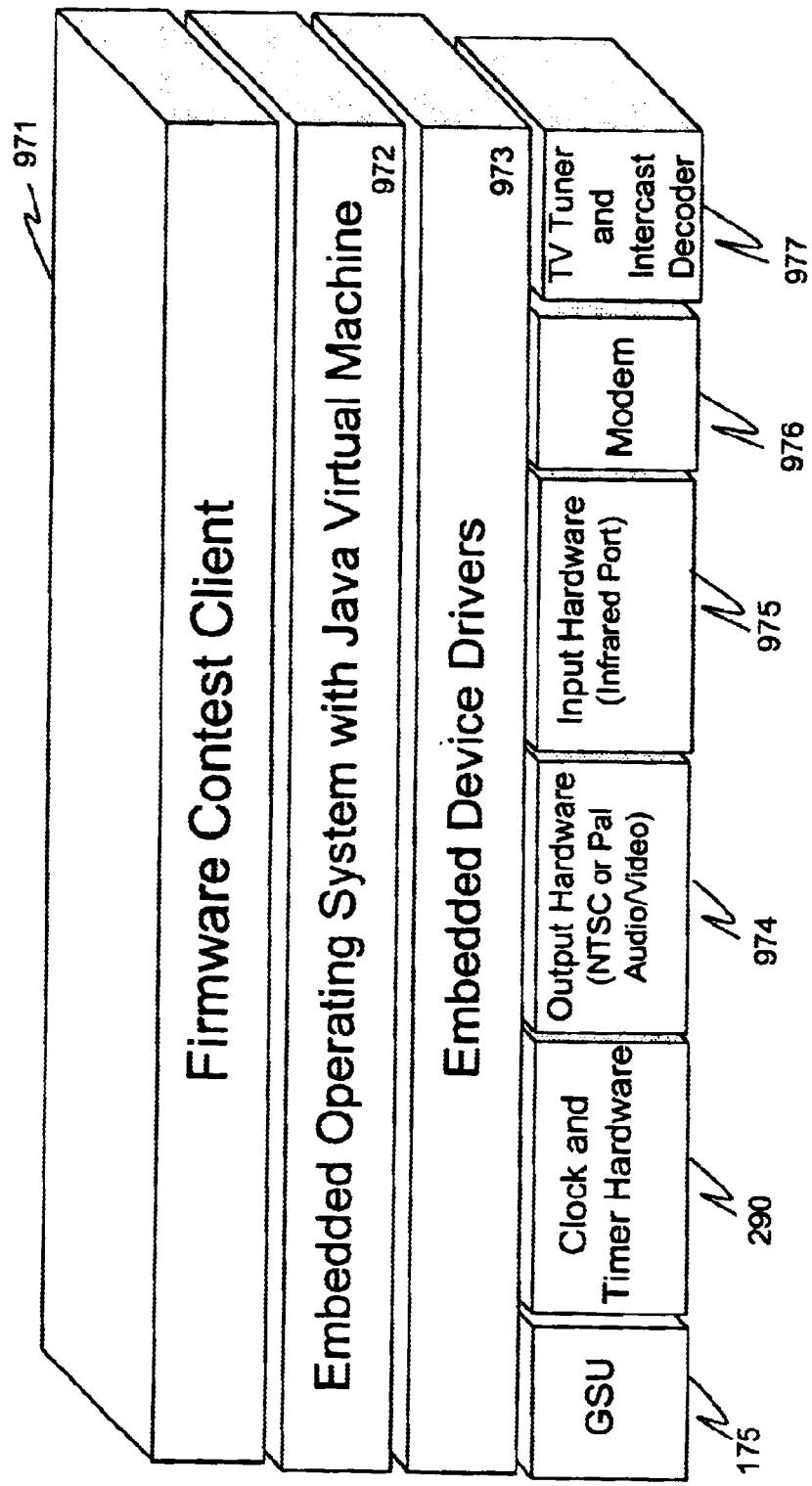
FIG. 8A is a schematic representation showing the major components of the set-top client machine 970 of FIG. 8, shown comprising a GPS receiver 170, clock and timer hardware 290, a television tuner with Intercast™ decoding capability 977, a modem 976, an infrared input port 975, NTSC or PAL audio/video output 974, embedded device drivers 973 and embedded operating system with Java capability 972 running on a microprocessor, and a firmware contest client 971.

Contest-Promoting System of the Present Invention Employing Television-Based Client Machines The system components shown in FIGS. 7 and 7A and described hereinabove enable spectators to passively observe&Internet-based contests while viewing conventional televisions sets 940. In an alternative embodiment of the present invention depicted in FIG. 8, additional system components are provided to enable contestants to actively participate in the contest through a television-based client machine. As shown in FIGS. 8 and 8A, a television-based client machine 970 in accordance with the present invention comprises the following the components: a set-top client machine 970; a IR-based remote-control input device 980; and a standard television set 990. As shown, the set-top client machine 970 is connected to the user's television set 990 using a standard NTSC or PAL cable. In addition, the set top client machine 970 has connections to an antenna or cable, as well as to the Internet using a modem 976 over a telephone line to an internet service provider.

The set-top client machine 970 receives and processes contest data, including queries through both the modem as well as through the incoming video signal. The video signal will contain live video in standard format, and could optionally contain additional data broadcast during the vertical blanking interval, perhaps using the Intercast™ format.

As shown in FIG. 8A, the set-top client machine 970 comprises a number of major components, namely: a GSU 175 or enhanced GSU 17;, clock and timer hardware 290; a television tuner with Intercast™decoding capability 977; a modem 976; an infrared input port 975; NTSC or PAL audio/video output 974; embedded device drivers 973; and embedded operating system with Java capability 972 running on a microprocessor, and a firmware contest client 971. Like the computer-based client machine 160, the set-top client machine 970 uses the GPS receiver in the GSU to discipline the local clock of the client machine. This clock is used to trigger the display of queries on the television screen, as well as to measure the elapsed time taken by the user when answering queries (or submitting responses to ITRs).

The television-based client machine 970 has a number of advantages over the computer-based client machine 160. First, the bandwidth requirements on the modem Internet connection are greatly reduced since much of the content is delivered through the television signal. Second, the set-top client machine 970 can be made much more inexpensively as compared to a general purpose computer. For the end-user, the set-top box 970 could be even provided at a reduced fee or even for no cost by their cable television provider, since the set-top box also functions as a tuner. An additional advantage with the set-top configuration is the ease of making the system secure. Unlike a general purpose computer, programming and development tools and interfaces would be proprietary, limiting the ability of hackers to develop programs to compromise the system. Also, programs would be stored in tamper-resistant EPROM, making it almost impossible for a hacker to disassemble the program to learn its vulnerabilities.

One disadvantage to the set-top based version is the difficulty in achieving microsecond accuracy synchronization. Normally in a television system, the display refresh timing is determined by the incoming NTSC or PAL signal. In order to precisely synchronize the refresh rate would require at least one frame of video memory storage, which would be used to buffer the incoming data. Most likely only one frame of storage would be needed, since the television signal will be fairly well synchronized due to the real-time nature of television broadcast, in contrast to the packed-based, store-and-forward architecture of the internet.

Alternative Applications for the GSU of the Present Invention

The global synchronization unit (GSU) of the present invention clearly has important capabilities and numerous applications beyond those relating to online contests and games, financial and commodity trading operations, on-line real-time auctions, and other forms of time-constrained competition over the Internet. As discussed above, the GSU, enables a number of functions that transcend those provided by a standard clock or even a GPS device. These functions fall into three basic categories: time and space synchronized generation of output events; time and space stamping of input events; and verification of previously generated time and space stamps.

The first category of functionality is the generation of output events in response to specific time and space conditions. The GSU core processor 750 can receive instructions, through a local user interface or through an interconnection to another device or computer, that set up time and space constraints along with associated actions that are to be performed when the time and space constraints are satisfied. In the case of the contest application, the constraint was to perform the action at the instant of the desired start-time. The action performed in this case was the decryption and display of the contest query. The GSU 175 can be programmed to generate an number of different output actions in response to the time-space conditions. However, using the security and encryption capabilities of the GSU, the nature of these actions may be concealed until the action is actually performed. Applications for this capability could range from the serious, for example the secure delivery of sensitive messages or data that may only be revealed at a certain time or location; to the frivolous, such as a scavenger hunt game in which additional clues are revealed by the GSU as the player reaches each sub-goal location.

The second category of functionality is the creation of time and space stamps which record and authenticate input events. The GSU core processor is commanded, again either through a local operator interface or through a connection to another device or computer to generate a time and space stamp. This stamp may or may not be associated with additional input device data. When associated with additional input data, the GSU encryption capabilities can be used to generate a digital signature on the combined time, location, and input data. This digital signature can later be used to verify that the data did indeed exist at that time and location, and that the data has not been altered since that time. Of course, this method cannot be used to verify whether or not the data existed before the specified time, or whether the data existed in other locations, but it does establish an upper-bound on the creation time, and prove that the data was available at a particular location.

The final major capability of the GSU hardware is the ability to authenticate and verify digitally signed time and space stamps that it has created in the past. Depending on the specifics of the digital signature and time and space-stamping methods used, it may also be possible to verify time and space stamps using other GSU's or other hardware or software systems. In essence, the GSU can serve as both a notary as well as a witness to claims about the timing and location of events.

Figure 9:
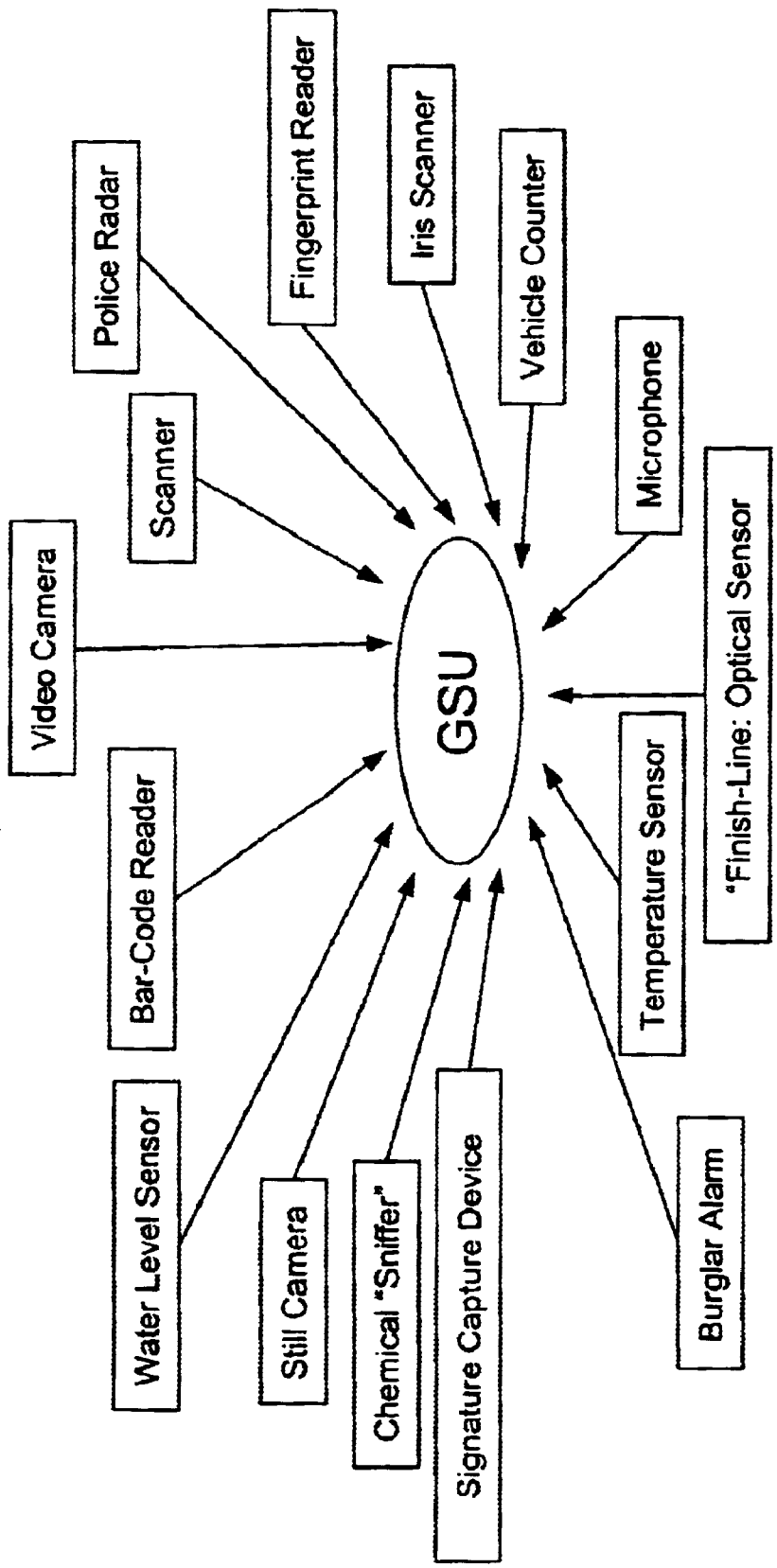
FIG. 9 is a schematic representation showing examples of input devices that can be connected to a global synchronization unit (GSU) of the present invention for performing time and space stamping.

FIG. 9 shows just a few of the potential inputs to a GSU (175 or 177) that might benefit from its time and space stamping capabilities. These inputs range from those with very specific purposes, such as water level sensors, burglar alarms, and police radar, to very general purpose inputs with a wide range of applications, such as still image and video cameras, microphones, and chemical "sniffers". Other possible inputs include: bar-code readers, document scanners, fingerprint readers, iris-scanners, vehicle counters, optical sensors for race finish lines, temperature sensors, and signature capture devices. The applications for a GSU having these inputs are virtually limitless, and the input devices shown are only a representative sample of the possible inputs.

Figure 10:
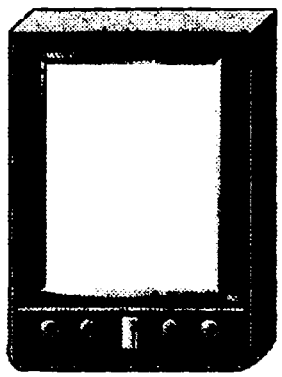
FIG. 10 is a schematic representation showing examples of applications that can benefit from inclusion of an embedded global synchronization unit (GSU) in accordance with the principles of the present invention.
Figure 10:
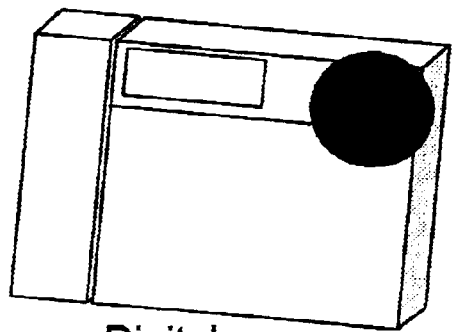
Figure 10:
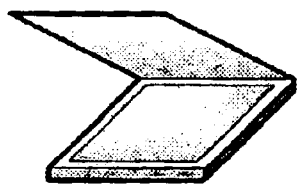
Figure 10:
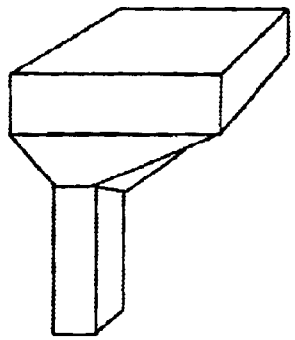
Figure 10:
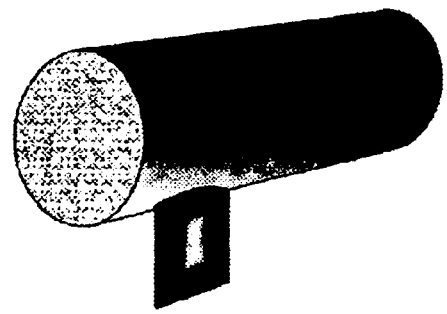

FIG. 10 shows examples of devices into which GSU components of the present invention can be embodied and provide beneficial results.

A Web-enabled handheld computer with an embedded GSU, and possibly wireless Internet access, could be carried by a delivery person for time and space stamping package deliveries. By attaching a digital still camera to the input of the GSU, an image of the person receiving the package could be taken and incorporated into the record of the transaction. The time and space stamp placed on the captured image would be digitally signed by the GSU to allow verification of the image at a later time. GSU equipped digital cameras, along with tamper-resistant and tamper-evident mechanical seals could be used to provide legal documentation of any number of transactions or events. Employees of insurance companies could utilize such devices to document accident damage. Similarly, bar-code scanners, document scanners, and police radar units could all be equipped with GSU's to provide enhanced security and authenticity.

Figure 11:
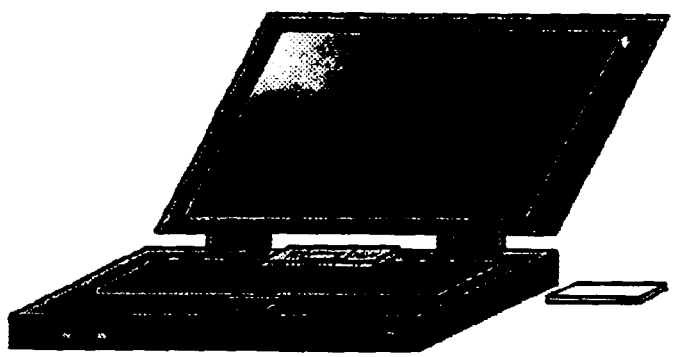
FIG. 11 is a schematic representation showing examples of different configurations of a global synchronization unit, including both internal and external units with a variety of interface options.
Figure 11:
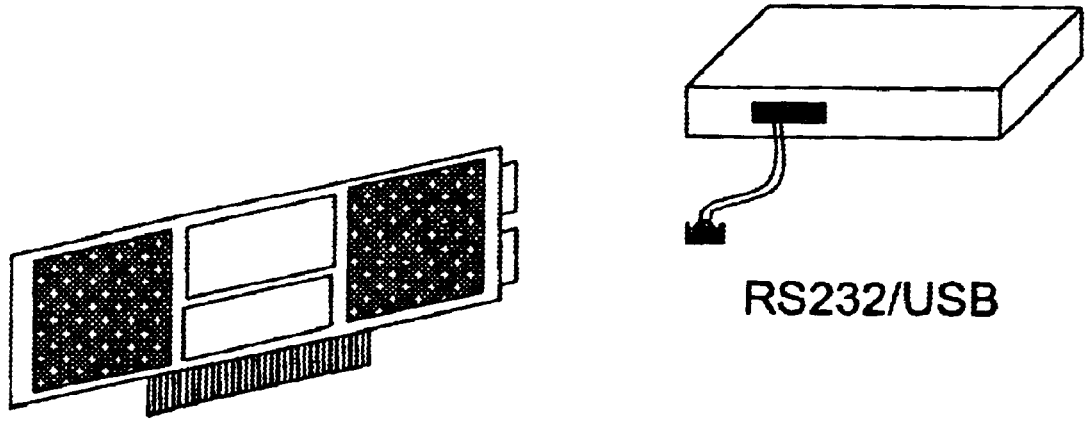

As shown in FIG. 11, the basic GSU unit 175 and enhanced GSU 177 can be built in a number of different configurations for use as peripheral devices to general purpose personal or business computers. These devices could connect to the client computer using PCMCIA slots, ISA/PCI or SCSI interfaces, or through serial or parallel port connections. Alternatively, GSUs 175 and 177 can also be realized as single Application Specific Integrated Circuit (ASIC) devices, wherein analog and digital circuits are embodied in a manner known in the ASIC chip manufacturing art.

Globally Time-Synchronized Securities/
Commodities/Currency Price-Quotation and Trading
System of the Present Invention As described hereinabove, the present invention enables simultaneous presentation of data to multiple users connected over a network to a central computer or computers. Additionally, the present invention also enables secure and precise calculation of time and space stamps for events that occur at a client machine. These stamps are digitally signed so that they may be authenticated and to make them resistant to forgery. Based on these inventive features, the present invention can be applied to the buying and selling of financial securities, commodities, and other items of value over the Internet. In particular, the present invention can provide traders (persons involved in the buying and selling of financial securities or otherwise profiting from the fluctuation in prices of those securities) with the ability to conduct financial trades in a manner that provides greater fairness and security than those currently afforded them.

One important aspect of securities trading is the ability to view and monitor price quotes for securities and to view and monitor information about trades and other transactions involving those securities. Typically, traders subscribe to a service that provides price quotes for offers to buy and sell securities. Depending on the level of service they have purchased, the quotes will be delivered with some predetermined delay (ranging from "real-time" to twenty minutes or so). Prior art real-time trading or auctioning systems do not compensate for network latency when producing these delayed quotes, and therefore the trader will actually receive them some random amount time after the specified delay. Using similar components, protocols, and procedures as provided for the contest-based system described above, the principles of the present invention can be applied in order to produce a competition-promoting system which enables the simultaneous display of price quotes to millions of competitors world over, for any given delay so as long as the specified delay is greater than the worst case latency expected for the client machines of these competitors.

In addition, the Internet-based competition-promoting system of the present invention can also enable secure time and space-stamping of client machine-based activities such as the submission of offers to buy or sell securities, options or the like. When using the hardware-based GSU hereof, each client machine in the system is enabled to generate a digitally-signed time and space stamp for each transaction, thereby allowing the client's transactions to be processed (i.e. executed and cleared) in a secure, and fundamentally fair manner.

As shown in FIG. 5, the financial securities/commodities price-quotation/trading system of the illustrative embodiment comprises a number of subcomponents, namely: a primary server 100; one or more web servers 110; a login server 120; a trader database 35; a real-time market state server 45; one or more real-time price-quotation and trading servers 55; and a plurality of client machines 160. In many respects, the system of FIG. 5 is similar to the system of FIG. 2, except that certain components are modified appropriately to the nature of securities, commodities or currency market (s) involved. Like reference numerals indicate like components in the systems.

Overall operation of the price-quotation/trading system is controlled and directed by a computer or set of computers or devices that will be referred to collectively as the primary server 100. The primary server provides certain functionality to the system, communicating with the real-time market state server 45, distributing quote and other market data to the real-time price-quotation and trading servers 55, providing a master clock for the system, and collecting and performing preliminary processing on quotation and trade requests.

The primary server 100 is substantially similar to that provided for the contest-based embodiment of the invention, shown in FIG. 2G. However, the contest management interface 260 will be replaced by a financial securities trading management interface, with functionality appropriate to this application, such as the ability to assign certain rights to traders, to change trader quote delays, and other such activities.

The single primary server 100 communicates indirectly with the client machines through a number of real-time price-quotation and trading servers 55. These servers relay quotes and other financial data to the client machines 160, and receive trade requests from those client machines. Preliminary verification and sorting of the trades is performed by the real-time price-quotation and trading servers 55, and these pre-processed results are then passed back to the primary server 100. The hardware and software architecture of the real-time price-quotation and trading servers 55 are similar to the game servers 150 depicted in FIG. 2E. This figure shows a layered architecture similar to the primary server 100, with hardware components including a GPS receiver 170, high precision timing hardware 200, and a high performance network interface 210 in addition to the standard hardware components 220. These hardware components are controlled through the use of a set of standard and customized device drivers 230. Many of these device drivers are provided by the hardware manufacturers, while some are specifically written or modified to handle the precise timing operations needed by the financial trading system. The major application running on the real-time price-quotation and trading servers is the financial trading system daemon. This software receives, processes and responds to data from the primary server, the login server, and from its client machines.

The trader interacts with the system through a client machine 160. Each trader uses a single client machine to receive and view security prices and other financial data as well as to enter and transmit requests (i.e. orders or offers) to buy or sell securities or options. Each client machine 160 consists of a standard personal computer, augmented by the addition of several software and hardware components. The critical hardware component on the trader's client machine is the global synchronization unit (GSU) 175. The GSU decrypts and displays quotes precisely at the specified delay, and also time and space stamps the trader's requests (i.e. orders) to buy and sell securities, options or the like. These time and space stamps are digitally signed to provide a secure record of the requested transaction.

When not actually performing trades, the trader interacts with a financial information providing web site through a web browser. The contest web site is "served" to that browser from one or more web servers 110. The web servers handle advertising, support, registration, downloading, and other similar tasks.

Another key component of the price-quotation/trading system shown in FIG. 5 is the login server 120. The login server accepts login requests from the trader's client machines and assigns an appropriate real-time price-quotation and trading server to that client machine. The login server provides a single, well-known address for the client machines to contact when initializing a new trading session. The login server also serves to intelligently distribute the processing and communications load among the real-time price-quotation and trading servers.

Figure 5B:
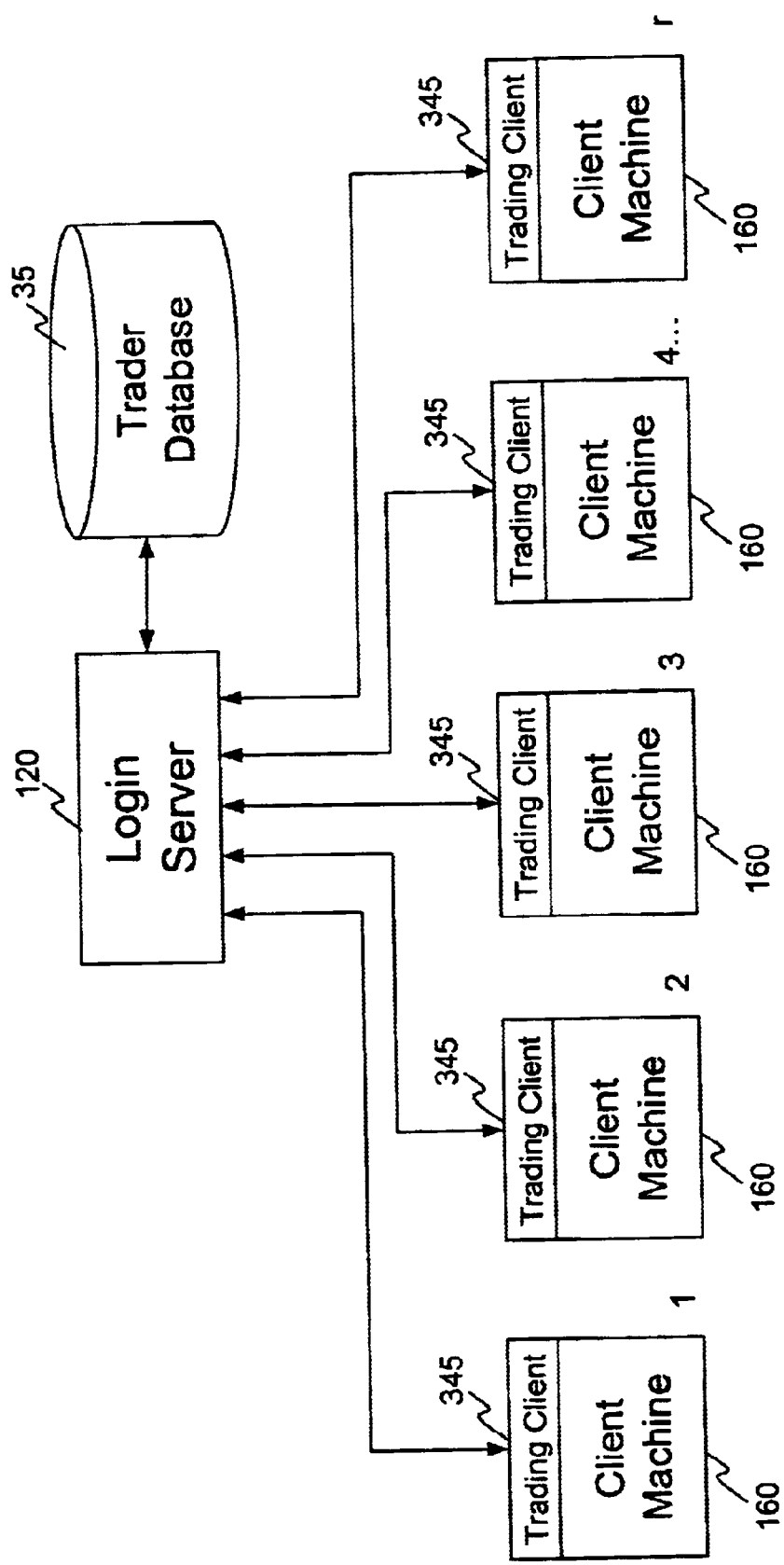
FIG. 5B is a schematic representation illustrating the connectivity between the login server 120 and the client machines 160, wherein each client machine is provided with trading client software 345, and wherein the login server is also connected to the trader database 35.

FIG. 5B shows the virtual network connections between the login-server and the trader's client machines.

FIG. 5 also depicts a trader database 35. The trader database records information about the users, such as their identity, preferences, contact information, and a history of past transactions.

The real-time market state server 45 acts as the interface between the trading system of the current invention and the actual stock-exchange (or commodity-exchange or currency-exchange) computers that provide the price quotes and process orders to trade (e.g. execute orders by matching offers to buy with offers to sell). This server 45 collects requested information and translates them into the proper form for transmission to the primary server 100. In addition, the real-time market state server 45 accepts trade requests from the primary server 45, reformats them into the proper protocols, and transmits them to the appropriate stock-exchange (or commodity-exchange or currency-exchange) computers. Finally, the results of the trades are collected and sent back to the primary server 100 for distribution to the client machines through the real-time price-quotation and trading servers 55.

As with the other preferred embodiments, the components of FIG. 5 are interconnected through the Internet or other network, as indicated by network 190.

Notably, the general operations depicted in FIG. 4 and carried out by the system of FIG. 2, are also carried out by the price-quotation/trading system of FIG. 5, with various modifications of course to accommodate the different application at hand. Collectively, these operations enable a competitor (i.e. market participant or trader) to participate against millions of competitors, in a secure and fundamentally fair time-constrained competition to buy and sell limited economic resources in a generally "free" market, wherein prices are set by supply and demand forces, rather than by governmental fiat or regulation. By virtue of the present invention, each competitor, connected to the price-quotation/trading system by an on-line connection established by a client machine, receives updated price quotations at a common "start-time" regardless of the location of his or her client machine on the infrastructure of the Internet, or on the planet Earth. Thus, trader/competitors in Tokyo, Japan and New York, N.Y., will receive real-time price quotes on market activity at the same globally-synchronized time. Also, the GSU in each trader's client machine securely places a time and space stamp on each trader's trade, to ensure that such geographically distributed and differently Internet-connected traders are able compete under fundamentally fair and network-secure conditions.

In the system of FIG. 5, the operation indicated at Block A in FIG. 4 would be modified so that each trader or competitor registers with the system as a trader, and downloads price-quotation/trading software to create a globally-synchronized and secure-networked client machine.

In the system of FIG. 5, the operation indicated at Block B in FIG. 4 would be modified so that each trader logs on to the price-quotation/trading server 55, and establishes a communication channel therewith.

In the system of FIG. 5, the operation indicated at Block C in FIG. 4 would be modified so that the system periodically transmits the price quotation updates and the start-time from the primary server 100 to each client machine 160.

In the system of FIG. 5, the operation indicated at.Block D in FIG. 4 would be modified so that system characterizes the client machine's local clock with the master clock on the primary server 100, (i.e. if an enhanced GSU 177 is not provided), and the synchronization of the client machine display update cycle with the desired start-time for the price quotation update.

In the system of FIG. 5, the operation indicated at Block E in FIG. 4 would be modified so that the system presents the price quotation updates to each trader precisely at the same globally-synchronized start-time, e.g. as determined by a local clock that is characterized with respect to a global master clock located on the primary server 100.

In the system of FIG. 5, the operation indicated at Block F in FIG. 4 would be modified so that the GSU-enabled client machine accepts the trader's response (e.g. offer/order to buy and/or sell a particular amount of stock, commodity or currency for a particular price), attaches a time and space stamp to that response, and transmits the response and time stamp to the servers 55 in the system.

In the system of FIG. 5, the operation indicated at Block G in FIG. 4, would be modified so that the real-time market state server 45 receives information regarding the orders during the past price-quote/trade cycle, and thus updates the same.

During the next subsequent price-quotation display time (i.e. next start-time) in the market competition, updated price quotations are simultaneously displayed/presented to each of the on-line traders in a globally time-synchronized manner. In response thereto, each trader can respond to such changing market conditions by placing trade orders which are time and space stamped at the originating client machine, in a globally time-synchronized manner. By virtue of the system of the present invention, such orders are fairly and securely executed (i.e. matched with corresponding unfilled orders in the marketplace) in accordance with conventional time-prioritized procedures and practices of the market.

A system similar to that described above can be constructed and deployed in order to improve the operation of on-line real-time auctions in fundamentally fair and secure manner, thus eliminating any advantages held by those bidders having faster computers and/or Internet connections.

Modifications to and Extensions of the Illustrative Embodiments of the Present Invention Although the illustrative embodiments of the global synchronization unit (GSU) utilizes a global positioning system (GPS) receiver as a source of time and space data, the present invention contemplates the existence and possible value of current and future alternative means of obtaining time and space information.

For example, Loran-C systems are widely used for determining maritime location and time information, and is also available for land-based systems in many parts of the world. This type of system could be used in a similar manner to the GSP receiver, although with a somewhat lower precision and accuracy.

Time signals can be produced from a periodically-synchronized free-running clock (ranging from a standard quartz-crystal based clock to an atomic clock). The accuracy of these signals of course depend on the stability of the clock and the frequency at which the clock is synchronized with some global clock.

Time signals are also available using a standard radio receiver from the NIST WWV and WWVH time and frequency service broadcast stations. Because the time signals are sent by radio waves from one or more fixed transmitting towers, there is a time latency due to the speed of propagation of the radio waves. This latency is affected not only by the straight line distance to the transmitter, but also by the actual path taken by the radio waves to reach the transmitter, which may involve reflections from natural or man-made objects. This latency may be compensated to some extent using the physical location of the receiver unit. After determining the unit's location, using cellular telephone data, user-entered location information, or other means, the estimated latency for that location can be determined, using a lookup table or other means. The expected latency can then be compensated for to arrive at a more accurate time value.

Because of the phenomenal popularity of the GPS system, it is certain that more advanced time and space determining systems will be developed in the future. The basic GSU concepts will surely benefit from the improvements in performance and convenience provided by such anticipated developments in these systems.

Any attempt to synchronize the processing of data at distributed locations, where the data originates at a single central location, is fundamentally constrained by the latency and bandwidth of the connections between the distributed locations and the central location. The latency of the communications channel is a measure of the time delay between the instant a piece of information is sent from the originator and the instant that information is received by the receiver. Latency is expressed in units of time, for example a "1 second latency". The bandwidth is a measure of the rate of information flow from sender to receiver in terms of information units per unit of time, for example bits per second.

Assuming a one-way flow of information from the sender to a set of receivers, where the information is broken down into discrete units (packets, messages, files, etc), as might be the case with stock "ticker" information, it may be desirable to synchronize the times that these units are made available to the receivers. In other words, for a given unit sent from the sender to all the receivers, it is desirable that the unit to becomes available for use on all the receivers simultaneously, despite the differing latencies of the various connections. This goal is accomplished by considering the expected value of the longest latency among all the connections. In order for the unit to be received by each receiver before the desired synchronization time (or start-time), the units must be sent out to each receiver at a time early enough to at least compensate for the latency to that receiver. In fact, the data unit must be sent earlier still to allow for the stochastic nature of communications delays as well as to allow for the time for the receiving GSU to process and decrypt the information.

Thus, in a stock market "ticker-tape" application, stock prices are determined at a central location as a function of the various offers to buy and sell (and other factors) in effect at that time. When a stock price becomes available at this central location, it is then sent to all of the remote GSU-equipped terminals, along with an indication of the desired time to display the stock price (the "start-time"). This desired display time must be sufficiently delayed from the time it is sent from the central location to allow for network latency and for the GSU processing time. If the worst case latency was 500 ms, and the processing time was 100 ms, then the display time must be at least 600 ms after it is sent out. However, this stock price is just one of a stream of stock prices being produced at the central location and distributed to the remote GSU-equipped terminals. The maximum rate (stock-prices per second) of display is constrained by several factors. First, we are limited by the GSU processing time. In this hypothetical case the GSU processing time is 100 ms, so the maximum display rate is 10 prices per second.

The bandwidth of the communication channel also is a factor when looking at a long term, continuous display rate. The bandwidth, as well as the size of the stock-price-containing messages limits the rate (stock-prices per second) of message sent over that link. Notably, the GSU processing time depends on whether the information is actually being displayed on a monitor, or simply being decrypted and given to a CPU. If the information is to be displayed at a time-precision moment on the order of a few milliseconds or less, then the display must be synchronized, which can be a relatively time consuming process (on the order of many milliseconds to several seconds). This requirement can be avoided if the start-times are chosen to be in synchronization with the display update rate, however. For example, if all the displays were synchronized at a common frequency of 100 Hz, and the start-times were chosen as integer-multiples of 10 ms, then it would only be necessary to perform the full monitor synchronization procedure once, after which the stock prices could be updated at a much faster rate (approaching the bandwidth of the communications channel). In actual practice, multiple-stock prices can be sent as a single unit, to reduce some of the GSU processing overhead.

In each of the client machines of the present invention, there is provided a GSU, which combines a GPS clock with an encryption means for digitally signing data in order to provide a secure and verifiable timestamp on each response from each competitor. This security measure may be compromised in only two ways: (1) by physically dissecting the GSU and extracting the secret key; or (2) by a computational-based attack to determine the secret key (a very time consuming process dependent on the number of bits used in the algorithms).

In order to prevent physically dissecting the GSU associated with each client machine, the present invention contemplates the use of tamper evident seals on the GSU (which would be submitted to receive the contest award), as well as techniques which result in the automatic destruction or disabling of the GSU upon tampering.

In order to render computational-based attacks on the GSU very difficult using ordinary computation means, the present invention contemplates using sufficiently long keys in the GSU so that the time involved to decipher the key would be very long, in accordance with standard security practices.

While the illustrative embodiments of the present inventuon have been described with regard to the Internet, it is understood that the systems and methods of the present invention can also be carried out on public as well as private intranets, owned, managed, or otherwise used by large or small business and/or social organizations of either national or international extent, having members scattered across the globe. It is understood that the Internet-based system and subsystems and components of the present invention may be modified in a variety of ways which will become readily apparent to those skilled in the art of having the benefit of the novel teachings disclosed herein. All such modifications and variations of the illustrative embodiments thereof shall be deemed to be within the scope and spirit of the present invention as defined by the Claims to Invention appended hereto.

What is claimed is:

1. An Internet-based system for enabling a competition among a plurality of participants over the Internet, comprising:

a primary server having an embedded GPS (global positioning system) receiver;

one or more web servers for providing information about the competition;

a login server for enabling participants to log-in with the system prior to the competition;

a competitor database for storing information about each participant registered to participate in the competition;

an invitation to respond/response database for storing invitations-to-responds (ITRs) to be simultaneously displayed to participants at the competition, as well as the responses provided by each of the participants in response to the ITRs;

one or more competition-promoting servers having an embedded GPS receiver, and enabling the conducting of said competition; and a plurality of client machines, each having an embedded Global Synchronization Unit (GSU), and enabling a registered participant to receive and display ITRs simultaneously with each and every other participant, and providing time and space (TS) stamped responses to the competition promoting servers;

wherein all such components are interconnected with a globally-extensive network to enable the competition among said plurality of participants.

2. The system of claim 1, which further comprises a virtual network connection between said primary server and an associated set of said competition-promoting servers, as well as between each said competition-promoting serverand an associated set of said client machines.

3. The system of claim 1 which further comprises a plurality of mirrored web servers, each connected to said contestant database and each serving a set of said client machines, and each said client machine being equipped with a web browser.

4. The system of claim 3, wherein each said web server comprises web server software providing support for HTML, Java, HTTP, FTP, XML, Active-X, CGI script or combinations comprising at least one of the foregoing softwares.

5. The system of claim 1, wherein each said client machine is equipped with a GSU and connected through the Internet to a server equipped with a GPS clock unit.

6. The system of claim 1, wherein said GSU comprises a GPS antenna, GPS receiver, central processor, host computer interface, GPS disciplined high-frequency clock, encryption and decryption module, and non-volatile memory.

7. The system of claim 1, wherein each said client machine comprises a global synchronization unit (GSU) and various hardware and software layers, including client software selected from the group consisting of a contest client applications, contest plug-ins, contest hooks and drivers, and combinations comprising at least one of the foregoing client software.

8. The system of claim 1, wherein each said client machine is equipped with a GSU and connected through the Internet to a server equipped with a GPS clock unit, where input and output devices are connected to said client machine through said GSU.

9. The system of claim 1, wherein said global synchronization unit (GSU) comprises a GPS antenna, GPS receiver, central processor, host computer interface, GPS disciplined high-frequency clock, encryption and decryption module, non-volatile memory, input device monitor and passthrough module, and an output passthrough and signal generation module.

10. The system of claim 1, wherein said game server comprises various hardware and software layers including a game server daemon and GPS receiver.

11. The system of claim 1, wherein said primary server comprises a primary server daemon, a contest management interface, a high precision clock or timer, high performance network interface, and a GPS receiver.

12. The system of claim 1, wherein said login server comprises a login server daemon and a high performance network interface.

13. The system of claim 1, wherein the flow of data and messages between a web server and said client machine includes web site content transmitted from said web server to the client machine, encrypted registration information posted to said web server from said client machine, preliminary contestant username and password sent to said client machine, and contest software downloaded from said web server to said client machine.

14. The system of claim 1, wherein the flow of data and messages between said primary server and said login server employed includes a list of game servers sent from said primary server to said login server.

15. The system of claim 1, wherein the flow of data and messages between one said game server and said login server includes a request for game server status by said login server, and the request includes the login server's public key for encryption, and wherein the data flow also includes an encrypted reply by the game server to said login server containing status and loading information about the game server, as well as the game server's public key for encryption use by the login server and client machine, and wherein the data flow also includes an encrypted contestant login request from said login server to the game server and a corresponding encrypted reply from the game server to said login server containing a game server access code.

16. The system of claim 1, wherein the flow of data and messages between said login server and a client machine, includes an encrypted contestant login request from the client machine to said login server, a message containing an encrypted contestant ID sent from the login server to the client machine, and an encrypted message from said login server to the client machine containing a game server address and associated game server access code.

17. The system of claim 1, wherein the flow of data and messages between one said game server and one said client machine includes a message from the client machine to the game server containing a contestant ID, a game server access code, and a client machine public key, an additional message from the game server to the client machine containing the game server public key, an additional message from the game server to the client machine containing and encrypted query and start-time, a further message from the game server to the client machine containing an encrypted query decryption key, a further message from the client machine to the game server containing a response notification hash, a further message from the client machine to the game server containing the encrypted response data and security verification hash, a further message from the game server to the client machine containing the security log request, a further message from the client machine to the game server containing the encrypted security log, a final message from the game server to the client machine containing the contest results.

18. The system of claim 1, wherein the flow of data and messages between the primary server and a game server, includes a message from the game server to the primary server containing the game server public key, an additional message from the primary server to the game server containing the primary server public key, a further encrypted message from the primary server to the game server containing the encrypted query, encrypted start-time, and encrypted answer, a further message from the game server to the primary server containing the encrypted preliminary results for the contest, a further message from the primary server to the game server containing an encrypted security analysis request, a further message from the game server to the primary server contains the encrypted security analysis results, a final message from the primary server to the game server containing the encrypted contest results.

19. The system of claim 1, wherein the flow of data and messages between the primary server and a web (http) server, includes game announcements delivered via ftp from said primary server to said web server, and additional data delivered via ftp from said primary server to said web server includes contest results and contestant standings.

20. An Internet-based competition-promoting system for fairly and securely enabling one or more time-constrained competitions among a plurality of competitors simultaneously presented with the same set of data, comprising:

a first subsystem for transmitting an Invitation-to-Respond, or ITR, to each of the competitors participating in the competition promoted by said system in a regulated manner; and a second subsystem for responding to each ITR presented to said competitors, by submitting an appropriate response or undertaking a particular action;

wherein the plurality of competitors are simultaneously presented with the same set of data, and further wherein each competitor's response is timed to ensure fairness in the competitive activity, and thus precisely measured, securely recorded and analyzed.

21. The Internet-based competition-promoting system of claim 20, wherein said same set of data is data selected from the group consisting a question to be answered, a problem, puzzle or riddle to be solved.

22. The Internet-based competition-promoting system of claim 20, wherein said competitors are selected from the group consisting of human beings, programmed computers, and sophisticated androidal machines.

23. The competition-promoting system and method of claim 20, wherein said time-constrained competition is an activity selected from the group consisting of multi-player timed problem-solving games, puzzles, or contests; on-line real-time auctions, on-line real-time trading of securities, commodities, and foreign currencies; on-line real-time auctions; on-line educational testing; on-line career testing; on-line aptitude testing; on-line intelligence quotient (IQ) testing; and other real-time activities wherein simultaneous presentation of information to a plurality of competitive entities or accurate presentation of IRQs to and collection of responses thereto from one or more human subjects, is critical to the competitive or otherwise time-constrained activity at hand, in order to ensure fundamental principles of fairness and fair play expected by participants, spectators, and sponsors alike.

24. An Internet-based competition-promoting system having system components comprising:

a primary server for providing a source of Invitations-to-Respond and other competition related data; providing a master clock for the system; and performing functions or operations involving data received from multiple client machines connected to the system;

a login server for accepting login requests from each competitor's client machine and assigning an appropriate competition-promoting server to that client machine, providing a single address for each client machine to use to contact the assigned competition-promoting server when initializing a session in the competition, and intelligently distributing the processing and communications load among the competition-promoting servers;

a competitor database for recording information about each competitor for the proper operation of the competition;

an Invitation-To-Respond/Response (ITR/Response) database for storing or generating Invitations-To-Respond (ITRs) appropriate to the particular competition being promoted, and transmitting those ITR's to said client machines, through the other servers in the system;

one or more competition-promoting servers; and a plurality of client machine for use by a plurality of competitors, each including a local clock, wherein each said competitor interacts with said competition-promoting system through one said client machine, further wherein an idealized universal clock time is derived as a function of a local clock value of the local clock and a master clock time from the master clock, and wherein said system components are interconnected through the infrastructure of the Internet.

25. The Internet-based competition-promoting system of claim 24, said competitor database records items of information about each said competitor, selected from the group consisting of his or her identity, preferences, contact information, and competition related data.

26. The Internet-based competition-promoting system of claim 24, wherein said ITR/Response database contain canonical responses for comparison with the actual responses generated by the competitors.

27. The Internet-based competition-promoting system of claim 24, wherein each said client machine includes a global synchronization unit (GSU), whereas each said competition-promoting server includes a GPS receiver.

28. The Internet-based competition-promoting system of claim 24, wherein said global positioning unit (GSU) employed by the competition-enabling system comprises:

a plurality of GPS receivers operating in conjunction with an array of GPS satellites occupying a geodesic orbit.

29. The Internet-based competition-promoting system of claim 24, wherein said primary server communicates indirectly with said client machines through a number of competition-promoting servers, wherein said competition-promoting servers relay Invitations-To-Respond to the client machines, and receive responses thereto from those client machines.

30. The Internet-based competition-promoting system of claim 24, wherein said competition-promoting servers perform preliminary processing and sorting of the client machine responses and these pre-processed results are then passed back to said primary server.

31. The Internet-based competition-promoting system of claim 24, wherein each said competitor uses one said client machine to receive and view the Invitations-To-Respond (ITR), as well as to enter and transmit the responses thereto.

32. The Internet-based competition-promoting system of claim 24, wherein said client machine comprises a personal computer, augmented by the addition of several software and hardware components, including a global synchronization unit (GSU) installed in the client machine to provide precisely time-stamp client-responses, referred to as client-events, traceable to internationally standardized reference clocks.

33. The Internet-based competition-promoting system of claim 24, wherein said GSU within each client machine performs decryption operations, generates digitally-signed time and space stamps of various internal and external events at the client machine, and supports timed decryption and presentation of data to the competitor.

34. The Internet-based competition-promoting system of claim 24, wherein each computer or device in the system will establish a connection or connections to one or more of the other computers through the communications network.

35. The Internet-based competition-promoting system of claim 24, wherein said connections are virtual connections established through the Internet.

36. The Internet-based competition-promoting system of claim 24, wherein said communications network comprises a packet-switched data communications network running the popular Transmission Control Protocol/Internet Protocol (TCP/IP).

37. The Internet-based competition-promoting system of claim 24, wherein each said competition server connected to said communications network has a statically assigned IP address, whereas each said client machine connected thereto has either a statically or dynamically assigned IP address.

38. An Internet-based contest-promoting system for enabling a plurality of contestants to participate in a multi-player internetworked time-constrained contest that is regulated in a secure and fundamentally fair manner, comprising:

an information server for supporting a contest process over the Internet and producing invitations to respond (ITR) for response to said contestant in a time-constrained manner;

a plurality of client machines, each said client machine for use by one said contestant to interface with the contest process, receive an ITR displayed in a globally time-synchronized manner, receive a response to the ITR from the contestant in a time-constrained manner, time-stamping said response at the client machine, and transmitting the response and corresponding time-stamp to said information server;

said information server including means for evaluating and ranking said contestants are according to their responses and corresponding time-stamps;

means for registering contestants participating in the contest; means for controlling and measuring certain time-based elements of the contest including the precise instant at which an ITR is presented to the contestants on all or some subset of the client machines, wherein said time-based elements shall include the "start-time" which is the same for each contestant, wherein the contest-promoting system includes means for precisely determining the length of time between the start-time and the instant each contestant submits its response which provides the finish-time of the particular contestant, wherein the length of time, measured between said start-time and said finish-time, provides the response-time of the particular contestant or competitor.

39. The Internet-based contest-promoting system of claim 38, wherein said ITRs are simultaneously presented to each and every client machine registered to compete in the contest.

40. The Internet-based contest-promoting system of claim 38, wherein each client machine incorporates a global positioning system (GPS) receiver, and a local clock contained in an embedded or peripheral device to provide a precise timing reference accurate to within 1 microsecond of international atomic clock standard time.

41. The Internet-based contest-promoting system of claim 38, wherein said GSU are programmed to decode and present the ITR in a secure manner at the precise moment desired.

42. The Internet-based contest-promoting system of claim 38, wherein each client machine includes a local clock that is characterized, or analyzed to determine the functional relationship between the local clock time and the global time as determined by a single master clock for the entire contest system, wherein the global time may be determined from the local clock reading.

43. The Internet-based contest-promoting system of claim 38, wherein the display update cycle on each client machine is skewed so that a display update completes exactly at a desired start time which is determined to be the same for each every contestant, regardless of their location on the planet.

44. The Internet-based contest-promoting system of claim 38, wherein characterization of the local clock is performed using an accurate clock connected to the client machine, or using security enhanced versions of the methods and algorithms used in the network time protocol (NTP).

45. The Internet-based contest-promoting system of claim 38, wherein said contest-promoting system further comprises security measures for detecting (and thereby discouraging) cheating by dishonest contestants.

46. The Internet-based contest-promoting system of claim 45, wherein said security measures comprise the use of encryption of the majority of messages between the various computers in the system, and by monitoring and logging the contest-related activities of participating client machines.

* * * * *